(12) United States Patent
Chen et al.

(10) Patent No.: US 12,380,777 B2
(45) Date of Patent: Aug. 5, 2025

(54) SYSTEMS AND METHODS FOR HAPTIC FEEDBACK EFFECTS

(71) Applicant: QUALCOMM Incorporated, San Diego, CA (US)

(72) Inventors: An Chen, San Diego, CA (US); Ajit Chourasia, San Diego, CA (US); Muhua Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/934,504

(22) Filed: Sep. 22, 2022

(65) Prior Publication Data
US 2023/0104514 A1  Apr. 6, 2023

Related U.S. Application Data

(60) Provisional application No. 63/251,293, filed on Oct. 1, 2021, provisional application No. 63/251,371, filed on Oct. 1, 2021.

(51) Int. Cl.
| | |
|---|---|
| *G08B 6/00* | (2006.01) |
| *A63F 13/285* | (2014.01) |
| *G06F 3/16* | (2006.01) |
| *G08B 7/06* | (2006.01) |

(52) U.S. Cl.
CPC .............. *G08B 6/00* (2013.01); *A63F 13/285* (2014.09); *G06F 3/165* (2013.01); *G08B 7/06* (2013.01)

(58) Field of Classification Search
CPC . G08B 6/00; G08B 7/06; A63F 13/285; A63F 13/2145; A63F 13/424; A63F 13/92; G06F 3/165; G06F 3/016
See application file for complete search history.

(56) References Cited

U.S. PATENT DOCUMENTS

| | | |
|---|---|---|
| 2001/0016518 A1 | 8/2001 | Nishiumi et al. |
| 2019/0087002 A1* | 3/2019 | Mani ........................ G06T 7/246 |

FOREIGN PATENT DOCUMENTS

| | | |
|---|---|---|
| EP | 2039404 A2 | 3/2009 |
| EP | 3654205 A1 | 5/2020 |

OTHER PUBLICATIONS

International Search Report and Written Opinion—PCT/US2022/076948—ISA/EPO—Mar. 28, 2023.
Partial International Search Report—PCT/US2022/076948—ISA/EPO—Feb. 7, 2023.

* cited by examiner

*Primary Examiner* — Peter J Iannuzzi
(74) *Attorney, Agent, or Firm* — QUALCOMM Incorporated

(57) ABSTRACT

Systems and techniques are described for processing media data and for providing haptic feedback that is customized based on the media data. A media system receives media content to be output using an output device according to media output settings associated with a media output software application. The media content can be associated with an environment that is at least partially generated by the software application, as in a video game. The output device is configured to output different portions of the media content at different times across a period of time. The media system detects a condition associated with the media content at a first time along the period of time. The media system actuates at least one haptic feedback actuator according to a haptic feedback pattern corresponding to the condition.

30 Claims, 25 Drawing Sheets

SYSTEMS AND METHODS FOR HAPTIC FEEDBACK EFFECTS

CROSS-REFERENCE TO RELATED APPLICATIONS

This application claims the benefit of U.S. Provisional Application No. 63/251,371, filed Oct. 1, 2021, and titled "Systems and Methods for Haptic Feedback Effects," and U.S. Provisional Application No. 63/251,293, filed Oct. 1, 2021, and titled "Systems and Methods for Haptic Feedback Effects," all of which are hereby incorporated by reference in their entirety and for all purposes.

FIELD

This application is related to haptic feedback. More specifically, this application relates to systems and methods for actuating one or more haptic feedback actuators of a media device to provide haptic feedback according to a haptic feedback pattern that is based on input(s) to the media device and/or output(s) from the media device.

BACKGROUND

Media systems can include devices such as cellular phones, laptops, tablets, and wearable devices. Media systems can output media using a variety of output devices. For example, a media system can include a display that the media system uses to display images, videos, presentations, and the like. A media system can include one or more audio output devices, such as speakers and headphones, that can play sounds, music, and the like. A media system can include a haptic feedback motor, which can provide haptic feedback by causing the media system to vibrate. Traditional media systems with haptic feedback capabilities only include a single haptic feedback motor. Thus, traditional media systems with haptic feedback capabilities generally use the same type of haptic feedback for many purposes, which may lead to confusion as to the meaning of an instance of haptic feedback.

BRIEF SUMMARY

In some examples, systems and techniques are described for processing media data. A media system receives media content to be output using an output device according to media output settings associated with a media output software application. In some examples, the media content includes visual media content and/or audio media content. In some examples, the media content is associated with an environment that is at least partially generated by a software application, such as a video game and/or an extended reality (XR) application. The output device is configured to output different portions of the media content at different times across a period of time. In some examples, the media content is configured to change across a period of time, for instance including a video, a presentation, a video game, and/or an audio clip. In some examples, the media content is configured for output according to media output settings. In some examples, the media system receives an input from a user interface. In some examples, the input can indicate one or more effects on an environment that is depicted in and/or represented in the media content, such as one or more actions undertaken by one or more entities (e.g., a player avatar) within the environment. In some examples, the input indicates changes to the media output settings.

The media system detects a condition associated with the media content at a first time along the period of time. In some examples, the condition is based on an environment in the media content, the media content, and/or the input. In some examples, the condition is based on detection of one or more objects, regions of interest, and/or changes in image properties in visual media content of the media content. In some examples, the condition is based on detection of a particular sound within audio media content of the media content. The media system actuates at least one haptic feedback actuator according to a haptic feedback pattern corresponding to the condition. In some examples, the media system generates the haptic feedback pattern based on the condition. In some examples, the haptic feedback pattern indicates that the at least one haptic feedback actuator is to be actuated to provide a localized haptic feedback effect. In an illustrative example, the haptic feedback pattern can indicate that a first haptic feedback actuator of the at least one haptic feedback actuator is to be actuated without actuating the second haptic feedback actuator.

In one example, an apparatus for image processing is provided. The apparatus includes at least one memory and at least one processor (e.g., implemented in circuitry) coupled to the at least one memory. The at least one processor is configured to and can: receive media content to be output using an output device according to media output settings associated with a media output software application, wherein the output device is configured to output different portions of the media content at different times across a period of time; detect a condition associated with the media content at a first time along the period of time; and actuate at least one haptic feedback actuator according to a haptic feedback pattern corresponding to the condition.

In another example, a method of image processing is provided. The method includes: receiving media content to be output using an output device according to media output settings associated with a media output software application, wherein the output device is configured to output different portions of the media content at different times across a period of time; detecting a condition associated with the media content at a first time along the period of time; and actuating at least one haptic feedback actuator according to a haptic feedback pattern corresponding to the condition.

In another example, a non-transitory computer-readable medium is provided that has stored thereon instructions that, when executed by at least one processor, cause the at least one processor to: receive media content to be output using an output device according to media output settings associated with a media output software application, wherein the output device is configured to output different portions of the media content at different times across a period of time; detect a condition associated with the media content at a first time along the period of time; and actuate at least one haptic feedback actuator according to a haptic feedback pattern corresponding to the condition.

In another example, an apparatus for image processing is provided. The apparatus includes: means for receiving media content to be output using an output device according to media output settings associated with a media output software application, wherein the output device is configured to output different portions of the media content at different times across a period of time; means for detecting a condition associated with the media content at a first time along the period of time; and means for actuating at least one haptic feedback actuator according to a haptic feedback pattern corresponding to the condition.

In some aspects, one or more of the methods, apparatuses, and computer-readable medium described above further comprise: detecting a scene condition represented within visual content of the media content at least at the first time to detect the condition. In some aspects, the scene condition includes a region of interest. In some aspects, the scene condition includes an object. In some aspects, the scene condition includes a change in an image property, wherein the image property includes at least one of luminosity, saturation, brightness, contrast, perspective, field of view, or color balance.

In some aspects, the media content includes visual content that is configured to vary across the period of time, wherein the output device includes a display configured to display the visual content. In some aspects, the visual content includes a video that is configured to change across the period of time, wherein the media output software application includes a video player, wherein the media output settings include video settings associated with the video player, and wherein the video player plays the video according to the video settings. In some aspects, the visual content includes a representation of an environment that is at least partially generated by the media output software application. In some aspects, the media output software application is a video game, and wherein the condition is associated with gameplay of the video game.

In some aspects, the media content includes audio content that is configured to vary across the period of time, wherein the output device includes an audio output device configured to play the audio content. In some aspects, the audio content includes an audio track of a video, wherein the audio track is configured to vary across the period of time. In some aspects, the audio content that includes at least one sound associated with an environment that is at least partially generated by the media output software application.

In some aspects, one or more of the methods, apparatuses, and computer-readable medium described above further comprise: detecting that a sound is included within audio content of the media content at least at the first time to detect the condition. In some aspects, one or more of the methods, apparatuses, and computer-readable medium described above further comprise: detecting receipt of an input from a user interface at the first time to detect the condition. In some aspects, one or more of the methods, apparatuses, and computer-readable medium described above further comprise: detecting a motion using a motion sensor at the first time to detect the condition.

In some aspects, one or more of the methods, apparatuses, and computer-readable medium described above further comprise: detecting a change in the media output settings to detect the condition. In some aspects, one or more of the methods, apparatuses, and computer-readable medium described above further comprise: detecting an aspect of the media content that is indicative of the condition associated with the media content to detect the condition associated with the media content.

In some aspects, the haptic feedback pattern indicates that the at least one haptic feedback actuator is to be actuated without actuating a second haptic feedback actuator of the method. In some aspects, the haptic feedback pattern indicates that the at least one haptic feedback actuator is to be actuated to provide a localized haptic feedback effect at a first region of the method without providing a corresponding feedback effect at a second region of the method. In some aspects, detecting that an object is represented within visual content of the media content at least at the first region, wherein the localized haptic feedback effect at the first region is based on the object.

In some aspects, the haptic feedback pattern indicates a haptic feedback intensity of haptic feedback by the at least one haptic feedback actuator. In some aspects, the haptic feedback intensity of the haptic feedback pattern corresponds to a proximity of a first entity represented in the media content to a second entity represented in the media content. In some aspects, the haptic feedback intensity of the haptic feedback pattern corresponds to an intensity of the condition associated with the media content. In some aspects, the haptic feedback intensity of the haptic feedback pattern corresponds to a volume of a sound, wherein the media content includes the sound.

In some aspects, the haptic feedback pattern indicates at least one of a waveform, a frequency, or an amplitude of the haptic feedback pattern by the at least one haptic feedback actuator. In some aspects, one or more of the methods, apparatuses, and computer-readable medium described above further comprise: generating a haptic feedback waveform of the haptic feedback pattern based on an audio waveform of a sound, wherein the media content includes the sound.

In some aspects, one or more of the methods, apparatuses, and computer-readable medium described above further comprise: outputting the media content using the output device.

In some aspects, one or more of the methods, apparatuses, and computer-readable medium described above further comprise: receiving a message; and modifying the media content to incorporate the message into the media content before the media content is configured to be output using the output device.]

In some aspects, the media content includes visual content that depicts at least a portion of the environment, wherein the output device includes a display configured to display the visual content. In some aspects, the methods, apparatuses, and computer-readable medium described above further comprise: the display.

In some aspects, the media content includes audio content that includes one or more sounds associated with the environment, wherein the output device includes an audio output device configured to play the audio content. In some aspects, the methods, apparatuses, and computer-readable medium described above further comprise: the audio output device.

In some aspects, the user interface includes a touch-sensitive layer of a touchscreen display, wherein the input includes a touch input received at a touch position along the touch-sensitive layer. In some aspects, the user interface includes a button, and wherein the input includes a button press of the button. In some aspects, the user interface includes a sensor, and wherein the input includes detection a motion based on sensor data captured by the sensor.

In some aspects, the software application is a video game, and wherein the effect on the environment includes performance of an action by a player avatar in the environment. In some aspects, detecting the condition associated with the environment includes identifying the performance of the action by the player avatar. In some aspects, detecting the condition associated with the environment includes detecting an interaction between the player avatar and a second portion of the environment.

In some aspects, detecting the condition associated with the environment includes detecting that an object is depicted within visual content of the media content. In some aspects, detecting the condition associated with the environment includes detecting a sound within audio content of the media content. In some aspects, detecting the condition associated with the environment includes identifying that the input matches a predetermined input category.

In some aspects, the media content includes an aspect indicative of the condition associated with the environment, wherein to wherein detecting the condition associated with the environment includes detecting the aspect of the media content that is indicative of the condition associated with the environment. In some aspects, the media content includes an aspect indicative of the effect on the environment.

In some aspects, the haptic feedback pattern indicates that the one or more haptic feedback actuators are to be actuated to provide a localized haptic feedback effect. In some aspects, the haptic feedback pattern indicates that a first haptic feedback actuator of the one or more haptic feedback actuators is to be actuated without actuating a second haptic feedback actuator. In some aspects, actuating the one or more haptic feedback actuators according to the haptic feedback pattern includes actuating the first haptic feedback actuator without actuating the second haptic feedback actuator.

In some aspects, the output device includes a display that displays first visual content of the media content and second visual content of the media content, wherein the first haptic feedback actuator is adjacent to a first region of the display that displays the first visual content, wherein the second haptic feedback actuator is adjacent to a second region of the display that displays the second visual content. In some aspects, the condition is associated with an entity in the environment that is closer to a first portion of the environment depicted in the first visual content than to a second portion of the environment depicted in the second visual content.

In some aspects, the haptic feedback pattern indicates a haptic feedback intensity of haptic feedback by the one or more haptic feedback actuators. In some aspects, the haptic feedback intensity of the haptic feedback pattern corresponds to a proximity of an entity in the environment to a position of a player avatar in the environment. In some aspects, the haptic feedback intensity of the haptic feedback pattern corresponds to an intensity of the condition associated with the environment. In some aspects, the haptic feedback intensity of the haptic feedback pattern corresponds to a volume of a sound, wherein the media content includes the sound.

In some aspects, the haptic feedback pattern indicates a haptic feedback waveform of the haptic feedback pattern by the one or more haptic feedback actuators. In some aspects, the haptic feedback pattern indicates a frequency of the haptic feedback waveform. In some aspects, the haptic feedback pattern indicates an amplitude of the haptic feedback waveform.

In some aspects, the methods, apparatuses, and computer-readable medium described above further comprise: generating the haptic feedback waveform of haptic feedback pattern based on an audio waveform of a sound, wherein the media content includes the sound. In some aspects, the methods, apparatuses, and computer-readable medium described above further comprise: outputting the media content using the output device. In some aspects, the methods, apparatuses, and computer-readable medium described above further comprise: modifying the media content before the media content is configured to be output using the output device. In some aspects, the methods, apparatuses, and computer-readable medium described above further comprise:

receiving a message over a network from a second device, wherein modifying the media content includes incorporating the message into the media content. In some aspects, the message includes one or more alphanumeric characters. In some aspects, the message includes one or more images. In some aspects, the message includes one or more sounds. In some aspects, the condition is associated with the message, and wherein the haptic feedback pattern is associated with the message.

In some aspects, receiving the media content to be output using the output device from the software application includes rendering the media content using the software application and receiving the media content after the media content is rendered and before the media content is output using the output device.

In some aspects, receiving the media content to be output using the output device from the software application includes storing the media content in a media buffer and receiving the media content from the media buffer after the media content is stored in the media buffer and before the media content is output using the output device. In some aspects, receiving the media content to be output using the output device from the software application includes generating at least a portion of the media content using the software application before storing the media content in the media buffer.

In some aspects, the media content includes visual content that is configured to change across the period of time, wherein the output device includes a display configured to display the visual content. In some aspects, the methods, apparatuses, and computer-readable medium described above further comprise: the display. In some aspects, the visual content includes a video that is configured to change across the period of time. In some aspects, the media output software application includes a video player, and wherein the media output settings include video settings associated with the video player, wherein the video player plays the video according to the video settings. In some aspects, the visual content includes a presentation that is configured to change across the period of time. In some aspects, the media output software application includes a presentation presenter, and wherein the media output settings include presentation settings associated with the presentation presenter, wherein the presentation presenter presents the presentation according to the presentation settings.

In some aspects, the media content includes audio content that is configured to change across the period of time, wherein the output device includes an audio output device configured to play the audio content. In some aspects, the methods, apparatuses, and computer-readable medium described above further comprise: the audio output device. In some aspects, the audio content includes an audio track of a video, wherein the audio track is configured to change across the period of time.

In some aspects, detecting the condition associated with the media content includes detecting that an object is depicted within visual content of the media content at least at the first time. In some aspects, detecting the condition associated with the media content includes detecting a sound within audio content of the media content at least at the first time.

In some aspects, the media content includes an aspect indicative of the condition associated with the media content, wherein detecting the condition associated with the media content includes detecting the aspect of the media content that is indicative of the condition associated with the media content.

In some aspects, the methods, apparatuses, and computer-readable medium described above further comprise: receiving, from a user interface, an input. In some aspects, detecting the condition associated with the media content includes identifying the input. In some aspects, the input is indicative of an effect on the media output settings, and wherein detecting the condition associated with the media content includes identifying the effect on the media output settings. In some aspects, the input is indicative of an effect on the media output settings, and wherein the media content includes an aspect indicative of the effect on the media output settings. In some aspects, the input is indicative of the first time. In some aspects, the input is indicative of the condition. In some aspects, the input is indicative of the haptic feedback pattern.

In some aspects, the haptic feedback pattern indicates that a first haptic feedback actuator of the one or more haptic feedback actuators is to be actuated without actuating a second haptic feedback actuator. In some aspects, actuating the one or more haptic feedback actuators according to the haptic feedback pattern includes actuating the first haptic feedback actuator without actuating the second haptic feedback actuator. In some aspects, the output device includes a display that displays first visual content of the media content and second visual content of the media content, wherein the first haptic feedback actuator is adjacent to a first region of the display that displays the first visual content, wherein the second haptic feedback actuator is adjacent to a second region of the display that displays the second visual content. In some aspects, the condition is associated with an entity that is depicted in the first visual content.

In some aspects, the haptic feedback pattern indicates a haptic feedback intensity of haptic feedback by the one or more haptic feedback actuators. In some aspects, the haptic feedback intensity of the haptic feedback pattern corresponds to a proximity of a first entity depicted in the media content to a second entity depicted in the media content. In some aspects, the haptic feedback intensity of the haptic feedback pattern corresponds to an intensity of the condition associated with the media content. In some aspects, the haptic feedback intensity of the haptic feedback pattern corresponds to a volume of a sound, wherein the media content includes the sound. In some aspects, the haptic feedback pattern indicates a haptic feedback waveform of the haptic feedback pattern by the one or more haptic feedback actuators. In some aspects, the haptic feedback pattern indicates a frequency of the haptic feedback waveform. In some aspects, the haptic feedback pattern indicates an amplitude of the haptic feedback waveform. In some aspects, the methods, apparatuses, and computer-readable medium described above further comprise: generating the haptic feedback waveform of the haptic feedback pattern based on an audio waveform of a sound, wherein the media content includes the sound.

In some aspects, the methods, apparatuses, and computer-readable medium described above further comprise: outputting the media content using the output device. In some aspects, the methods, apparatuses, and computer-readable medium described above further comprise: modifying the media content before the media content is configured to be output using the output device.

In some aspects, the methods, apparatuses, and computer-readable medium described above further comprise: receiving a message over a network from a second device, wherein modifying the media content includes incorporating the message into the media content. In some aspects, the message includes one or more alphanumeric characters. In some aspects, the message includes one or more images. In some aspects, the message includes one or more sounds. In some aspects, the condition is associated with the message, and wherein the haptic feedback pattern is associated with the message.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
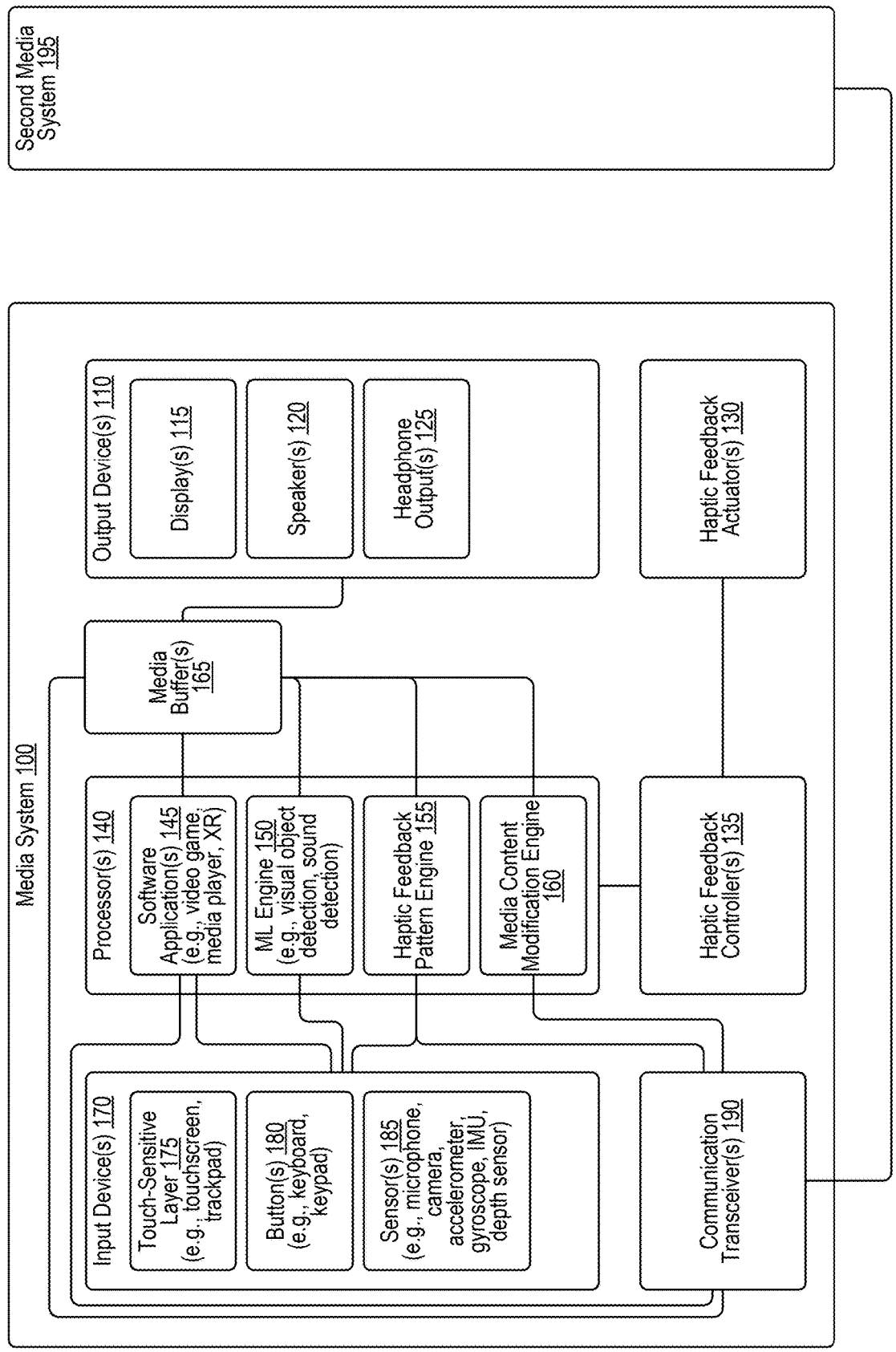
FIG. 1 is a block diagram illustrating an example architecture of a media system with one or more output devices, one or more input devices, and one or more haptic feedback actuators, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Media systems can include devices such as cellular phones, laptops, tablets, mobile handsets, wearable devices, and head-mounted displays (HMDs). Media systems can include various output devices. Media systems can output media content using one or more output devices. The output devices of a media system can include a visual media output device, such as a display. The media system can display visual media content using the visual media output device. Visual media content can include, for example, images, videos, presentations, and the like.

The output devices of a media system can include an audio media output device, such as one or more speakers, one or more headphones, one or more headsets, one or more headphone connectors (e.g., headphone jacks) to which headphones can be connected, one or more speaker connectors (e.g., audio jacks) to which speaker can be connected, and the like. The media system can play audio media content using the audio media output device. Audio media content can include, for example, sounds, music, and the like.

In some examples, media systems can also include input devices, such as user interfaces. For instance, input devices of a media system can include a touch-sensitive layer of a touchscreen, a trackpad, one or more buttons, a keyboard, a keypad, a mouse, a digitizer, a joystick, a game controller, and the like. Media systems receive one or more inputs from the one or more input devices. In some examples, the one or more inputs can indicate effects on an environment that is depicted in and/or represented in the media content, such as one or more actions undertaken by one or more entities (e.g., a player avatar) within the environment. In some examples, the one or more inputs can indicate changes to media output settings associated with output of the media content, such as changes to controls for pausing, playing, stopping, rewinding, fast-forwarding, slow-motion playback, skipping, increasing volume, decreasing volume, and the like.

In some examples, media systems can include one or more haptic feedback actuators, such as haptic feedback motors. The one or more haptic feedback actuators can provide haptic feedback, for instance by causing the media system to vibrate, move, or otherwise respond in a tactile manner. Traditional media systems with haptic feedback capabilities only include a single haptic feedback actuator. Thus, traditional media systems with haptic feedback capabilities generally use the same type of haptic feedback for many purposes, which may lead to confusion as to the meaning of an instance of haptic feedback.

Systems and techniques are described for processing media data and for providing haptic feedback that is customized based on media data. A media system receives media content to be output using an output device according to media output settings associated with a media output software application. For instance, the media content can include visual media content and/or audio media content. The output device can include a visual media output device and/or an audio media output device. In some examples, the media content is associated with an environment that is at least partially generated by a software application, such as a video game and/or an extended reality (XR) application (e.g., augmented reality, virtual reality and/or mixed reality). The media system may run the software application. The media system may receive at least a portion the media content from a second media system that runs the software application or a related software application, for example for multiplayer gaming and/or cloud-based gaming. The media content is associated with the environment, for instance visually depicting at least a portion of the environment, including sounds that represent sounds coming from within the environment, and/or otherwise including representations of at least portion(s) of the environment.

The output device is configured to output different portions of the media content at different times across a period of time. For instance, in some examples, the media content is configured to change across a period of time. For instance, the media content can include a video, a presentation (e.g., a slide show, a slide deck), a set of images, a video game, an XR application, a metaverse application, an interactive application, and/or an audio clip that is configured to change across the period of time. In some examples, the media content is configured for output according to media output settings. The media output settings can include settings and/or controls for pausing, playing, stopping, rewinding, fast-forwarding, slow-motion playback, skipping, increasing volume, decreasing volume, or combinations thereof. The media output settings can be associated with a software application that outputs the media content according to the media output settings, such as a media player, video player, audio player, image viewer, presentation presenter, a video game, an XR application, a metaverse application, an interactive application, or a combination thereof.

In some examples, the media system receives an input from a user interface. The input can be an input received using an input device, such as a touch-sensitive layer of a touchscreen, a trackpad, one or more buttons, a keyboard, a keypad, a mouse, a digitizer, a joystick, a game controller, or a combination thereof. In some examples, the one or more inputs can indicate effects on an environment that is depicted in and/or represented in the media content, such as one or more actions undertaken by one or more entities (e.g., a player avatar) within the environment. In some examples, the one or more inputs can indicate changes to the media output settings.

The media system detects a condition at a first time along the period of time. In some examples, the condition is based on an environment in the media content, the media content, and/or the input. In some examples, the condition can be based on detection of one or more objects, regions of interest, and/or changes in image properties in visual media content of the media content. For instance, the condition may include an enemy, or item, or explosion, appearing onscreen. The condition may include detection of interactions between two or more detected objects, such detecting an interaction between a soccer ball and a soccer goal, an interaction between a basketball and a basket, an interaction between a baseball and a bat, an interaction between a hockey puck and a hockey stick, an interaction between a hockey puck and a hockey goal, an interaction between a weapon and a character, and the like. The condition may include detection of a particular sound within audio media content of the media content. For instance, the sound can be the sound of an explosion, of an audience cheering, of a baseball hitting a bat, of a basketball going into a basket, of tires screeching along a turn, and the like. In some examples, for instance where the media content and/or the environment are generated by, and/or are part of, a video game, the condition can be based on gameplay (e.g., detection of a gameplay event during gameplay) of the video game.

The media system actuates at least one haptic feedback actuator according to a haptic feedback pattern corresponding to the condition. The media system can generate the haptic feedback pattern based on the condition. In some examples, the haptic feedback pattern indicates that the at least one haptic feedback actuator are to be actuated to provide a localized haptic feedback effect. For example, the at least one haptic feedback actuator can include a first haptic feedback actuator and a second haptic feedback actuator, and the haptic feedback pattern can indicate that the first haptic feedback actuator is to be actuated without actuating the second haptic feedback actuator. For example, if the condition is associated with an object detected in visual media content of the media content, then the localized haptic feedback effect can be localized based on the haptic feedback actuator that is closer to, and/or closest to, and/or adjacent to, the depiction of the object in the visual media content as displayed on the visual output device.

The systems and techniques disclosed herein provide various technical improvements over traditional systems and techniques for processing media data and/or for providing haptic feedback. For instance, the media systems disclosed herein can provide different patterns of haptic feedback for different conditions, making haptic feedback effects for different conditions feel different to users, and make different haptic feedback effects easier to differentiate. The media systems disclosed herein can provide localized haptic feedback that is based on positions of visual content on a display, which can for instance provide improved accessibility for vision-impaired users. The media systems disclosed herein can provide localized haptic feedback that is based on audio channels of audio content, which can for instance provide improved accessibility for hearing-impaired users. The media systems disclosed herein can different patterns of haptic feedback that simulate different physical feelings associated with different actions or conditions, for instance allowing haptic feedback effects associated with walking, running, crawling, driving, and/or other actions (e.g., gameplay actions) to feel different and/or to simulate real-world sensations associated with those activities.

Various aspects of the application will be described with respect to the figures. FIG. 1 is a block diagram illustrating an example architecture of a media system 100 with one or more output devices 110, one or more input devices 170, and one or more haptic feedback actuators 130. The media system 100 can be an example of a computing system 1500. The one or more output devices 110 of the media system 100 can include one or more visual media output devices, such as one or more displays 115. The media system 100 can display visual media content using the visual media output device. Visual media content can include, for example, images, videos, presentations (e.g., slide decks, slide shows, sets of images), computer-generated imagery (CGI), or combinations thereof.

The one or more output devices 110 of the media system 100 can include one or more audio media output device. Examples of the one or more output devices 110 include the output device 1535. Examples of the one or more audio media output devices include one or more speakers 120 and/or one or more speaker connectors (e.g., audio jacks) to which one or more speakers 120 can be connected. Examples of the one or more audio media output devices include one or more headphone outputs 125, such as one or more headphones, one or more headsets, one or more headphone connectors (e.g., headphone jacks) to which headphones can be connected, or combinations thereof. The media system can play audio media content using the audio media output device. Audio media content can include, for example, sounds, music, tones, or combinations thereof.

The media system 100 can include one or more media buffers 165. The one or more media buffers 165 can include one or more image buffers, frame buffers, display buffers, audio buffers, ring buffers, or combinations thereof. The one or more media buffers 165 can store portions of media content, including visual media content and/or audio media content, that are to be output by at least one of the one or more output devices 110. In some examples, the one or more media buffers 165 can store one or more images and/or video frames that are configured to be displayed using one or more visual media output devices of the one or more output devices 110, such as by the one or more displays 115. In some examples, the one or more media buffers 165 can store one or more audio clips that are configured to be played using one or more audio media output devices of the one or more output devices 110, such as by the one or more speakers 120 and/or by the one or more headphone outputs 125. In some examples, the one or more processors 140 of the media system 100 generate at least a portion of the media content in the one or more media buffers 165, for example using the one or more software applications 145 and/or the media content modification engine 160. In some examples, at least a portion of the media content in the one or more media buffers 165 is received by the media system 100 from a second media system 195 via one or more communication transceivers 190. In some examples, at least a portion of the media content in the one or more media buffers 165 includes content captured by the one or more sensors 185, such as images and/or audio captured by the one or more sensors 185.

The one or more input devices 170 of the media system 100 can include one or more user interfaces and/or one or more components associated with the one or more user interfaces. Examples of the one or more output devices 110 include the input device 1545. The one or more input devices 170 of the media system 100 can include, for instance, a touch-sensitive layer 175 (e.g., of a touchscreen and/or a trackpad), one or more buttons 180 (e.g., individual buttons, a keyboard, and/or a keypad), a mouse, a digitizer, a joystick, a game controller, or combinations thereof. The one or more input devices 170 of the media system 100 can include one or more sensors 185. Examples of the one or more sensors 185 can include one or more cameras, image sensors, microphones, depth sensors, accelerometers, gyroscopes, positioning receivers (e.g., global navigation satellite system (GNSS) receivers), inertial measurement units (IMUs), or combinations thereof. Depth sensors can include, for example, light detection and ranging (LiDAR) sensors, radio detection and ranging (RADAR) sensors, sound detection and ranging (SODAR) sensors, sound navigation and ranging (SONAR) sensors, time of flight (ToF) sensors, structured light sensors, stereoscopic cameras, or combinations thereof. The media system 100 can receive one or more inputs from the one or more input devices 170. In some examples, the inputs can be indicative of touch input positions along the touch-sensitive layer 175, cursor positions (e.g., associated with a mouse or touch-sensitive layer 175), button presses of one or more buttons 180 (e.g., virtual button presses of one or more virtual buttons, physical button presses of one or more physical buttons), sensor data captured by the one or more sensors 185, or combinations thereof. Examples of the sensor data include, for instance, one or more images, videos, audio clips, depth information (e.g., point clouds), motion information, acceleration information (e.g., from an accelerometer), orientation information (e.g., from a gyroscope), or combinations thereof.

The one or more haptic feedback actuators 130 of the media system 100 can include one or more actuators, one or more motors, one or more vibration motors, one or more vibration actuators, one or more eccentric rotating mass vibration motors (ERMs), one or more linear resonant actuators (LRAs), one or more linear resonant actuator (LRA) motors, one or more brushless motors, one or more direct current (DC) motors, one or more alternating current (AC) motors, one or more brushless DC (BLDC) motors, one or more haptic motors, one or more haptic actuators, one or more tactile feedback motors, one or more tactile feedback actuators, one or more vibration motors, one or more piezoelectric actuators, one or more piezoelectric motors, one or more piezo actuators, one or more piezo motors, one or more vibration actuators, one or more vibrators, one or more speakers that produce vibration-inducing audio, one or more buzzers that produce vibration-inducing audio, or a combination thereof. In some examples, the media system 100 includes multiple haptic feedback actuators 130. In some examples, the media system 100 includes multiple haptic feedback actuators 130 that are each positioned in different regions of the media system 100, for instance as illustrated with respect to the haptic feedback actuators 230 in the mobile handset 210 of FIGS. 2A-2B. In some examples, a haptic feedback actuator of the haptic feedback actuators 230 include a mass object that the haptic feedback actuator rotates about an axis using a motor upon actuation of the haptic feedback actuator. The center of mass of the mass object may be off-center relative to the axis of rotation (e.g., eccentric). Actuation of the haptic feedback actuator can cause the haptic feedback actuator (and/or the media system 100 that it is a part of) to vibrate and/or move due to the rotation of the mass object about the axis. In some examples, a haptic feedback actuator of the haptic feedback actuators 230 include a mass object that the haptic feedback actuator slides from one end of a channel to another end of the channel, for instance using one or more magnets, springs, and/or motors. Movement of the mass object back and forth along the channel during actuation of the haptic feedback actuator can cause the haptic feedback actuator (and/or the media system 100 that it is a part of) to vibrate and/or move.

Actuation of the one or more haptic feedback actuators 130 of the media system 100 can be controlled by, and/or performed by, the one or more haptic feedback controllers 135 and/or the haptic feedback pattern engine 155 of the one or more processors 140 of the media system 100. The one or more haptic feedback controllers 135 may include hardware circuitry, such as motor driver(s) and/or actuator driver(s), breakout boards, or combinations thereof. In some examples, the haptic feedback pattern engine 155 can use the one or more haptic feedback controllers 135 to turn at least one of the one or more haptic feedback actuators 130 on or off. In some examples, the haptic feedback pattern engine 155 can use the one or more haptic feedback controllers 135 to actuate or disable at least one of the one or more haptic feedback actuators 130. In some examples, the haptic feedback pattern engine 155 can use the one or more haptic feedback controllers 135 to increase, reduce, or zero out the amount of power provided to at least one of the one or more haptic feedback actuators 130. In some examples, the haptic feedback pattern engine 155 can use the one or more haptic feedback controllers 135 to increase, reduce, or zero out an intensity, strength, and/or amount of haptic feedback (e.g., vibration) provided by at least one of the one or more haptic feedback actuators 130. In some examples, the haptic feedback pattern engine 155 can use the one or more haptic feedback controllers 135 to cause at least one of the one or more haptic feedback actuators 130 to provide haptic feedback according to a haptic feedback waveform, a haptic feedback intensity, a haptic feedback pattern, a haptic feedback effect, a haptic feedback duration, or a combination thereof. In some aspects, a remote system other than the media system 100 can provide at least a portion of the media content to the media system 100, which the media system 100 can receive via the communication transceiver(s) 190. In some aspects, an external haptic feedback pattern engine of the remote system can generate the haptic feedback pattern for the media content and send the haptic feedback pattern for the media content to the media system 100 which the media system 100 can receive via the communication transceiver(s) 190. This approach may be appropriate, for instance, if the media system 100 has low processing capability and/or power budget. In some aspects, some portions of the haptic feedback pattern used by the media system 100 may be generated by the external haptic feedback pattern engine of the remote system (e.g., corresponding to portions of the media content itself), while other portions of the haptic feedback pattern used by the media system 100 may be generated by the haptic feedback pattern engine 155 of the media system 100 (e.g., based on inputs received via the input device(s) 170).

The media system 100 includes one or more processors 140. Examples of the one or more processors 140 include the processor 1510. The one or more processors 140 execute instructions stored in memory, such as a non-transitory computer-readable storage medium. The instructions can include instructions corresponding to one or more software applications 145, so that the one or more processors 140 can run the one or more software applications 145. In some examples, the one or more software applications 145 include a video game and/or an extended reality (XR) application. Examples of the XR application include an augmented reality (AR) application, a virtual reality (VR) application, a mixed reality (MR) application, or a combination thereof. The one or more software applications 145 can generate at least a portion of an environment, in terms of a visual appearance of the environment and/or in terms of audio coming from (and/or associated with) the environment. In some examples, the environment is entirely virtual, for instance if the one or more software applications 145 are a video game and/or a VR application in which the user of the media system 100, and/or one or more player avatars representing the user, move though a virtual environment. In some examples, the environment is a representation of the real-world environment around the media system 100. In some examples, the environment is partially virtual and/or partially real, for instance if the one or more software applications 145 are an AR application, a MR application, and/or an XR video game in which the user of the media system 100, and/or one or more player avatars representing the user, move though the environment. In some examples, the media system 100 can use the display(s) 115 as see-through displays and/or as pass-through displays. For instance, in some examples, the real elements of the environment can include images of the real-world environment around the media system 100 captured by image sensor(s) and/or camera(s) of the sensors 185. In some examples, the real elements of the environment can include audio from the real-world environment around the media system 100 captured by microphone(s) of the sensors 185. In some examples, the real elements of the environment can include light from the real-world environment around the media system 100 that passes through at least one of the one or more displays 115 (and/or other visual media output device(s)) to reach the user. In some examples, the real elements of the environment can include audio from the real-world environment around the media system 100 that is audible to the user even when the one or more audio media output devices (e.g., speakers 120, headphone outputs 125) out outputting other audio. In some examples, the one or more processors 140 can perform active noise cancelling by generating a noise-cancelling signal having an opposite phase and matching amplitude based on the audio from the real-world environment around the media system 100 captured by microphone(s) of the sensors 185, and playing the noise-cancelling signal using the one or more audio media output devices (e.g., speakers 120, headphone outputs 125).

The media system 100 may run the one or more software applications 145. The media system 100 may receive at least a portion the media content from a second media system that runs the software application or a related software application, for example for multiplayer gaming and/or cloud-based gaming. The media content is associated with the environment, for instance visually depicting at least a portion of the environment, including sounds that represent sounds coming from within the environment, and/or otherwise including representations of at least portion(s) of the environment.

In some examples, the one or more inputs received by the one or more input devices 170 can be inputs for, and/or inputs to be used by, the one or more software applications 145. In some examples, the one or more inputs received by the one or more input devices 170 can be used by the media system 100 indicate effects on an environment that is depicted in and/or represented in the media content, such as one or more actions performed by and/or undertaken by one or more entities (e.g., one or more player avatars representing the user of the media system 100) within the environment. In some examples, the one or more inputs received by the one or more input devices 170 can be used by the media system 100 to indicate changes to media output settings associated with output of the media content, such as changes to controls for pausing, playing, stopping, rewinding, fast-forwarding, slow-motion playback, skipping, increasing volume, decreasing volume, or combinations thereof.

The instructions can include instructions corresponding to a machine learning (ML) engine 150, so that the one or more processors 140 can run the ML engine 150. The media system 100 can use the ML engine 150 to train one or more ML models using training data to generate one or more trained ML models. The media system 100 can use, as inputs to the one or more trained ML models of the ML engine 150, media content from the one or more software applications 145, from the one or more media buffers 165, from the media content modification engine 160, from the one or more sensors 185, or combinations thereof. The one or more trained ML models of the ML engine 150, in response to these inputs, can detect one or more objects depicted and/or otherwise represented in the media content, for example as illustrated in and discussed with respect to FIGS. 11 and 13. The one or more trained ML models of the ML engine 150, in response to these inputs, can detect one or more sounds within audio media content in the media content, for example as illustrated in and discussed with respect to FIGS. 12 and 13. The one or more ML models of the ML engine 150 can perform, for example, a feature extraction algorithm, a feature detection algorithm, a feature recognition algorithm, an object detection algorithm, an object recognition algorithm, a facial detection algorithm, a facial recognition algorithm, a person detection algorithm, a person recognition algorithm, a sound extraction algorithm, a sound detection algorithm, a sound recognition algorithm, an optical character detection algorithm, an optical character recognition (OCR) algorithm, a classifier, an optical glyph detector, an optical glyph scanner, or a combination thereof. The ML engine 150, and/or the one or more trained ML models of the ML engine 150, can include, for example, one or more neural network (NNs) (e.g., neural network 1300), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

The instructions can include instructions corresponding to a haptic feedback pattern engine 155, so that the one or more processors 140 can run the haptic feedback pattern engine 155. The media system 100 detects a condition associated with the media content and/or the environment based on the media content and/or the input. The media system 100 can detect the condition using the haptic feedback pattern engine 155, the one or more trained ML models of the ML engine 150, the one or more software applications 145, or a combination thereof.

Figure 11:
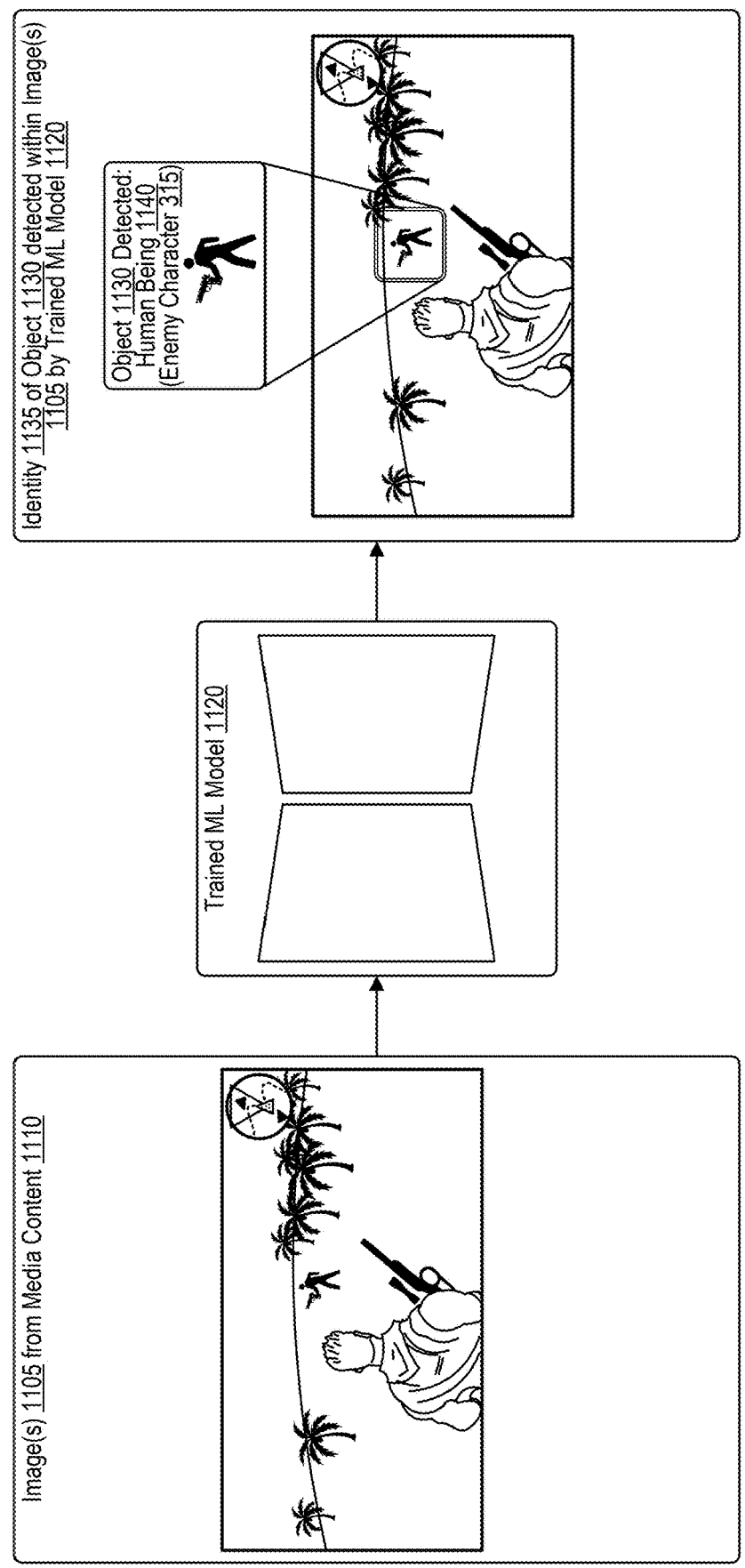
FIG. 11 is a block diagram illustrating determination of an identity of an object using a trained machine learning model based on input of one or more images of media content into the trained machine learning model, in accordance with some examples.
Figure 12:
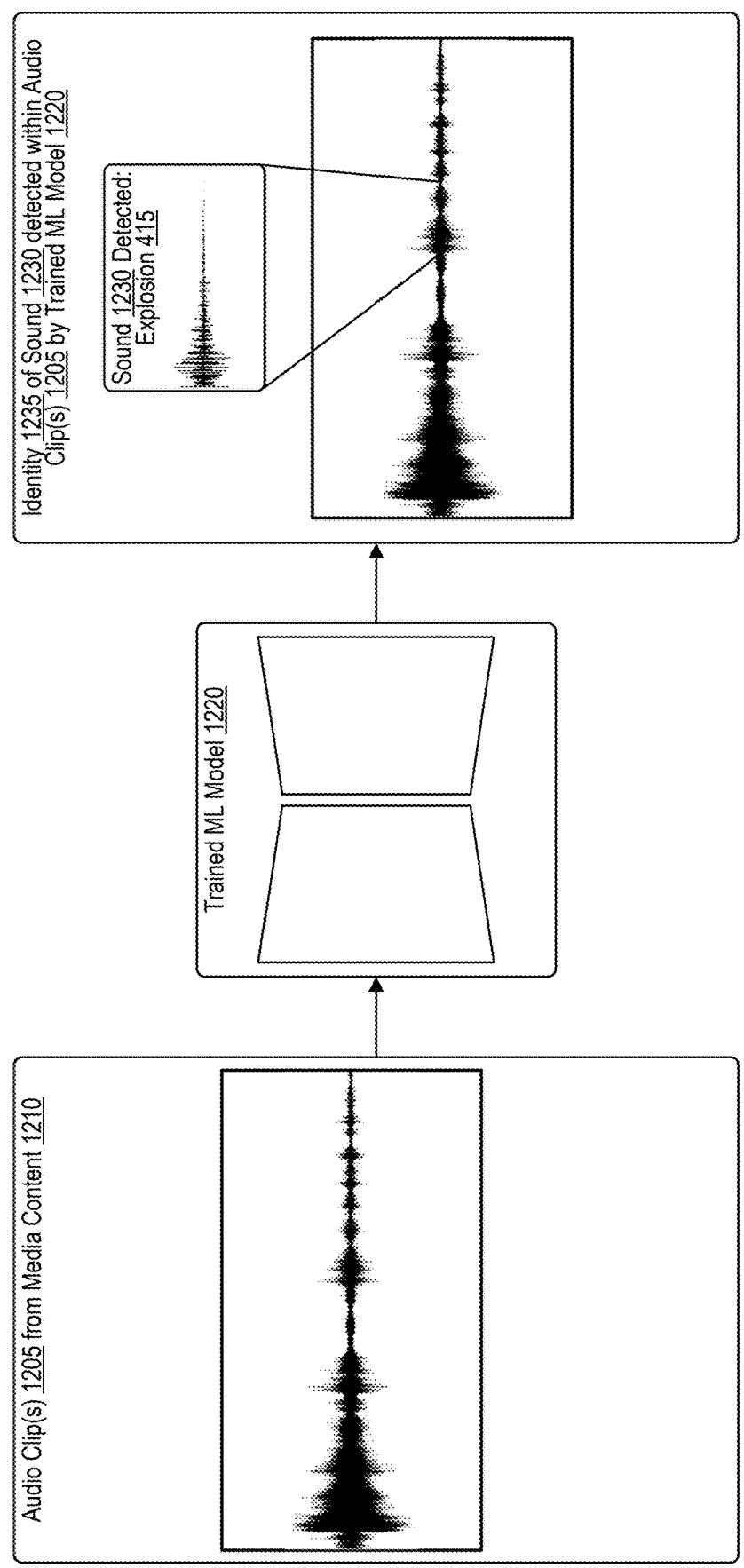
FIG. 12 is a block diagram illustrating determination of an identity of a sound using a trained machine learning model based on input of one or more audio clips of media content into the trained machine learning model, in accordance with some examples.
Figure 13:
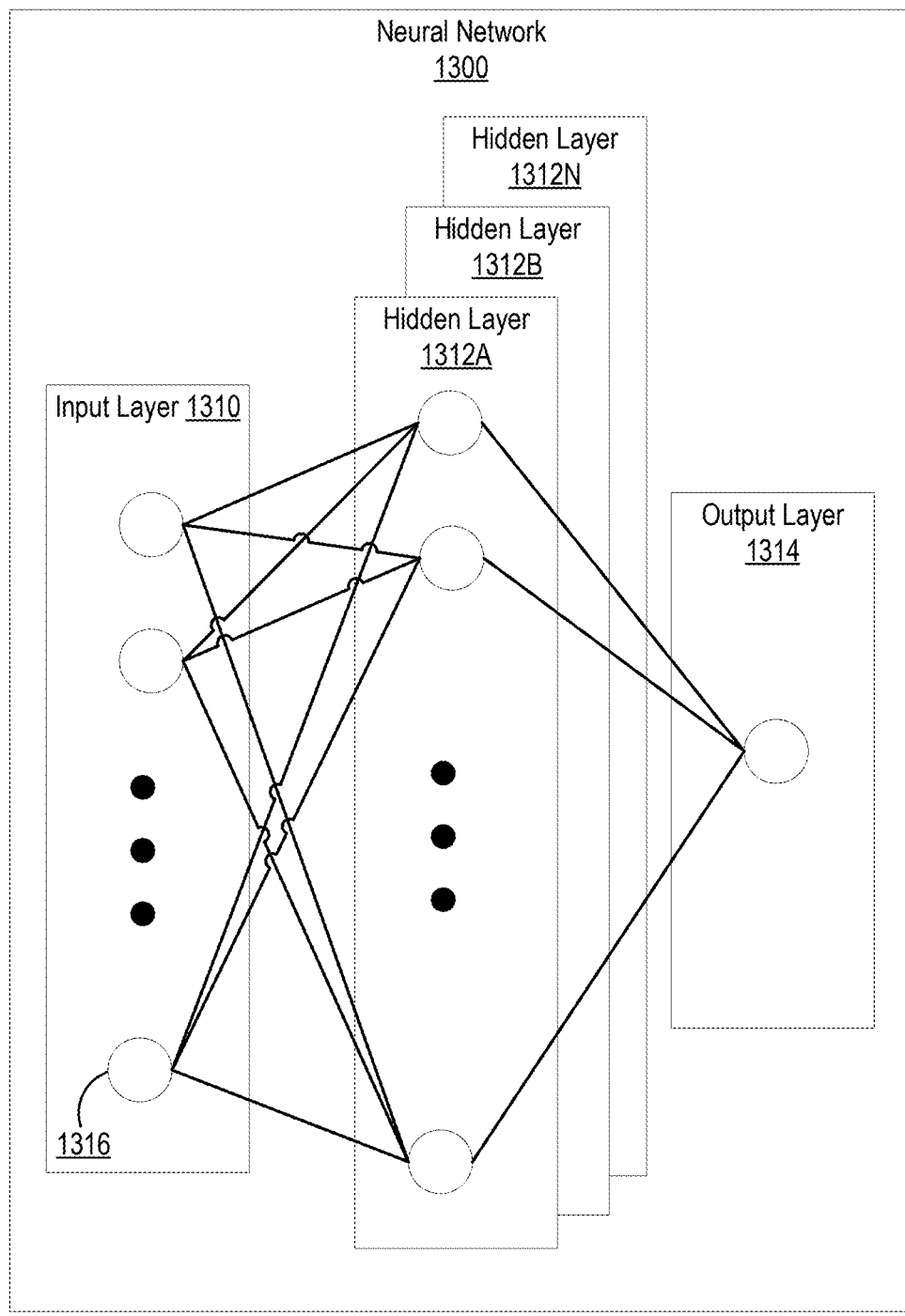
FIG. 13 is a block diagram illustrating an example of a neural network that can be used by the machine learning engine to identify elements within media content to be output by a media device, in accordance with some examples.

In some examples, the media system 100 detects the condition based on detection of one or more objects in visual media content of the media content, for instance as illustrated in FIGS. 11 and 13. For instance, the condition may include an enemy, or item, or explosion, appearing onscreen. The condition may include detection of interactions between two or more detected objects, such detecting an interaction between a soccer ball and a soccer goal, an interaction between a basketball and a basket, an interaction between a baseball and a bat, an interaction between a hockey puck and a hockey stick, an interaction between a hockey puck and a hockey goal, an interaction between a weapon and a character, and the like. In some examples, the media system 100 detects the condition based on detection of a particular sound within audio media content of the media content, for instance as illustrated in FIGS. 12 and 13. For instance, the sound can be the sound of an explosion, of an audience cheering, of a baseball hitting a bat, of a basketball going into a basket, of tires screeching along a turn, and the like.

The media system 100, using the haptic feedback pattern engine 155, generates a haptic feedback pattern corresponding to the condition. The media system 100, using the haptic feedback pattern engine 155, actuates the one or more haptic feedback actuators 130 (using the haptic feedback controller(s) 135) according to a haptic feedback pattern corresponding to the condition. In some examples, the media system 100, using the haptic feedback pattern engine 155, generates the haptic feedback pattern to indicate that the one or more haptic feedback actuators 130 are to be actuated to provide a localized haptic feedback effect that is localized to a specific region of the media system 100, for example by using a specific subset of the haptic feedback actuator(s) 130. For example, the one or more haptic feedback actuators 130 can include a first haptic feedback actuator and a second haptic feedback actuator, and the haptic feedback pattern can indicate that the first haptic feedback actuator is to be actuated without actuating the second haptic feedback actuator. For example, if the condition is associated with an object detected in visual media content of the media content, then the localized haptic feedback effect can be localized based on the haptic feedback actuator that is closest to the depiction of the object in the visual media content as displayed on the visual output device (e.g., as in FIGS. 3C, 3E, 3F, 3G, 3H, 5, 8, 10B, 10C, 11, and/or 13). If the condition is associated with a sound detected in audio media content of the media content, then the localized haptic feedback effect can be localized based on a haptic feedback actuator that corresponds in direction to a direction of an audio channel of the sound as set to be output by the audio output device (e.g., as in FIGS. 3G, 3H, 4, 7, 8, 10B, 10C, 12, and/or 13). If the condition is associated with an input received via the one or more input devices 170, then the localized haptic feedback effect can be localized based on a position of the media system 100 associated with the input and/or one or more intensities of the input and/or one or more contents of the input (e.g., as in FIGS. 3D, 6, 8, 11, 12, and/or 13).

The instructions can include instructions corresponding to a media content modification engine 160, so that the one or more processors 140 can run the media content modification engine 160. The media content modification engine 160 can modify media content before the media content is output via the output device(s) 110. In some examples, the media content modification engine 160 can modify media content that is in the media buffer(s) 165. In some examples, the media content modification engine 160 can modify media content after the media content is output by the software application(s) 145 but before the media content is received media buffer(s) 165. In some examples, the media content modification engine 160 can modify media content after the media content is captured by the sensor(s) 185 but before the media content is received media buffer(s) 165.

The media system 100 includes one or more communication transceivers 190. Examples of the one or more communication transceivers 190 include the communication interface 1540. In some examples, the one or more communication transceivers 190 include a WiFi transceiver, a cellular network transceiver, a 3G transceiver, a 4G transceiver, an LTE transceiver, 5G transceiver, an ultra-wideband (UWB) transceiver, a 60 GHz transceiver, or a combination thereof. In some examples, the media system 100 receives a message from a second media system 195 using the one or more communication transceivers 190. In some examples, the media content modification engine 160 modifies the media content by incorporating the message into at least a portion of the media content. For instance, in some examples, the media content modification engine 160 modifies the media content by overlaying a visual representation of the message, and/or a visual component of the message, over at least a portion of the media content. In some examples, the media content modification engine 160 modifies the media content by incorporating an audio representation of the message, and/or an audio component of the message, into audio media content of the media content. In some examples, the message includes one or more alphanumeric characters. In some examples, the message includes one or more images (e.g., including emojis). In some examples, the message includes one or more sounds. In some examples, the condition is associated with the message, and the haptic feedback pattern is associated with the message. Examples of such messages include the message 905, the message 910, the message 1030, and the message 1050.

In some examples, the message is sent as part of a social media platform. In some examples the media system 100 and the second media system 195 are each associated with one or more accounts with the social media platform. In some examples, the media system 100 and the second media system 195 share a shared trait. In some examples, the shared trait includes a shared device manufacturer, a shared device distributor, a shared device model series, a shared device model, a shared network carrier, a shared network type, a shared brand, a shared operating system, a shared set of one or more software applications 145, a shared number of haptic feedback actuators 130, a shared arrangement and/or layout of haptic feedback actuators 130, a shared team (e.g., in a video game and/or sport), a shared geographic region, a shared vicinity, a shared indoor area, a shared outdoor area, or a combination thereof. In some examples, the second media system 195 is a second instance of the media system 100.

In some examples, the message is at least partially generated at the media system 100, for example based on detection of an object in the media content by the ML engine 150, detection of a sound in the media content by the ML engine 150, detection of another condition in the one or more software applications 145, or a combination thereof. Examples of such messages include the message 355.

Figure 2B:
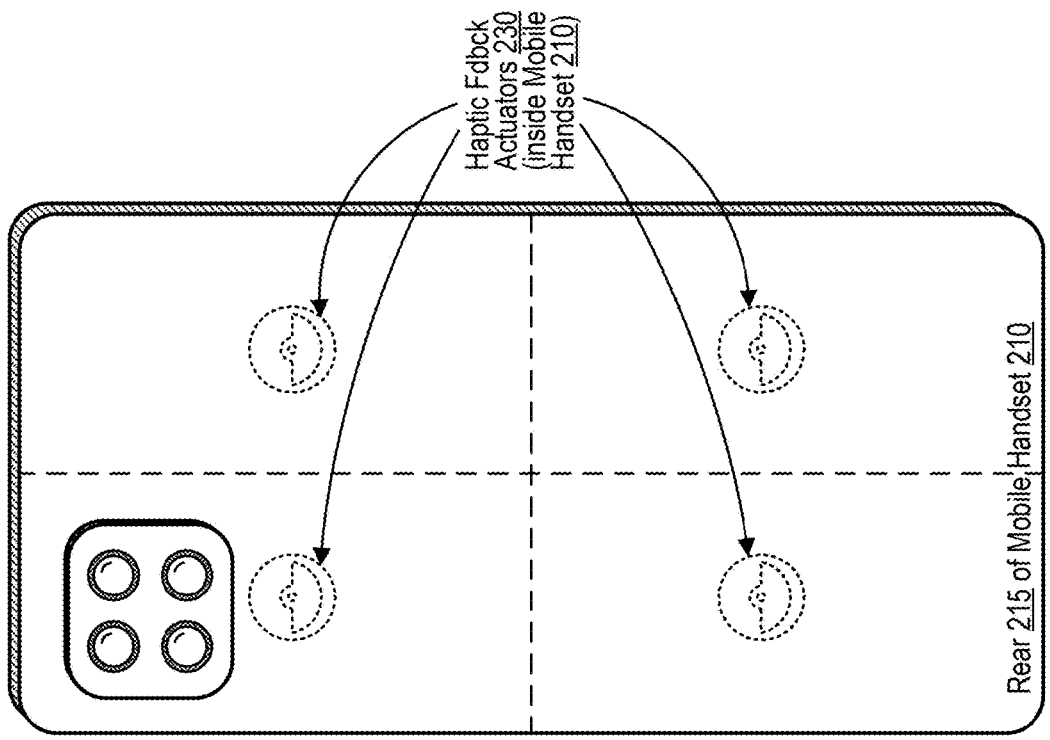
FIG. 2B is a perspective diagram illustrating a rear of the mobile handset with the haptic feedback actuators, in accordance with some examples.
Figure 2A:
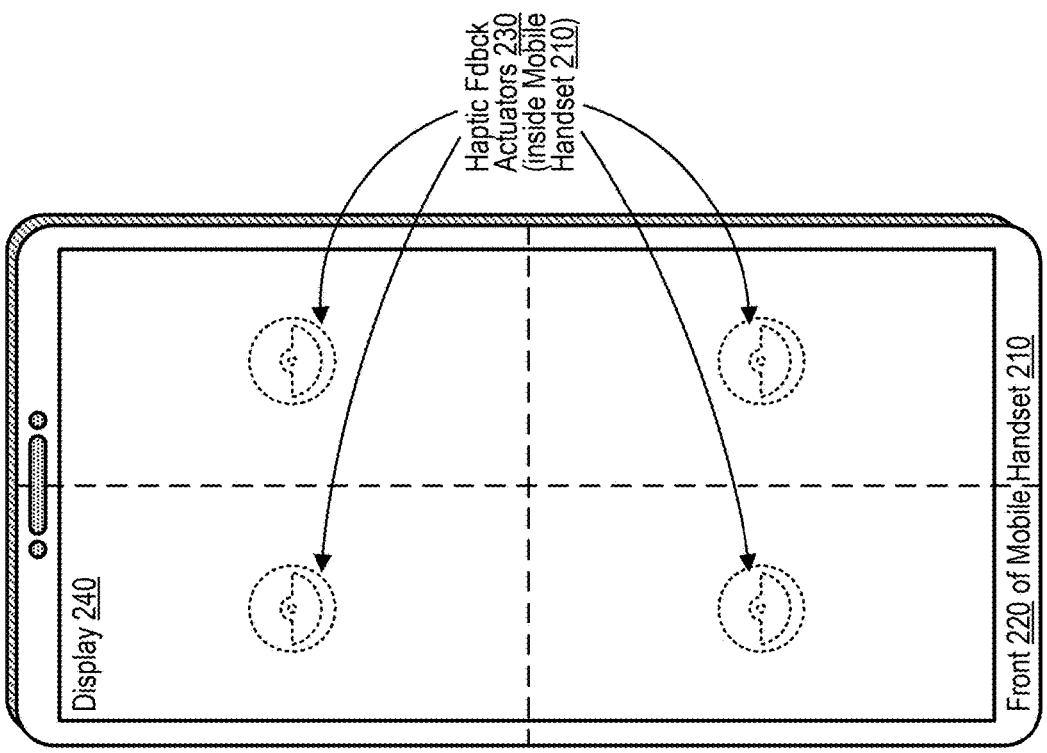
FIG. 2A is a perspective diagram illustrating a front of a mobile handset with haptic feedback actuators, in accordance with some examples.

FIG. 2A is a perspective diagram illustrating a front 220 of a mobile handset 210 with haptic feedback actuators 230. The mobile handset 210 is an example of the media system 100, the second media system 195, and/or the computing system 1500. The front 220 of the mobile handset 210 includes a display 240. The display 240 is an example of the one or more displays 115 and/or the output device 1535. The display 240 may be a touchscreen with a touch-sensitive layer 175.

In some examples, the front 220 of the mobile handset 210 includes one or more additional output devices 110, such as one or more additional displays 115, one or more other visual media output devices, one or more speakers 120, one or more headphone outputs 125, one or more other audio media output devices, or a combination thereof. In some examples, the front 220 of the mobile handset 210 includes one or more additional input devices 170, such as one or more additional touch-sensitive layers 175, one or more buttons 180, one or more sensors 185, or a combination thereof. For example, the front 220 of the mobile handset 210 can include one or more microphones, one or more cameras, one or more accelerometers, one or more gyroscopes, one or more IMUs, one or more depth sensors, or a combination thereof.

The mobile handset 210 includes haptic feedback actuators 230 at least partially inside a housing of the mobile handset 210. The haptic feedback actuators 230 are at least partially between the front 220 of the mobile handset 210 and a rear 215 of the mobile handset 210. The front 220 of the mobile handset 210 is divided into four regions (e.g., quadrants) by a vertical dashed line and a horizontal dashed line as illustrated in FIG. 2A. Each of the regions includes at least one of the haptic feedback actuators 230. In some examples, a mobile handset 210 includes more than four regions (e.g., 5, 6, 7, 8, 9, or 10 regions), each with at least one of the haptic feedback actuators 230. In some examples, the mobile handset 210 has more than four of the haptic feedback actuators 230 (e.g., 5, 6, 7, 8, 9, or 10 haptic feedback actuators). In some examples, a mobile handset 210 includes less than four regions (e.g., 2 or 3 regions), each with at least one of the haptic feedback actuators 230. In some examples, the mobile handset 210 has less than four of the haptic feedback actuators 230 (e.g., 1, 2, or 3 haptic feedback actuators). Each haptic feedback actuator of the haptic feedback actuators 230 is illustrated with dotted lines as a circular motor with a semicircular mass object that is configured to rotate about an axis extending from the center of the circular motor.

In some examples, the media system 100 can include a wearable component, such as a body suit, a vest, a jacket, a head, a headband, an armband, a necklace, a head-mounted display (HMD), a headset, a set of headphones, and the like. The wearable component can include one or more sensors 185 and/or one or more haptic feedback actuators 130. For example, if a player avatar corresponding to the user of the media system 100 gets shot on the right arm in a video game (e.g., the software application(s) 145), the haptic feedback actuators 130 in the wearable component can produce a haptic feedback effect on the right arm of the wearable component (e.g., of the body suit) to mimic, for the user, the location of the shot to the player avatar. In some examples, the haptic feedback pattern can indicate that one or more haptic feedback actuators 130 of a set of headphones and/or a headset can be actuated (e.g., to vibrate).

In some examples, inputs can include inputs to a wearable component, and/or detected by sensor(s) 185 in a wearable component. For instance, the HMD can include sensor(s) 185, such as cameras and/or image sensors capturing images of the user's eyes. The inputs can include eye movements, eye blinks, eye squints, eye focus positions, eye saccades, and the like.

FIG. 2B is a perspective diagram illustrating a rear 215 of the mobile handset 210 with the haptic feedback actuators 230. The rear 215 of the mobile handset 210 includes a camera module with one or more cameras of the one or more sensors 185.

In some examples, the rear 215 of the mobile handset 210 includes one or more output devices 110, such as one or more displays 115, one or more other visual media output devices, one or more speakers 120, one or more headphone outputs 125, one or more other audio media output devices, or a combination thereof. In some examples, the rear 215 of the mobile handset 210 includes one or more input devices 170, such as one or more touch-sensitive layers 175, one or more buttons 180, one or more additional sensors 185, or a combination thereof. For example, the rear 215 of the mobile handset 210 can include one or more microphones, one or more cameras, one or more accelerometers, one or more gyroscopes, one or more IMUs, one or more depth sensors, or a combination thereof.

The mobile handset 210 includes haptic feedback actuators 230 at least partially inside a housing of the mobile handset 210. The haptic feedback actuators 230 are at least partially between the front 220 of the mobile handset 210 and a rear 215 of the mobile handset 210. The rear 215 of the mobile handset 210 is divided into four regions (e.g., quadrants) by a vertical dashed line and a horizontal dashed line as illustrated in FIG. 2A. Each of the regions includes at least one of the haptic feedback actuators 230. In some examples, a mobile handset 210 includes more than four regions (e.g., 5, 6, 7, 8, 9, or 10 regions), each with at least one of the haptic feedback actuators 230. In some examples, a mobile handset 210 includes less than four regions (e.g., 2 or 3 regions), each with at least one of the haptic feedback actuators 230.

Figure 3A:
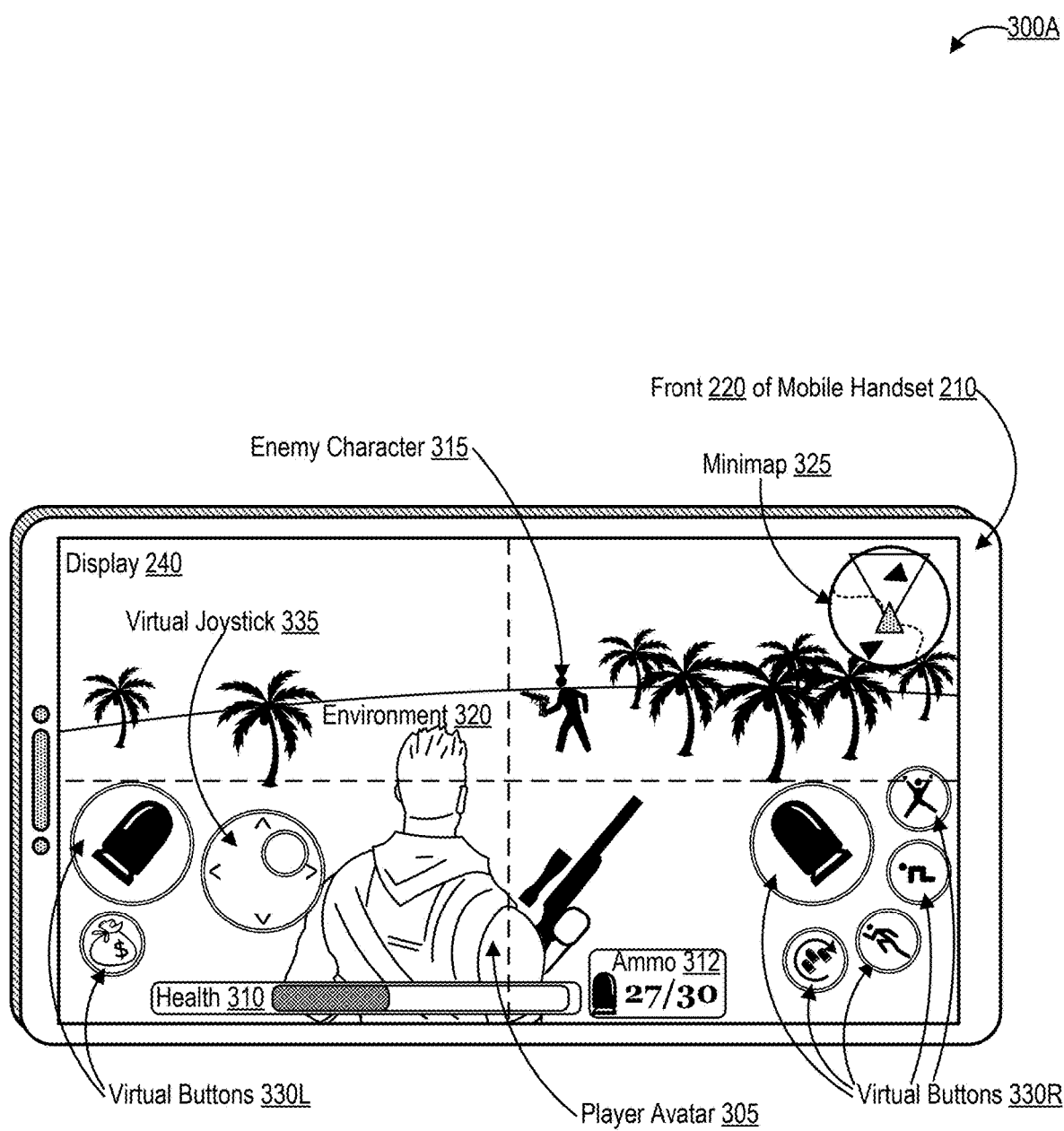
FIG. 3A is a perspective diagram illustrating a front of a mobile handset that is displaying media content associated with a video game, in accordance with some examples.

FIG. 3A is a perspective diagram 300A illustrating a front 220 of a mobile handset 210 that is displaying media content associated with a video game. The mobile handset 210 is displaying visual media content of the media content using the display 240. The visual media content of the media content includes an environment 320. The environment 320 may be fully virtual or partially virtual. The environment 320 may include, and/or be based on, portions of the real-world environment around the mobile handset 210. The environment 320 includes a player avatar 305, who is illustrated as a person holding a weapon (e.g., a gun). A perspective of the environment 320 displayed by the display 240 is focused behind the player avatar 305. The environment 320 also includes an enemy character 315, who may for example be controlled by an artificial intelligence (AI) and/or by a second media system (e.g., second mobile handset and/or second media system 195). The environment 320 includes ground, sky, and other objects, such as trees. In some examples, the environment 320 can include other types of objects, real of virtual, such as structures, vehicles, animals, and the like. The environment 320 can be at least partially generated by a video game and/or XR application, which may be one of the one or more software applications 145.

The display 240 also displays various interface elements associated with the one or more software applications 145. For example, the display 240 displays a health meter 310 and an ammo counter 312. The health meter 310 of FIG. 3A is approximately one-third full, indicating that the user of the mobile handset 210 (represented by the player avatar 305) has approximately one-third of their health remaining within the context of the one or more software applications 145. The ammo counter 312 of FIG. 3A indicates that the weapon held by the player avatar 305 includes 27 bullets out of a possible 30 bullets, within the context of the one or more software applications 145. The display 240 also displays a minimap 325, which illustrates a top-down view of a circular portion of the environment 320. The minimap 325 includes a grey triangle pointing up. The grey triangle represents the position of the player avatar 305 in the environment 320. The minimap 325 includes a white triangle extending from the grey triangle. The white triangle represents the field of view of the environment 320 displayed on the majority of the display 240, representing the area of the environment in front of the player avatar 305. The minimap 325 also illustrates two black triangles, each representing enemy characters. One of the two black triangles is within the white triangle representing the field of view, and corresponds to the position of the enemy character 315 in the environment 320. The other one of the two black triangles is labeled as the second enemy character 350, is behind and to the left of the player avatar 305 in the environment 320, and is thus not otherwise visible to the user of the mobile handset 210 via the view of the environment 320 shown on a majority of the display 240.

The display 240 is a touchscreen display with a touch-sensitive layer 175. The display 240 displays various user interface elements associated with areas of the touch-sensitive layer 175 that correspond to specific inputs to the one or more software applications 145. For instance, the user interface elements include a virtual joystick 335, which a user of the mobile handset 210 can use by sliding the user's finger or stylus within the area of the touch-sensitive layer 175 corresponding to the displayed virtual joystick 335, to control movement(s) of the player avatar 305 within the environment 320, thus having an effect on the environment 320 of causing the player avatar 305 to move within the environment 320.

The user interface elements include a set of virtual buttons, which a user of the mobile handset 210 can use by touching the user's finger or stylus within the area of the touch-sensitive layer 175 corresponding to the displayed virtual buttons, and which each cause the player avatar 305 to perform an action within the environment 320, thus having an effect on the environment 320 of causing the player avatar 305 to perform the action within the environment 320. The virtual buttons include a set of two virtual buttons 330L on the left side of the display 240 and a set of 5 virtual buttons 330R on the right side of the display 240.

The virtual buttons 330L and the virtual buttons 330R each include a fire button, each of which includes an icon of a bullet, which, upon receipt of a touch input (e.g., as in FIG. 3D), causes the player avatar 305 to fire the gun held by the player avatar 305, thus having an effect on the environment 320 of causing the player avatar 305 to fire the weapon within the environment 320. The virtual buttons 330R include a jump button to the upper-right of the fire button of the virtual buttons 330R. The jump button includes an icon of a person jumping. Upon receipt of a touch input, the jump button causes the player avatar 305 to jump, thus having an effect on the environment 320 of causing the player avatar 305 to jump within the environment 320. The virtual buttons 330R include a crouch button to the lower-right of the fire button of the virtual buttons 330R. The crouch button includes an icon of a person crouching. Upon receipt of a touch input, the crouch button causes the player avatar 305 to crouch and/or crawl, thus having an effect on the environment 320 of causing the player avatar 305 to crouch and/or crawl within the environment 320. The virtual buttons 330R include a run/walk button below and slightly to the right of the fire button of the virtual buttons 330R. The crouch button includes an icon of a person running. Upon receipt of a touch input, the run/walk button causes the player avatar 305 to transition between running and walking, thus having an effect on the environment 320 of causing the player avatar 305 to run and/or walk within the environment 320. The virtual buttons 330R include a reload button below and slightly to the left of the fire button of the virtual buttons 330R. The reload button includes an icon of a clockwise circular arrow around a set of bullets. Upon receipt of a touch input, the reload button causes the player avatar 305 to reload the gun, thus having an effect on the environment 320 of causing the player avatar 305 to reload the gun within the environment 320. The virtual buttons 330L include an inventory button below the fire button of the virtual buttons 330L. The inventory button includes an icon of a bag. Upon receipt of a touch input, the inventory button causes the one or more software applications 145 to open an inventory menu to allow the user to view and/or modify the inventory of the player avatar 305, in some cases having an effect on the environment 320 of causing the player avatar 305 to view and/or modify the inventory within the environment 320. In some examples, each of the types of inputs (e.g., each virtual button, virtual joystick 335, physical button, etc.) can be classified into a different category of input, which may in some cases trigger a different haptic feedback pattern.

Figure 3B:
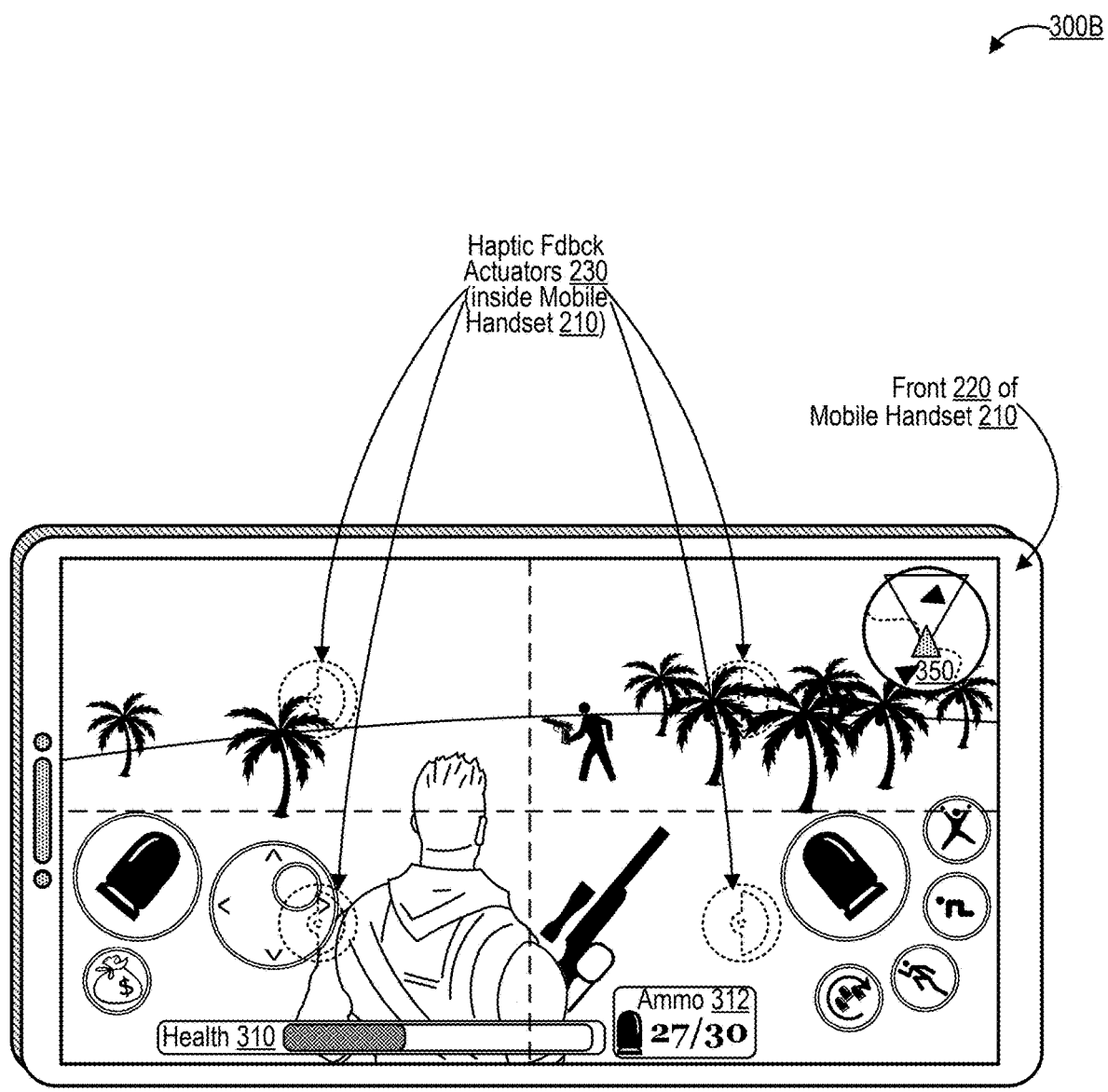
FIG. 3B is a perspective diagram illustrating the mobile handset that is displaying media content associated with the video game and that includes haptic feedback actuators, in accordance with some examples.

FIG. 3B is a perspective diagram 300B illustrating the mobile handset 210 that is displaying media content associated with the video game and that includes haptic feedback actuators 230. As in FIGS. 2A-2B, the mobile handset 210 of FIG. 3A-3H is divided into four regions (e.g., quadrants) by a vertical dashed line and a horizontal dashed line as illustrated in FIG. 2A. Each of the regions includes at least one of the haptic feedback actuators 230 inside the mobile handset 210. Each haptic feedback actuator of the haptic feedback actuators 230 is illustrated with dotted lines as a circular motor with a semicircular mass object that is configured to rotate about an axis extending from the center of the circular motor.

Figure 3C:
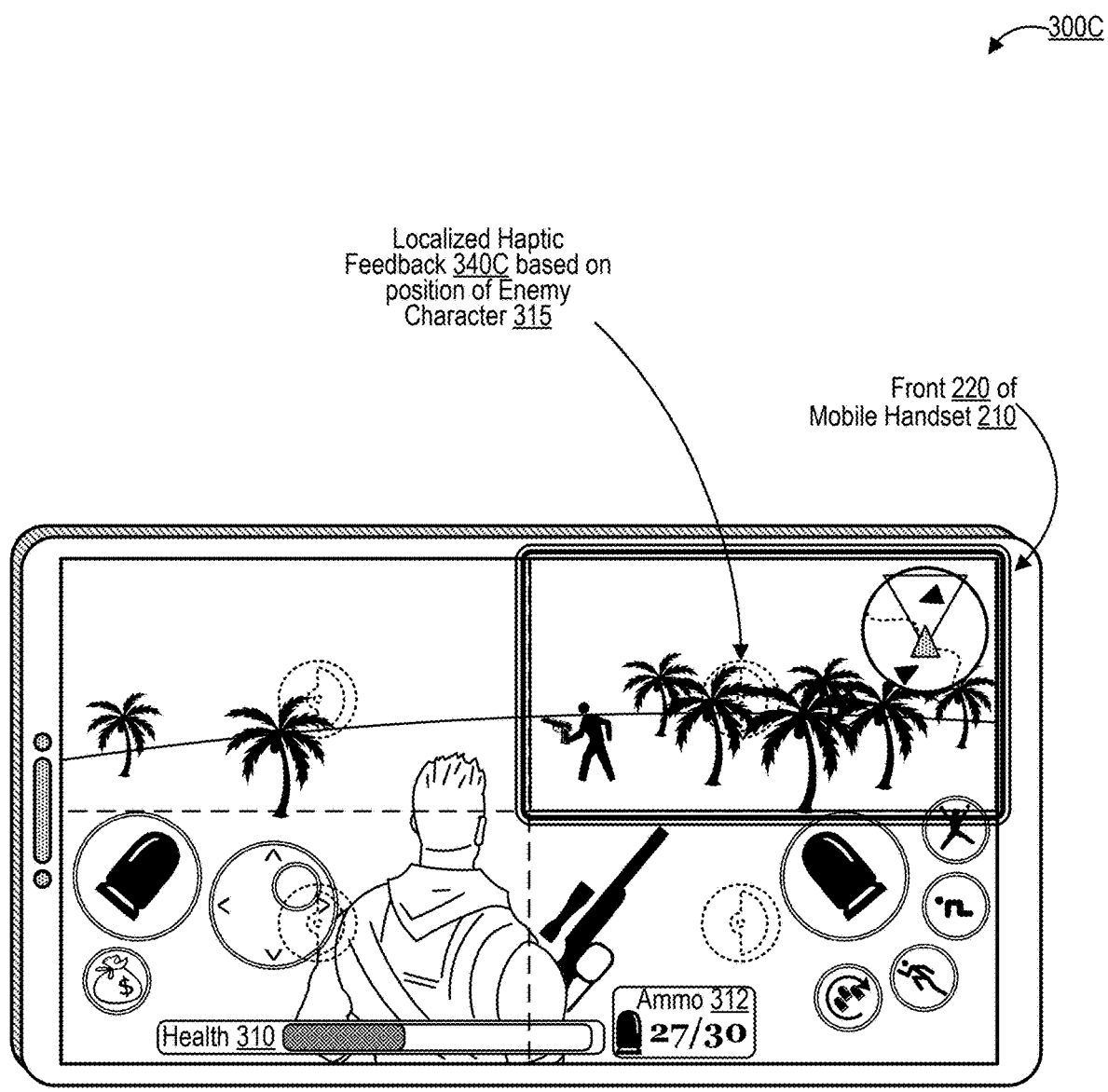
FIG. 3C is a perspective diagram illustrating the mobile handset that that is displaying media content associated with the video game and that is providing localized haptic feedback based on the position of an enemy character in the environment, in accordance with some examples.

FIG. 3C is a perspective diagram 300C illustrating the mobile handset 210 that that is displaying media content associated with the video game and that is providing localized haptic feedback 330C based on the position of an enemy character 315 in the environment. The mobile handset 210 detects a position of the enemy character 315 as displayed on the display 240, for example using one or more trained ML models of the ML engine 150. In some examples, the mobile handset 210 detects the position of the enemy character 315 using the trained ML model 1120 as illustrated in FIG. 11 and/or using the NN 1300 of FIG. 13. In some examples, the mobile handset 210 detects the position of the enemy character 315 by receiving an indication from the software application(s) 145 itself of the position of the enemy character 315. The detection of the enemy character 315 in the environment 320, and/or the detection of the position of the enemy character 315 in the environment 320 as displayed on the display 240, is a condition detected by the mobile handset.

The mobile handset 210 uses the haptic feedback pattern engine 155 to generate a haptic feedback pattern corresponding to the condition. The haptic feedback pattern indicates that one of the haptic feedback actuators 230 (the upper-right haptic feedback actuator as illustrated in FIG. 3C) is actuated by haptic feedback pattern engine 155 and/or the haptic feedback controller 135 of the mobile handset 210 because the position of the enemy character 315 as displayed on the display 240 falls within the upper-right region of the four regions of the mobile handset 210. This provides the localized haptic feedback 330C of the upper-right region of the mobile handset 210 of FIG. 3C. The actuation (e.g., vibration) of the upper-right haptic feedback actuator is illustrated in FIG. 3C as a rounded rectangle with triple-black lines around the upper-right region that the upper-right haptic feedback actuator is located within. In some examples, according to the haptic feedback pattern, the mobile handset 210 actuates the upper-right haptic feedback actuator without actuating the other three haptic feedback actuators of the haptic feedback actuators 230. In some examples, according to the haptic feedback pattern, the mobile handset 210 actuates the upper-right haptic feedback actuator more strongly than at least one of the other three haptic feedback actuators of the haptic feedback actuators 230. The localized haptic feedback 330C can alert the user to look in the upper-right region of the display 240 to look for the enemy character 315.

Figure 3D:
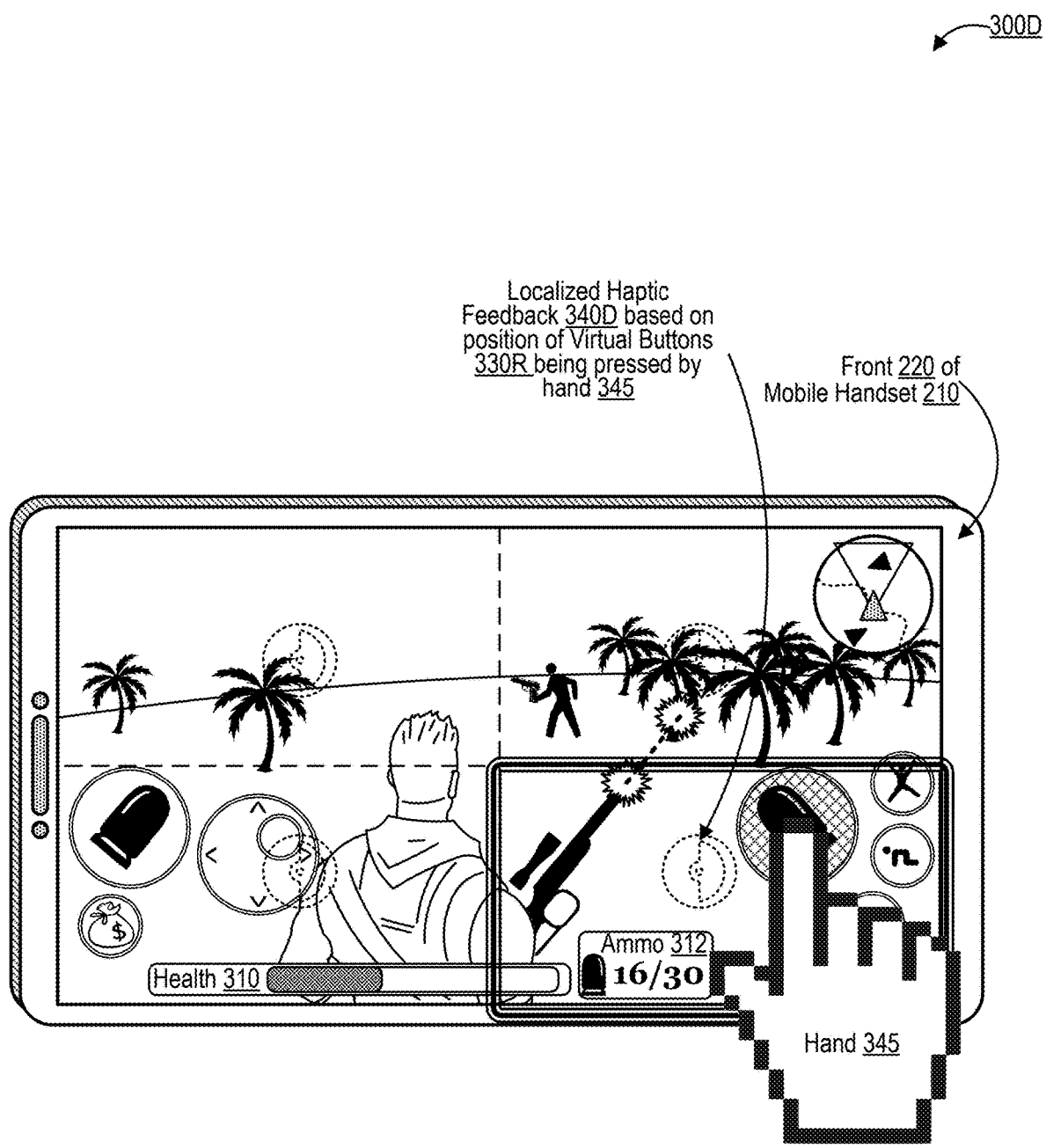
FIG. 3D is a perspective diagram illustrating the mobile handset that that is displaying media content associated with the video game and that is providing localized haptic feedback based on the position of a virtual button that is being pressed by a hand of a user, in accordance with some examples.

FIG. 3D is a perspective diagram 300D illustrating the mobile handset 210 that that is displaying media content associated with the video game and that is providing localized haptic feedback 330D based on the position of a virtual button that is being pressed by a hand 345 of a user. The virtual button that is being pressed by the hand 345 is the fire button of the virtual buttons 330R on the right-hand of the mobile handset 210. The virtual button that is being pressed by the hand 345 (the fire button) is shaded in with a cross-hatched pattern to highlight that the virtual button is being pressed (e.g., that the virtual button is receiving a touch input from the hand 345). The gun held by the player avatar 305 is illustrated as firing at a tree in the environment 320 as a result of the touch input to the virtual button. The detection of the input to the virtual button, and/or the detection that the gun held by the player avatar 305 is illustrated is firing (e.g., based on detection of a muzzle flash graphic as in FIG. 11 or 13, based on detection of a gun firing sound effect as in FIG. 12 or 13, based on detection of a bullet flying and/or striking sound effects as in FIG. 12 or 13, and/or receipt of an indication from the software application (s) 145 itself that the gun is being fired), is a condition detected by the mobile handset 210.

The mobile handset 210 uses the haptic feedback pattern engine 155 to generate a haptic feedback pattern corresponding to the condition. The haptic feedback pattern indicates that one of the haptic feedback actuators 230 (the lower-right haptic feedback actuator as illustrated in FIG. 3D) is actuated by haptic feedback pattern engine 155 and/or the haptic feedback controller 135 of the mobile handset 210 because the position of the virtual button and/or of the gun as displayed on the display 240 falls within the lower-right region of the four regions of the mobile handset 210. This provides the localized haptic feedback 330D of the lower-right region of the mobile handset 210 of FIG. 3D. The actuation (e.g., vibration) of the lower-right haptic feedback actuator is illustrated in FIG. 3D as a rounded rectangle with triple-black lines around the upper-right region that the lower-right haptic feedback actuator is located within. In some examples, according to the haptic feedback pattern, the mobile handset 210 actuates the lower-right haptic feedback actuator without actuating the other three haptic feedback actuators of the haptic feedback actuators 230. In some examples, according to the haptic feedback pattern, the mobile handset 210 actuates the lower-right haptic feedback actuator more strongly than at least one of the other three haptic feedback actuators of the haptic feedback actuators 230. In some examples, the haptic feedback pattern can be generated based on the category of input (e.g., the fire button). The localized haptic feedback 330D can provide tactile feedback to the user so that the user feels a tactile sensation confirming that the user has successfully pressed (provided a touch input to) the virtual button and/or successfully fired the gun as a result.

Figure 3E:
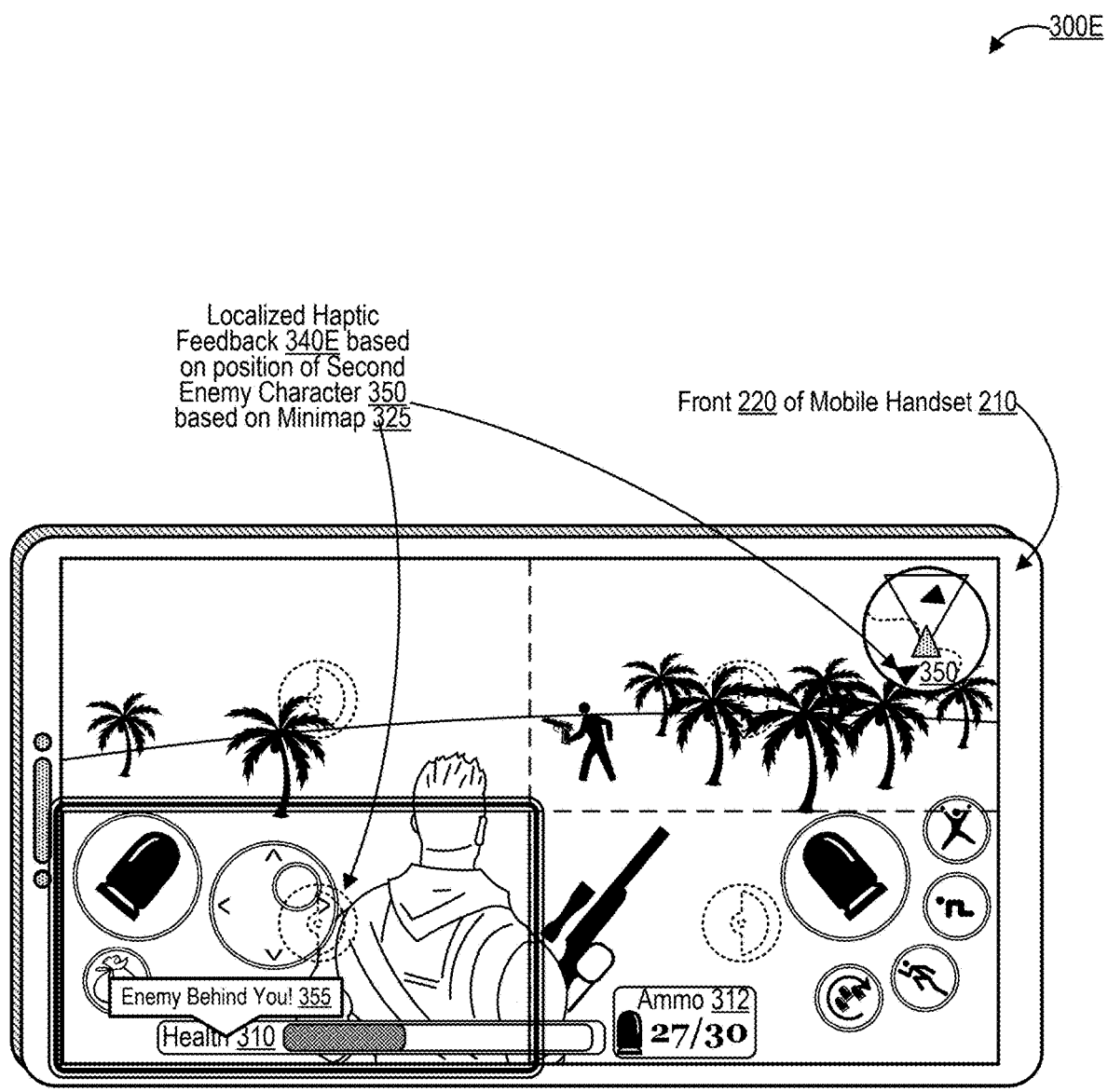
FIG. 3E is a perspective diagram illustrating the mobile handset that that is displaying media content associated with the video game and that is providing localized haptic feedback based on the position of a second enemy character as indicated by the minimap, in accordance with some examples.

FIG. 3E is a perspective diagram 300E illustrating the mobile handset 210 that that is displaying media content associated with the video game and that is providing localized haptic feedback 330E based on the position of a second enemy character 350 as indicated by the minimap 325. The mobile handset 210 detects a position of the second enemy character 350 in the environment 320 as indicated by the minimap 325. In some examples, the mobile handset 210 detects the position of the second enemy character 350 in the environment 320 and/or in the minimap 325 using one or more trained ML models of the ML engine 150. In some examples, the mobile handset 210 detects the position of the second enemy character 350 in the environment 320 and/or in the minimap 325 using the trained ML model 1120 as illustrated in FIG. 11 and/or using the NN 1300 of FIG. 13. In some examples, the mobile handset 210 detects the position of the second enemy character 350 by receiving an indication from the software application(s) 145 itself of the position of the second enemy character 350. The mobile handset 210 modifies the media content of the video game within FIG. 3E using the media content modification engine 160 to overlay a message 355 reading "Enemy Behind You!" with an arrow pointing to the bottom-left.

The detection of the second enemy character 350 in the environment 320, the detection of the second enemy character 350 in the minimap 325, and/or the modification of the media content with the message 355, is a condition detected by the mobile handset.

The mobile handset 210 uses the haptic feedback pattern engine 155 to generate a haptic feedback pattern corresponding to the condition. The haptic feedback pattern indicates that one of the haptic feedback actuators 230 (the bottom-left haptic feedback actuator as illustrated in FIG. 3E) is actuated by haptic feedback pattern engine 155 and/or the haptic feedback controller 135 of the mobile handset 210 because the position of the second enemy character 350 is behind and to the left of the player avatar 305 in the environment 320, and/or because the corresponding message 355 is overlaid over the media content within the bottom-left region of the display 240. This provides the localized haptic feedback 330E of the bottom-left region of the mobile handset 210 of FIG. 3E. The actuation (e.g., vibration) of the bottom-left haptic feedback actuator is illustrated in FIG. 3E as a rounded rectangle with triple-black lines around the bottom-left region that the bottom-left haptic feedback actuator is located within. In some examples, according to the haptic feedback pattern, the mobile handset 210 actuates the bottom-left haptic feedback actuator without actuating the other three haptic feedback actuators of the haptic feedback actuators 230. In some examples, according to the haptic feedback pattern, the mobile handset 210 actuates the bottom-left haptic feedback actuator more strongly than at least one of the other three haptic feedback actuators of the haptic feedback actuators 230. The localized haptic feedback 330E can alert the user to look at the minimap 325 for the second enemy character 350, and/or to turn the player avatar 305, and/or the user's field of view within the video game, to the left to look for the second enemy character 350.

Figure 3F:
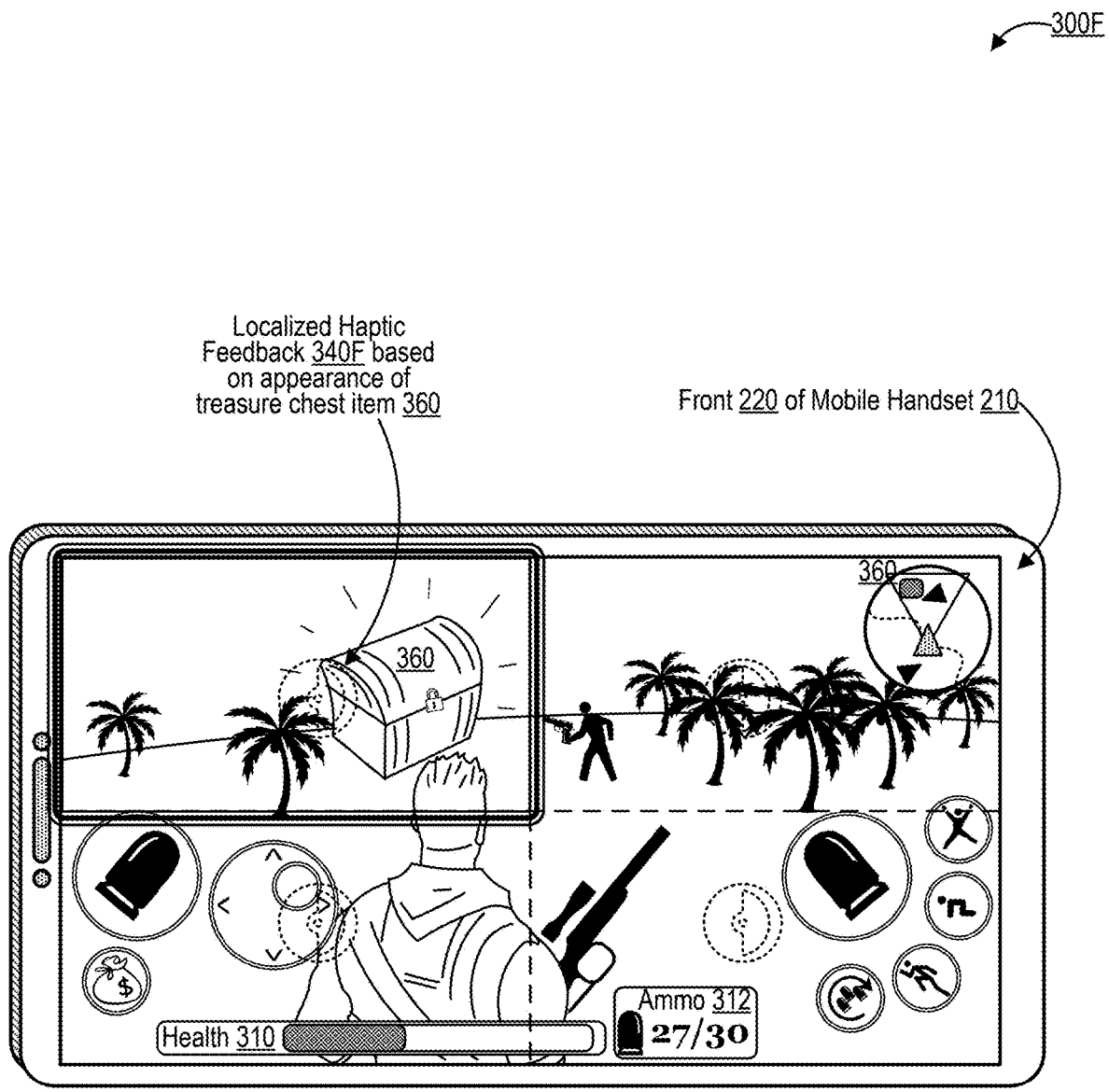
FIG. 3F is a perspective diagram illustrating the mobile handset that that is displaying media content associated with the video game and that is providing localized haptic feedback based on the position of a treasure chest item that appears in the environment, in accordance with some examples.

FIG. 3F is a perspective diagram 300F illustrating the mobile handset 210 that that is displaying media content associated with the video game and that is providing localized haptic feedback 330F based on the position of a treasure chest item 360 that appears in the environment 320. The treasure chest item 360 is visible in the user's field of view of the environment 320, and is displayed in the upper-left region of the display 240. A grey rounded rectangle icon representing the treasure chest item 360 has also been added to the minimap 325 in FIG. 3F. The mobile handset 210 detects a position of the treasure chest item 360 as displayed in the field of view of the environment 320 and/or as indicated by the minimap 325. In some examples, the mobile handset 210 detects the position of the treasure chest item 360 in the environment 320 and/or in the minimap 325 using one or more trained ML models of the ML engine 150. In some examples, the mobile handset 210 detects the position of the treasure chest item 360 in the environment 320 and/or in the minimap 325 using the trained ML model 1120 as illustrated in FIG. 11 and/or using the NN 1300 of FIG. 13. In some examples, appearance of the treasure chest item 360 in the environment 320 is accompanied by a sound effect. In some examples, the mobile handset 210 detects the presence and/or position of the treasure chest item 360 in the environment 320 based on the sound effect, for instance by recognizing the sound effect within an audio track of the video game using one or more trained ML models of the ML engine 150. In some examples, the mobile handset 210 detects the presence and/or position of the treasure chest item 360 in the environment 320 and/or in the minimap 325 using the trained ML model 1220 as illustrated in FIG. 12 and/or using the NN 1300 of FIG. 13, and/or based on audio channel(s) of the sound effect as in FIG. 7. In some examples, the mobile handset 210 detects the position of the treasure chest item 360 by receiving an indication from the software application(s) 145 itself of the position of the treasure chest item 360. The detection of the treasure chest item 360 in the environment 320 and/or the detection of the treasure chest item 360 in the minimap 325 is a condition detected by the mobile handset.

The mobile handset 210 uses the haptic feedback pattern engine 155 to generate a haptic feedback pattern corresponding to the condition. The haptic feedback pattern indicates that one of the haptic feedback actuators 230 (the upper-left haptic feedback actuator as illustrated in FIG. 3F) is actuated by haptic feedback pattern engine 155 and/or the haptic feedback controller 135 of the mobile handset 210 because the position of the treasure chest item 360 as displayed on the display 240 is in the upper-left region of the display 240. This provides the localized haptic feedback 330F of the upper-left region of the mobile handset 210 of FIG. 3F. The actuation (e.g., vibration) of the upper-left haptic feedback actuator is illustrated in FIG. 3F as a rounded rectangle with triple-black lines around the upper-left region that the upper-left haptic feedback actuator is located within. In some examples, according to the haptic feedback pattern, the mobile handset 210 actuates the upper-left haptic feedback actuator without actuating the other three haptic feedback actuators of the haptic feedback actuators 230. In some examples, according to the haptic feedback pattern, the mobile handset 210 actuates the upper-left haptic feedback actuator more strongly than at least one of the other three haptic feedback actuators of the haptic feedback actuators 230. The localized haptic feedback 330F can alert the user to look at the upper-left region of the display 240, and/or at the minimap 325, for the treasure chest item 360.

Figure 3G:
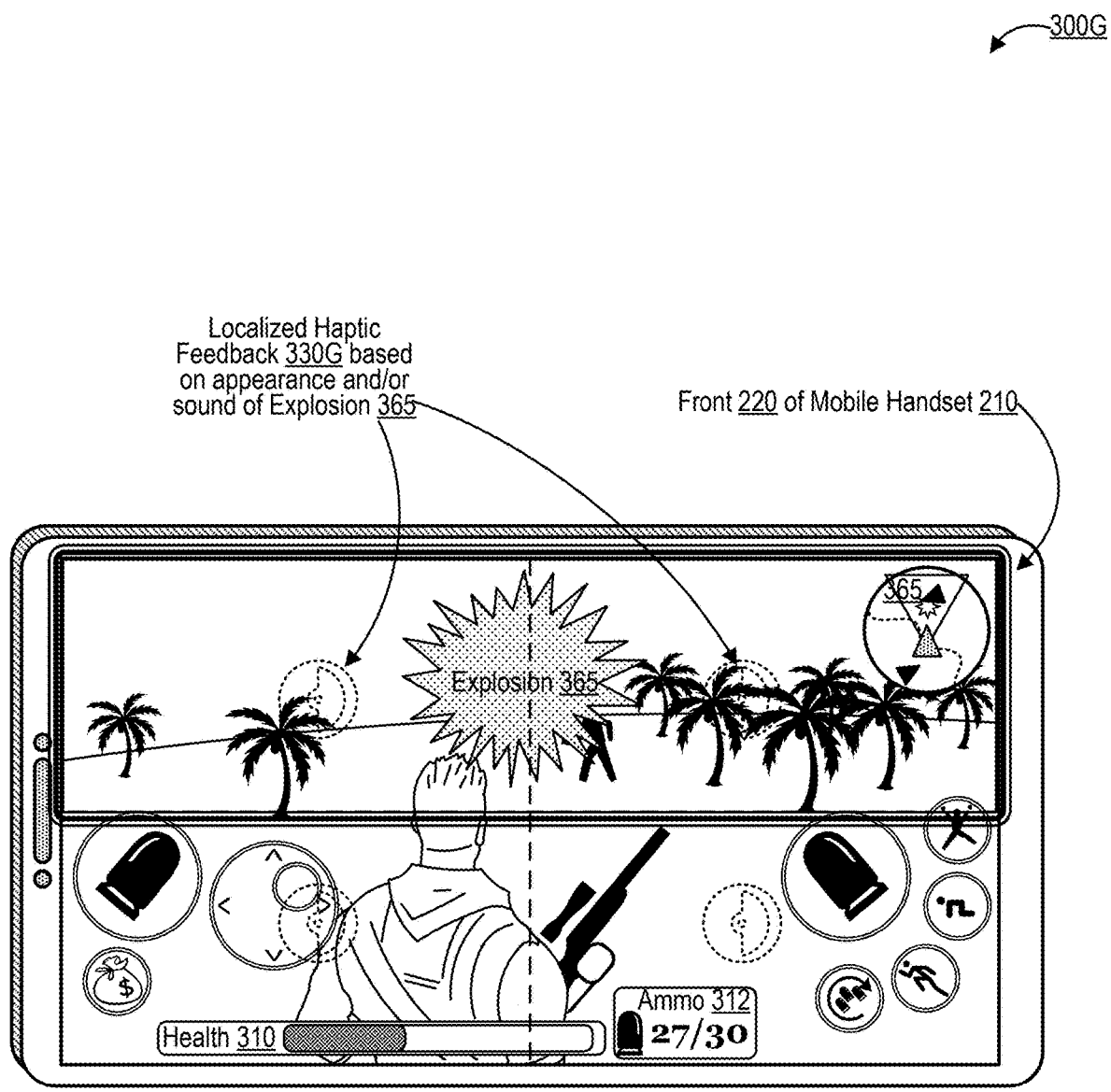
FIG. 3G is a perspective diagram illustrating the mobile handset that that is displaying media content associated with the video game and that is providing localized haptic feedback based on the position of an explosion that appears in the environment, in accordance with some examples.

FIG. 3G is a perspective diagram 300G illustrating the mobile handset 210 that that is displaying media content associated with the video game and that is providing localized haptic feedback 330G based on the position of an explosion 365 that appears in the environment. The explosion 365 is visible in the user's field of view of the environment 320, and is displayed in the upper half of the display 240 (e.g., the upper-left region and the upper-right region of the display 240). An explosion icon representing the explosion 365 has also been added to the minimap 325 in FIG. 3G. The mobile handset 210 detects a position of the explosion 365 in the environment 320 as displayed in the field of view of the environment 320 and/or as indicated by the minimap 325. In some examples, the mobile handset 210 detects the position of the explosion 365 in the environment 320 and/or in the minimap 325 using one or more trained ML models of the ML engine 150. In some examples, the mobile handset 210 detects the position of the explosion 365 in the environment 320 and/or in the minimap 325 using the trained ML model 1120 as illustrated in FIG. 11 and/or using the NN 1300 of FIG. 13. In some examples, appearance of the explosion 365 in the environment 320 is accompanied by a sound effect (e.g., an explosion sound as in FIGS. 4 and 12). In some examples, the mobile handset 210 detects the presence and/or position of the explosion 365 in the environment 320 based on the sound effect, for instance by recognizing the sound effect within an audio track of the video game using one or more trained ML models of the ML engine 150. In some examples, the mobile handset 210 detects the presence and/or position of the explosion 365 in the environment 320 and/or in the minimap 325 using the trained ML model 1220 as illustrated in FIG. 12 and/or using the NN 1300 of FIG. 13, and/or based on audio channel(s) of the sound effect as in FIG. 7. In some examples, the mobile handset 210 detects the position of the explosion 365 by receiving an indication from the software application(s) 145 itself of the position of the explosion 365. The detection of the explosion 365 in the environment 320 and/or the detection of the explosion 365 in the minimap 325 is a condition detected by the mobile handset.

The mobile handset 210 uses the haptic feedback pattern engine 155 to generate a haptic feedback pattern corresponding to the condition. The haptic feedback pattern indicates that two of the haptic feedback actuators 230 (the upper-left haptic feedback actuator and upper-right haptic feedback actuator as illustrated in FIG. 3G) are actuated by haptic feedback pattern engine 155 and/or the haptic feedback controller 135 of the mobile handset 210 because the position of the explosion 365 as displayed on the display 240 is in the upper half of the display 240. This provides the localized haptic feedback 330G of the upper half of the mobile handset 210 of FIG. 3G. The actuation (e.g., vibration) of the upper-left haptic feedback actuator and the upper-right haptic feedback actuator is illustrated in FIG. 3G as a rounded rectangle with triple-black lines around the upper half that the upper-left haptic feedback actuator and the upper-right haptic feedback actuator are located within. In some examples, according to the haptic feedback pattern, the mobile handset 210 actuates the upper-left haptic feedback actuator and the upper-right haptic feedback actuator without actuating the other two haptic feedback actuators of the haptic feedback actuators 230 (e.g., in the bottom half of the mobile handset 210). In some examples, according to the haptic feedback pattern, the mobile handset 210 actuates the upper-left haptic feedback actuator and the upper-right haptic feedback actuator more strongly than at least one of the other two haptic feedback actuators of the haptic feedback actuators 230. The localized haptic feedback 330G can alert the user to look at the upper half of the display 240, and/or at the minimap 325, for the explosion 365. The localized haptic feedback 330G can provide a tactile sensation associated with the explosion 365 to the user, making the explosion 365 feel more real to the user.

Figure 3H:
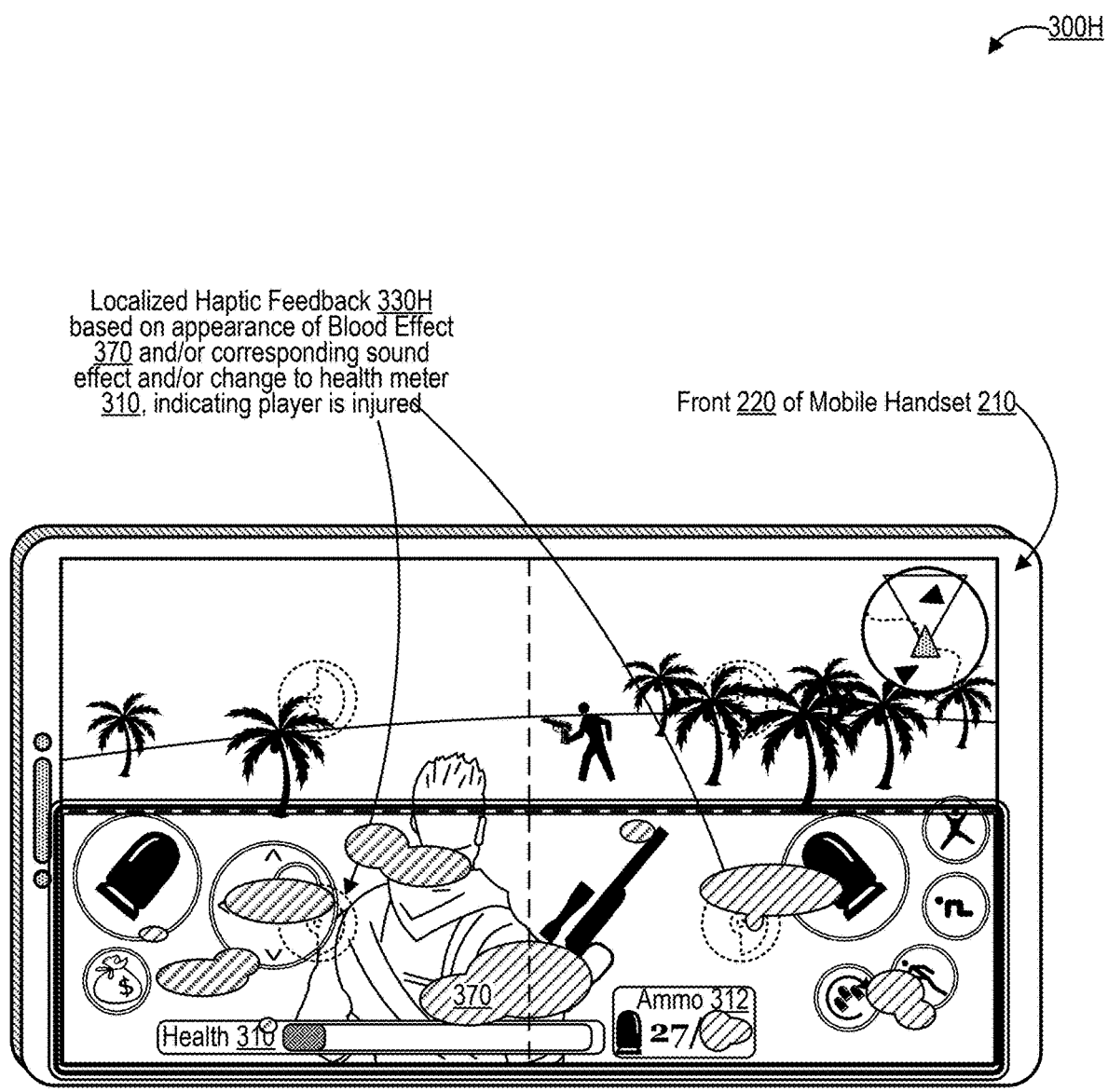
FIG. 3H is a perspective diagram illustrating the mobile handset that that is displaying media content associated with the video game and that is providing localized haptic feedback based on a blood effect appearing over the depiction of the environment, in accordance with some examples.

FIG. 3H is a perspective diagram 300H illustrating the mobile handset 210 that that is displaying media content associated with the video game and that is providing localized haptic feedback 330H based on a blood effect 370 appearing over the depiction of the environment 320. The blood effect 370 is visible overlaid over the user's field of view of the environment 320, and is displayed in the bottom half of the display 240 (e.g., the bottom-left region and the bottom-right region of the display 240). The mobile handset 210 detects a presence and/or position of the blood effect 370 as overlaid over the view of the environment 320. In some examples, the mobile handset 210 detects the presence and/or position of the blood effect 370 as overlaid over the view of the environment 320 using one or more trained ML models of the ML engine 150. In some examples, the mobile handset 210 detects the presence and/or position of the blood effect 370 as overlaid over the view of the environment 320 using the trained ML model 1120 as illustrated in FIG. 11 and/or using the NN 1300 of FIG. 13. In some examples, appearance of the blood effect 370 in the environment 320 is accompanied by a sound effect (e.g., a gasp sound associated with a person suffering an injury). In some examples, the mobile handset 210 detects the presence and/or position of the blood effect 370 as overlaid over the view of the environment 320 based on the sound effect, for instance by recognizing the sound effect within an audio track of the video game using one or more trained ML models of the ML engine 150. In some examples, the mobile handset 210 presence and/or position of the blood effect 370 as overlaid over the view of the environment 320 using the trained ML model 1220 as illustrated in FIG. 12 and/or using the NN 1300 of FIG. 13, and/or based on audio channel(s) of the sound effect as in FIG. 7. In some examples, the mobile handset 210 detects the position of the blood effect 370 by receiving an indication from the software application(s) 145 itself of the injury to the player and/or of the presence and/or position of the blood effect 370. The blood effect 370 is also accompanied by a reduction in the health of the player avatar 305 as indicated by a reduction in health in the health meter 310. The mobile handset 210 can detect the reduction in health in the health meter 310, for instance using the one or more trained ML models of the ML engine 150. In some examples, the mobile handset 210 detects the reduction in health in the health meter 310 using the trained ML model 1120 as illustrated in FIG. 11 and/or using the NN 1300 of FIG. 13. In some examples, the mobile handset 210 detects the reduction in health in the health meter 310 by receiving an indication from the software application(s) 145 itself of the injury to the player and/or of the reduction in health in the health meter 310. The detection of the presence and/or position of the blood effect 370 as overlaid over the view of the environment 320, and/or of the accompanying sound effect, and/or the reduction in health in the health meter 310, is a condition detected by the mobile handset.

The mobile handset 210 uses the haptic feedback pattern engine 155 to generate a haptic feedback pattern corresponding to the condition. The haptic feedback pattern indicates that two of the haptic feedback actuators 230 (the bottom-left haptic feedback actuator and bottom-right haptic feedback actuator as illustrated in FIG. 3H) are actuated by haptic feedback pattern engine 155 and/or the haptic feedback controller 135 of the mobile handset 210 because the position of the blood effect 370 as displayed on the display 240 is in the bottom half of the display 240. This provides the localized haptic feedback 330H of the bottom half of the mobile handset 210 of FIG. 3H. The actuation (e.g., vibration) of the bottom-left haptic feedback actuator and the bottom-right haptic feedback actuator is illustrated in FIG. 3H as a rounded rectangle with triple-black lines around the bottom half that the bottom-left haptic feedback actuator and the bottom-right haptic feedback actuator are located within. In some examples, according to the haptic feedback pattern, the mobile handset 210 actuates the bottom-left haptic feedback actuator and the bottom-right haptic feedback actuator without actuating the other two haptic feedback actuators of the haptic feedback actuators 230 (e.g., in the upper half of the mobile handset 210). In some examples, according to the haptic feedback pattern, the mobile handset 210 actuates the bottom-left haptic feedback actuator and the bottom-right haptic feedback actuator more strongly than at least one of the other two haptic feedback actuators of the haptic feedback actuators 230. The localized haptic feedback 330H can alert the user to look at the bottom half of the display 240 for the blood effect 370. The localized haptic feedback 330H can provide a tactile sensation associated with the injury to the player avatar 305, making the injury feel more real to the user.

Figure 4:
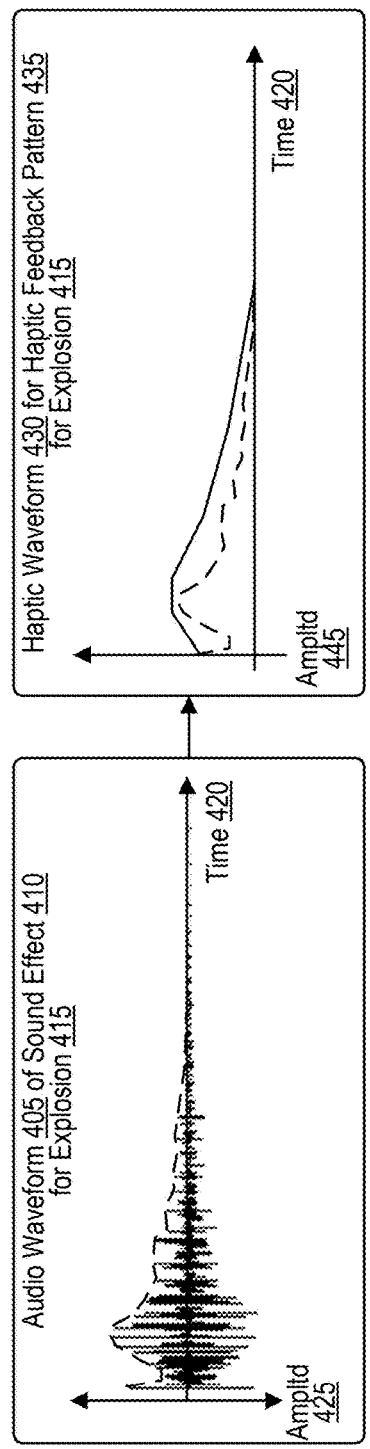
FIG. 4 is a conceptual diagram illustrating generation of a haptic waveform for a haptic feedback pattern based on an audio waveform of a sound effect, in accordance with some examples.

FIG. 4 is a conceptual diagram 400 illustrating generation of a haptic waveform 430 for a haptic feedback pattern 435 based on an audio waveform 405 of a sound effect 410. An audio waveform 405 of a sound effect 410 for an explosion 415 is illustrated on the left-hand side of FIG. 4. The audio waveform 405 of the sound effect 410 is plotted against a horizontal time axis 420 and a vertical amplitude axis 425 indicating audio amplitude. The audio waveform 405 includes a high amplitude burst that expands high along the vertical amplitude axis 425 early along the time axis 420. The burst reduces to a lower amplitude along the vertical amplitude axis 425 further along the time axis 420. A dashed line outlines the positive side of the audio waveform 405 for illustrative purposes.

The haptic feedback pattern engine 155 generates a haptic waveform 430 for a haptic feedback pattern 435 for the explosion 415 based on the audio waveform 405 for the sound effect 410 of the explosion 415. The haptic waveform 430 is plotted against the horizontal time axis 420 and a vertical amplitude axis 445 indicating haptic feedback amplitude, intensity, and/or strength. A copy of the dashed line outlining the positive side of the audio waveform 405 is reproduced to show that the haptic waveform 430 is based on the audio waveform 405. For instance, like the audio waveform 405, the haptic waveform 430 includes a high amplitude burst that expands high along the vertical amplitude axis 445 early along the time axis 420. The burst reduces to a lower amplitude along the vertical amplitude axis 445 further along the time axis 420.

In an illustrative example, the explosion 415 may be the explosion 365 of FIG. 3G. A similar process to the one discussed above with respect to the explosion 415 may be used for other sound effects, such as sound effects corresponding to items (e.g., the treasure chest item 360), sound effects corresponding to effects on the player (e.g., injuries corresponding to the blood effect 370, sounds for the player running or jumping or crawling or performing another action), and the like.

In some examples, the haptic waveform 430 for the haptic feedback pattern 435 for the explosion 415 can be based on the visual intensity of the explosion 415 instead of, and/or in addition to, the audio waveform 405 for the sound effect 410 of the explosion 415. For example, the haptic waveform 430 for the haptic feedback pattern 435 for the explosion 415 can be based on the size, brightness, and/or color saturation of the explosion 415.

Figure 5:
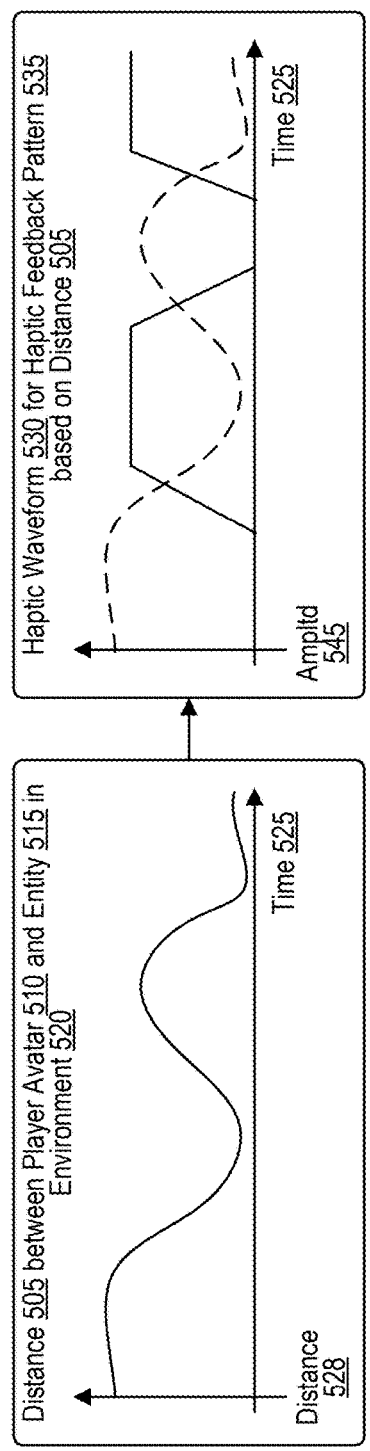
FIG. 5 is a conceptual diagram illustrating generation of a haptic waveform for a haptic feedback pattern based on a proximity of a player avatar to an entity in the environment, in accordance with some examples.

FIG. 5 is a conceptual diagram 500 illustrating generation of a haptic waveform 530 for a haptic feedback pattern 535 based on a proximity of a player avatar 510 to an entity 515 in the environment 520. A distance 505 of the player avatar 510 to the entity 515 in the environment 520 is plotted against a horizontal time axis 525 and a vertical distance axis 528 representing how far the player avatar 510 is to the entity 515 in the environment 520 at different times. The distance 505 starts with a high distance 505 along the vertical distance axis 528 (a low proximity), then dips to a low distance 505 along the vertical distance axis 528 (a high proximity), then returns to a high distance 505 along the vertical distance axis 528 (a low proximity), then returns to a low distance 505 along the vertical distance axis 528 (a high proximity).

The haptic feedback pattern engine 155 generates a haptic waveform 530 for a haptic feedback pattern 535 based on the distance 505. The haptic waveform 530 is plotted against the horizontal time axis 525 and a vertical amplitude axis 545 indicating haptic feedback amplitude, intensity, and/or strength. A copy of the distance 505 graph is reproduced as a dashed line to show that the haptic waveform 530 is based on the distance 505. In particular, the haptic waveform 530 increases in haptic feedback amplitude along the vertical amplitude axis 545 whenever the distance 505 dips (and thus the proximity between the player avatar 510 to the entity 515 in the environment 520 increases).

The environment 320 may be an example of the environment 520. The player avatar 305 may be an example of the player avatar 510. Examples of the entity 515 in the environment 520 may include, for example, the enemy character 315, the second enemy character 350, the treasure chest item 360, the explosion 365, and the like.

Figure 6:
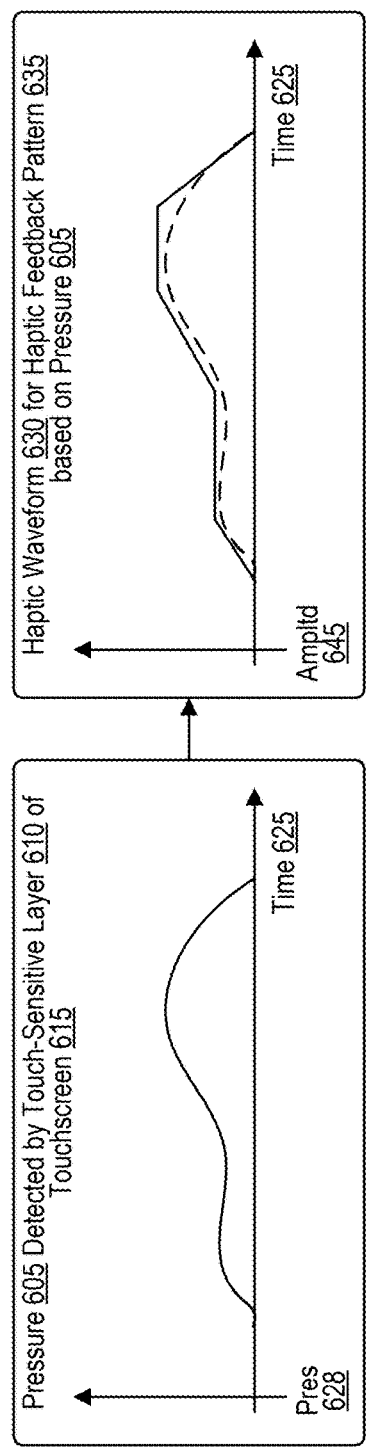
FIG. 6 is a conceptual diagram illustrating generation of a haptic waveform for a haptic feedback pattern based on a pressure detected by a touch-sensitive layer of a touchscreen, in accordance with some examples.

FIG. 6 is a conceptual diagram 600 illustrating generation of a haptic waveform 630 for a haptic feedback pattern 635 based on a pressure 605 detected by a touch-sensitive layer 610 of a touchscreen 615. A waveform for the pressure 605 detected by the touch-sensitive layer 610 of the touchscreen 615 is illustrated on the left-hand side of FIG. 6. The touch-sensitive layer 610 may be an example of the touch-sensitive layer 175. The touchscreen 615 may be an example of the display(s) 115. The waveform for the pressure 605 is plotted against a horizontal time axis 625 and a vertical pressure axis 628 indicating pressure amplitude, strength, and/or intensity. The waveform for the pressure 605 starts at a zero level of pressure 605 along the vertical pressure axis 628 early along the time axis 625, moves to a low level of pressure 605 along the vertical pressure axis 628 later along the time axis 625, rises to a higher level of pressure 605 along the vertical pressure axis 628 later along the time axis 625, and then falls back to a zero level of pressure 605 along the vertical pressure axis 628 later along the time axis 625.

The haptic feedback pattern engine 155 generates a haptic waveform 630 for a haptic feedback pattern 635 based on the waveform for the pressure 605. The haptic waveform 630 is plotted against the horizontal time axis 620 and a vertical amplitude axis 645 indicating haptic feedback amplitude, intensity, and/or strength. A copy of the waveform for the pressure 605 is reproduced as a dashed line to show that the haptic waveform 630 is based on the waveform for the pressure 605. For instance, like the waveform for the pressure 605, the haptic waveform 630 starts at a zero level of haptic feedback along the vertical amplitude axis 645 early along the time axis 625, moves to a low level of haptic feedback along the vertical amplitude axis 645 later along the time axis 625, rises to a higher level of haptic feedback along the vertical amplitude axis 645 later along the time axis 625, and then falls back to a zero level of haptic feedback along the vertical amplitude axis 645 later along the time axis 625.

Figure 7:
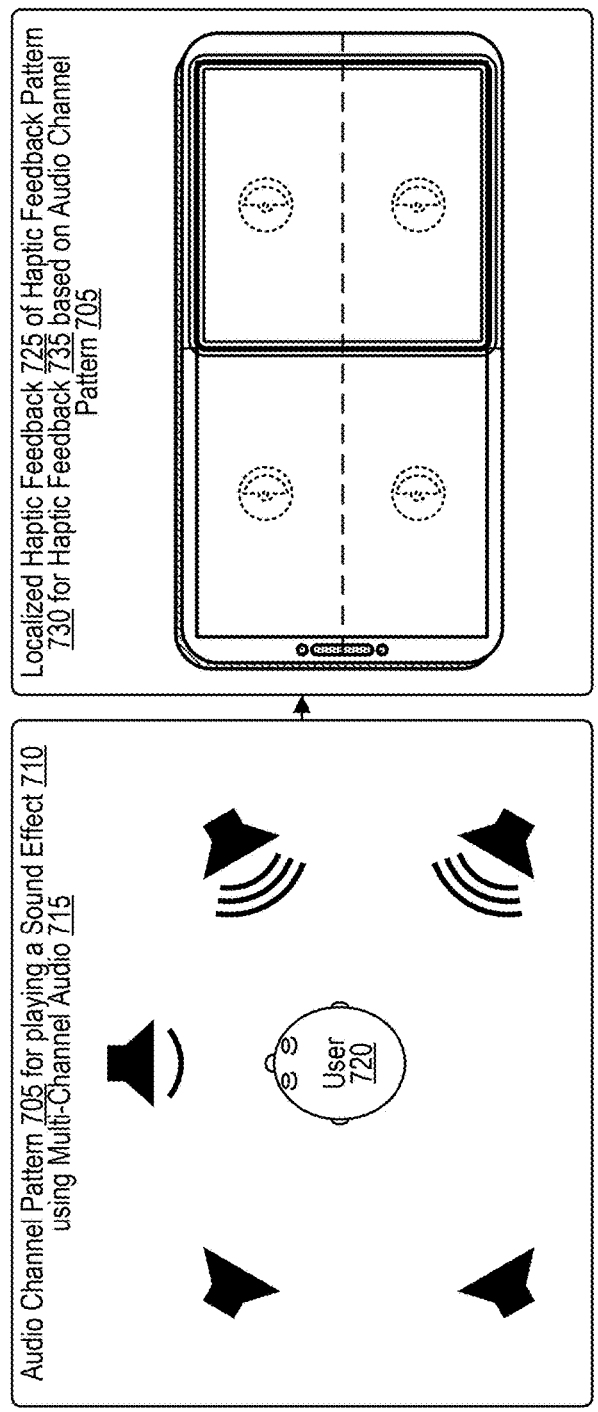
FIG. 7 is a conceptual diagram illustrating generation of a localized layout for a haptic feedback pattern based on an audio channel pattern for playing a sound effect using multi-channel audio, in accordance with some examples.

FIG. 7 is a conceptual diagram 700 illustrating generation of a localized haptic feedback 725 for a haptic feedback pattern 730 based on an audio channel pattern 705 for playing a sound effect 710 using multi-channel audio 715. A top-down view of a multi-channel audio 715 playing, and/or being configured to play, the sound effect 710 to the user 720 is illustrated on the left- and side of FIG. 7. This top-down view represents the audio channel pattern 705. In the example illustrated in FIG. 7, the multi-channel audio 715 is illustrated as 5.1 channel surround sound. In some examples, the multi-channel audio 715 may include stereo audio, binaural audio, 2.1 channel audio, 3.1 channel audio, 4.1 channel audio, 5.1 channel surround sound, 6.1 channel surround sound, 7.1 channel surround sound, two-dimensional (2D) audio, three-dimensional (3D) audio, spatial audio, or combinations thereof. In the top-down view of the multi-channel audio 715 representing the audio channel pattern 705, the two speakers on the right-hand side with the three audio wave lines emanating therefrom are playing the sound effect 710 loudly (e.g., high amplification), the front speaker with the one audio wave line emanating therefrom is playing the sound effect 710 quietly (e.g., low amplification), and the two speakers on the left-hand side with no audio wave lines emanating therefrom are not playing the sound effect 710 at all, or are playing the sound effect 710 very quietly. Thus, the top-down view representing the audio channel pattern 705 indicates that the sound effect 710 is primarily played, and/or configured to be played, using the right-hand channels of the multi-channel audio 715. In some examples, the audio channel pattern 705 represents playback of the sound effect 710 using one or more speakers 120. In some examples, the audio channel pattern 705 represents playback of the sound effect 710 using a headphone output 125 (e.g, a set of headphones and/or a headset).

The haptic feedback pattern engine 155 generates a localized haptic feedback 725 for a haptic feedback pattern 730 for the haptic feedback 735 based on the audio channel pattern 705. In particular, because the audio channel pattern 705 indicates that the sound effect 710 is primarily played, and/or configured to be played, using the right-hand channels of the multi-channel audio 715, the localized haptic feedback 725 for the haptic feedback pattern 730 for the haptic feedback 735 actuates the haptic feedback actuators on the right-hand side of the mobile handset 210. The actuation of the haptic feedback actuators on the right-hand side of the mobile handset 210 is illustrated on the right-hand side of FIG. 7 as a rounded rectangle with triple-black lines around the right half of the mobile handset, which the that the upper-right haptic feedback actuator and the bottom-right haptic feedback actuator are both located within.

The haptic feedback pattern 730 indicates that two of the haptic feedback actuators 230 (the upper-right haptic feedback actuator and the bottom-right haptic feedback actuator as illustrated in FIG. 7) are actuated by haptic feedback pattern engine 155 and/or the haptic feedback controller 135 of the mobile handset 210. In some examples, according to the haptic feedback pattern, the mobile handset 210 actuates the upper-right haptic feedback actuator and the bottom-right haptic feedback actuator without actuating the other two haptic feedback actuators of the haptic feedback actuators 230 (e.g., in the left half of the mobile handset 210). In some examples, according to the haptic feedback pattern, the mobile handset 210 actuates the upper-right haptic feedback actuator and the bottom-right haptic feedback actuator more strongly than at least one of the other two haptic feedback actuators of the haptic feedback actuators 230. The localized haptic feedback 725 can provide a tactile sensation associated with the sound effect 710 playing through the multi-channel audio 715, which can provide improved accessibility for hearing-impaired users, and/or which can provide an improved access to the multi-channel audio 715 representation of the sound effect 710 even if the sound effect 710 actually ends up being played to the user without its multi-channel audio 715 aspects (e.g., through a mono speaker).

Figure 8:
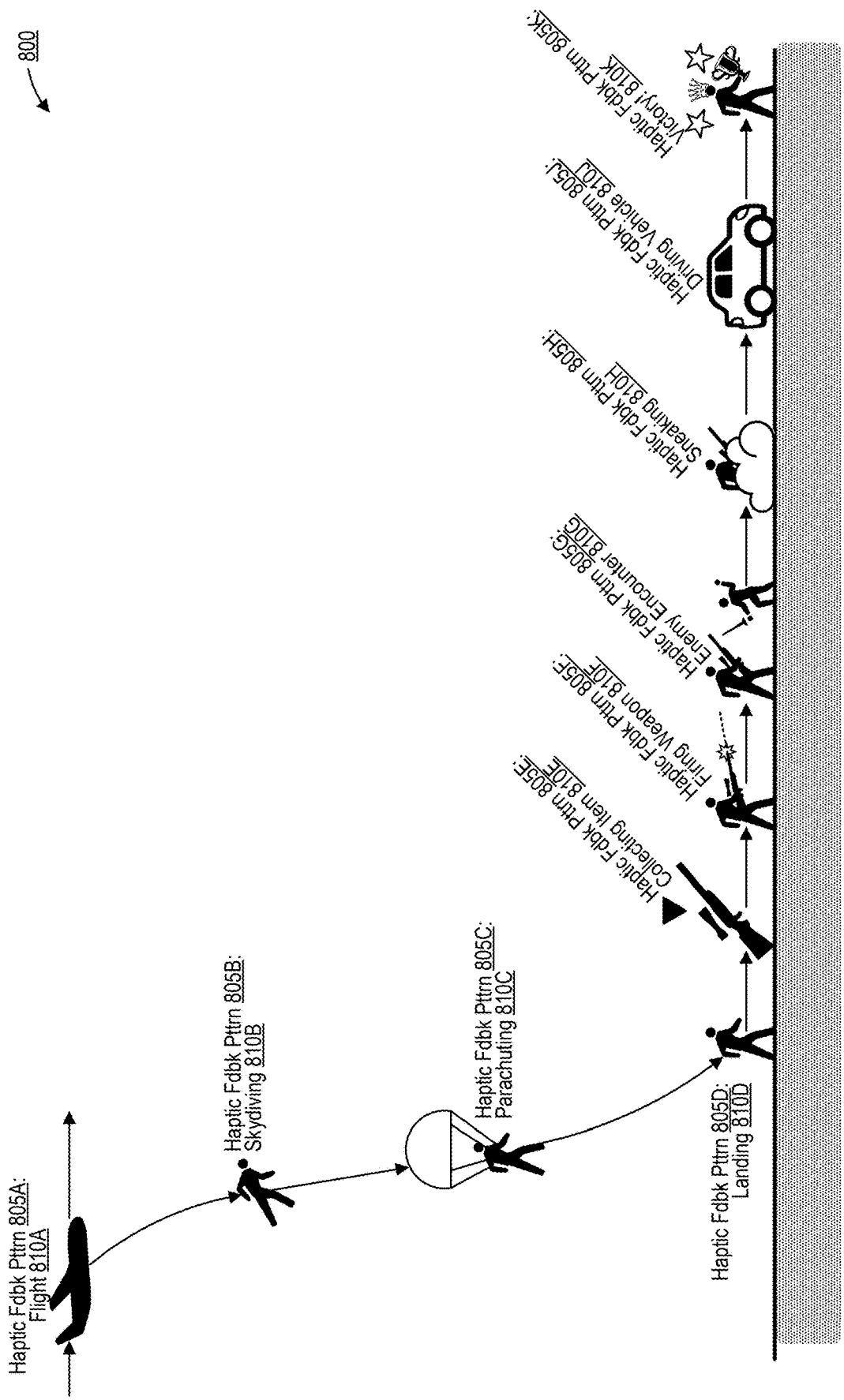
FIG. 8 is a conceptual diagram illustrating various actions undertaken using a player avatar in a video game that can correspond to different haptic feedback patterns, in accordance with some examples.

FIG. 8 is a conceptual diagram 800 illustrating various actions undertaken using a player avatar in a video game that can correspond to different haptic feedback patterns 805A-805K. Examples of the player avatar include the player avatar 305 and the player avatar 510. Numerous representations of the player avatar are illustrated in FIG. 8 as humanoid figures performing the various actions. The various actions are arranged according to a sequence of actions.

The sequence of actions begins with flight 810A of the player avatar in an airplane in the video game. The flight 810A corresponds to a haptic feedback pattern 805A, which may be generated by the haptic feedback pattern engine 155 to simulate a feeling of being on a flight (e.g., to simulate vibrations of airplane turbulence). Next in the sequence of actions is skydiving 810B of the player avatar from the airplane in the video game. The skydiving 810B corresponds to a haptic feedback pattern 805B, which may be generated by the haptic feedback pattern engine 155 to simulate a feeling of skydiving (e.g., to simulate vibrations of air whipping against a person while skydiving). Next in the sequence of actions is parachuting 810C of the player avatar from the airplane in the video game. The parachuting 810C corresponds to a haptic feedback pattern 805C, which may be generated by the haptic feedback pattern engine 155 to simulate a feeling of parachuting (e.g., to simulate the tug of the parachute against the person while parachuting). Next in the sequence of actions is landing 810D of the player avatar on the ground in the video game. The landing 810D corresponds to a haptic feedback pattern 805D, which may be generated by the haptic feedback pattern engine 155 to simulate a feeling of landing from a fall (e.g., to simulate the impact of landing from a fall).

Next in the sequence of actions is collecting an item 810E (a weapon) by the player avatar in the video game. The collecting of the item 810E (the weapon) corresponds to a haptic feedback pattern 805E, which may be generated by the haptic feedback pattern engine 155 to represent a feeling of collecting an item (e.g., to represent the weight of the item being placed into the player's hands). Next in the sequence of actions is firing the weapon 810F by the player avatar in the video game. The firing of the weapon 810F corresponds to a haptic feedback pattern 805F, which may be generated by the haptic feedback pattern engine 155 to represent a feeling of firing a weapon (e.g., to simulate the feeling of recoil from gunfire). Next in the sequence of actions is an enemy encounter 810G by the player avatar in the video game. The enemy encounter 810G corresponds to a haptic feedback pattern 805G, which may be generated by the haptic feedback pattern engine 155 as an alert of the presence and/or position of the enemy character (e.g., as in FIGS. 3C, 3E, and/or 5), to represent a feeling of firing a weapon at the enemy (e.g., to simulate the feeling of recoil from gunfire or impact of a melee attack), to represent a feeling of being fired at by the enemy's weapon (e.g., to simulate an impact from gunfire or impact from a melee attack). Next in the sequence of actions is sneaking 810H through bushes by the player avatar in the video game. The sneaking 810H through bushes corresponds to a haptic feedback pattern 805H, which may be generated by the haptic feedback pattern engine 155 to represent a feeling of sneaking 810H through bushes (e.g., to represent the friction of the bush against the person and/or the snags of twigs snagging on the person's outfit). Next in the sequence of actions is driving a vehicle 810J (a car) by the player avatar in the video game. The driving of the vehicle 810J (the car) corresponds to a haptic feedback pattern 805J, which may be generated by the haptic feedback pattern engine 155 to represent a feeling of driving a vehicle (e.g., to represent the rumble of the engine). Next in the sequence of actions is a victory 810K by the player avatar in the video game. The victory 810K corresponds to a haptic feedback pattern 805K, which may be generated by the haptic feedback pattern engine 155 to alert the user that they are victorious.

The various haptic feedback patterns 805A-805K can each feel different, for example with respect to localization of the haptic feedback, frequency of the haptic feedback, intensity and/or amplitude of the haptic feedback, waveform of the haptic feedback, or a combination thereof. Other actions can also correspond to different haptic feedback patterns that can feel different from one another. For example, the player avatar walking can have a corresponding haptic feedback pattern, the player avatar running can have another corresponding haptic feedback pattern, the player avatar jumping can have another corresponding haptic feedback pattern, the player avatar crawling can have another corresponding haptic feedback pattern, and the like. These different haptic feedback patterns can feel different.

Figure 9:
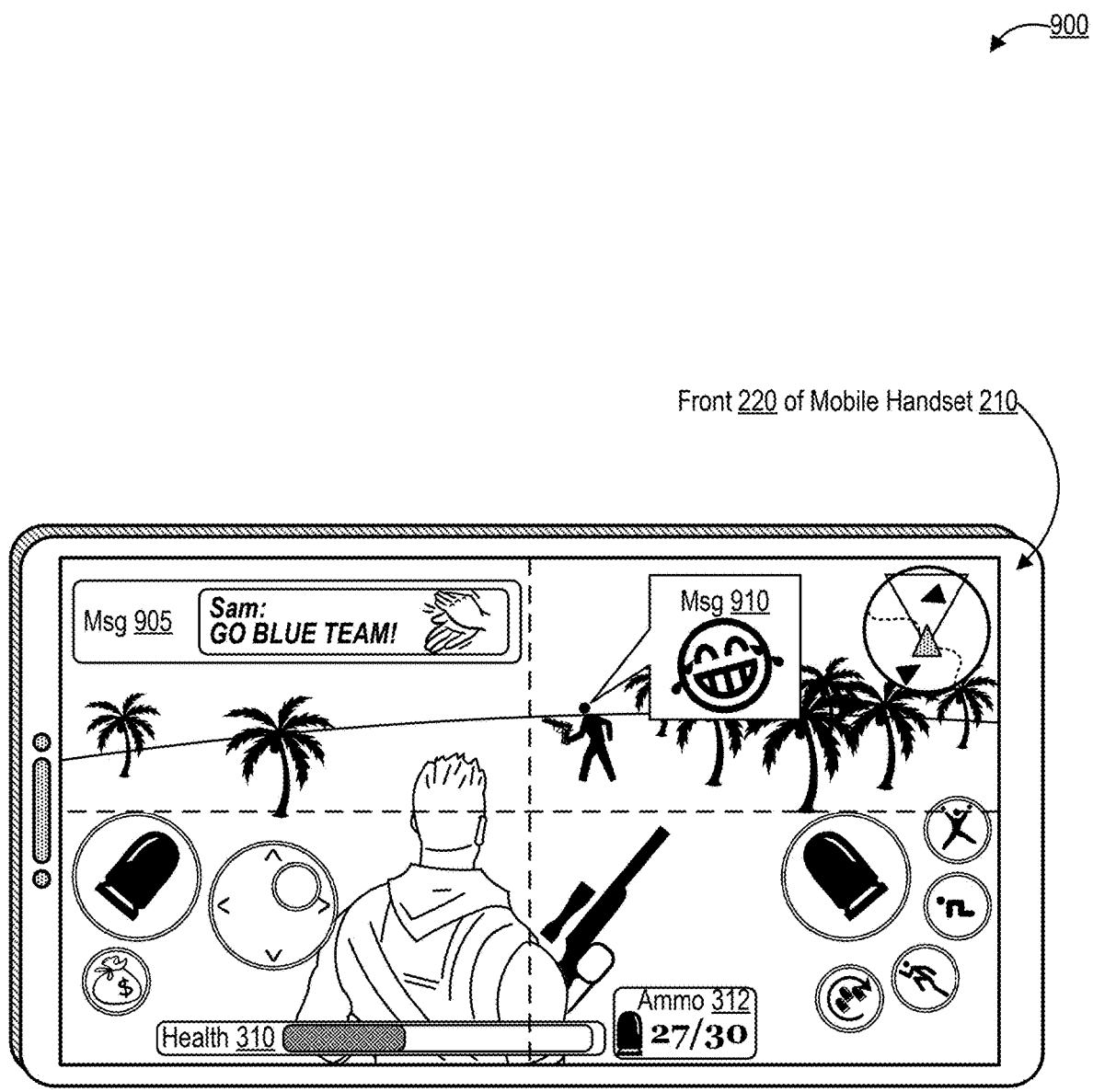
FIG. 9 is a perspective diagram illustrating the mobile handset that that is displaying messages from other users using other devices incorporated into media content associated with the video game, in accordance with some examples.

FIG. 9 is a perspective diagram 900 illustrating the mobile handset 210 that that is displaying messages from other users using other devices incorporated into media content associated with the video game. The messages are overlaid over the media content by the media content modification engine 160, so that the messages appear overlaid over the view of the environment 320 as displayed by the display 240. The messages include a message 905 and a message 910. The message 905 and a message 910 may be received via a communication transceiver 190 from a second mobile handset, such as the second media system 195. The message 905 is from a user "Sam" corresponding to the second mobile handset, and includes text reading "GO BLUE TEAM!" The message 905 also includes an icon of clapping hands, with the user "Sam" may have selected, or which may have been automatically added by the media content modification engine 160 based on the text content of the message 905. The message 910 is illustrated as a speech bubble pointing to the enemy character 315 and, includes a laughing face icon. The message 910 may be received via a communication transceiver 190 from a third mobile handset, such as a third media system, that controls the enemy character 315.

Figure 10A:
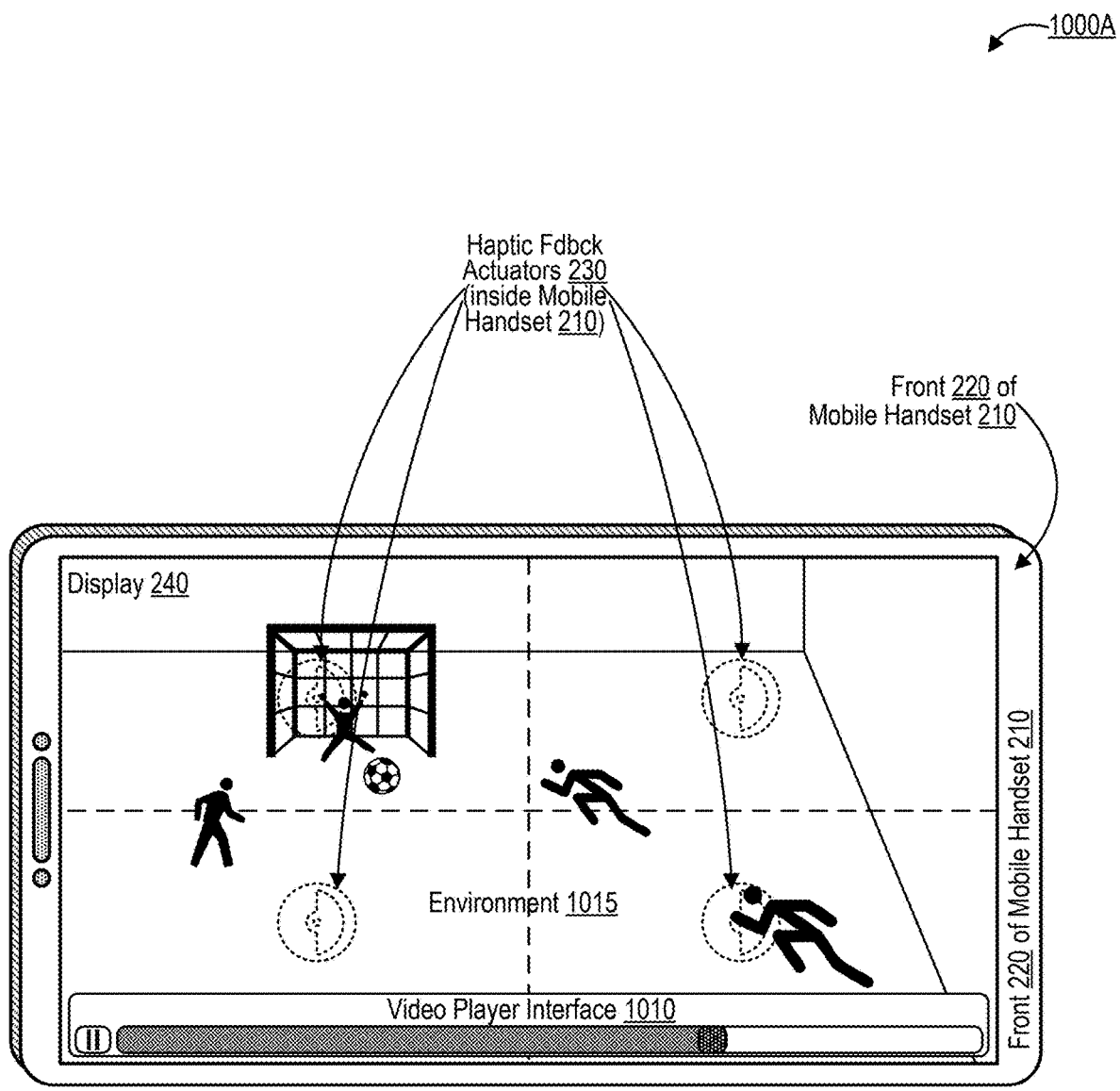
FIG. 10A is a perspective diagram illustrating the mobile handset that is displaying media content associated with a media player application and that includes haptic feedback actuators, in accordance with some examples.

FIG. 10A is a perspective diagram 1000A illustrating the mobile handset 210 that is displaying media content associated with a media player application and that includes haptic feedback actuators 230. The media player application is a video player in the example of FIGS. 10A-10C. The mobile handset 210 displays, using the display 240, a video of a environment 1015 and a video player interface 1010. As in FIGS. 2A-2B and FIGS. 3A-3H, the mobile handset 210 is divided into four regions (e.g., quadrants) by a vertical dashed line and a horizontal dashed line. Each of the regions includes at least one of the haptic feedback actuators 230. Each haptic feedback actuator of the haptic feedback actuators 230 is illustrated with dotted lines as a circular motor with a semicircular mass object that is configured to rotate about an axis extending from the center of the circular motor. The environment 1015 depicts a soccer game, with a goalie blocking a soccer ball from entering a goal and three other players visible on the field.

Figure 10B:
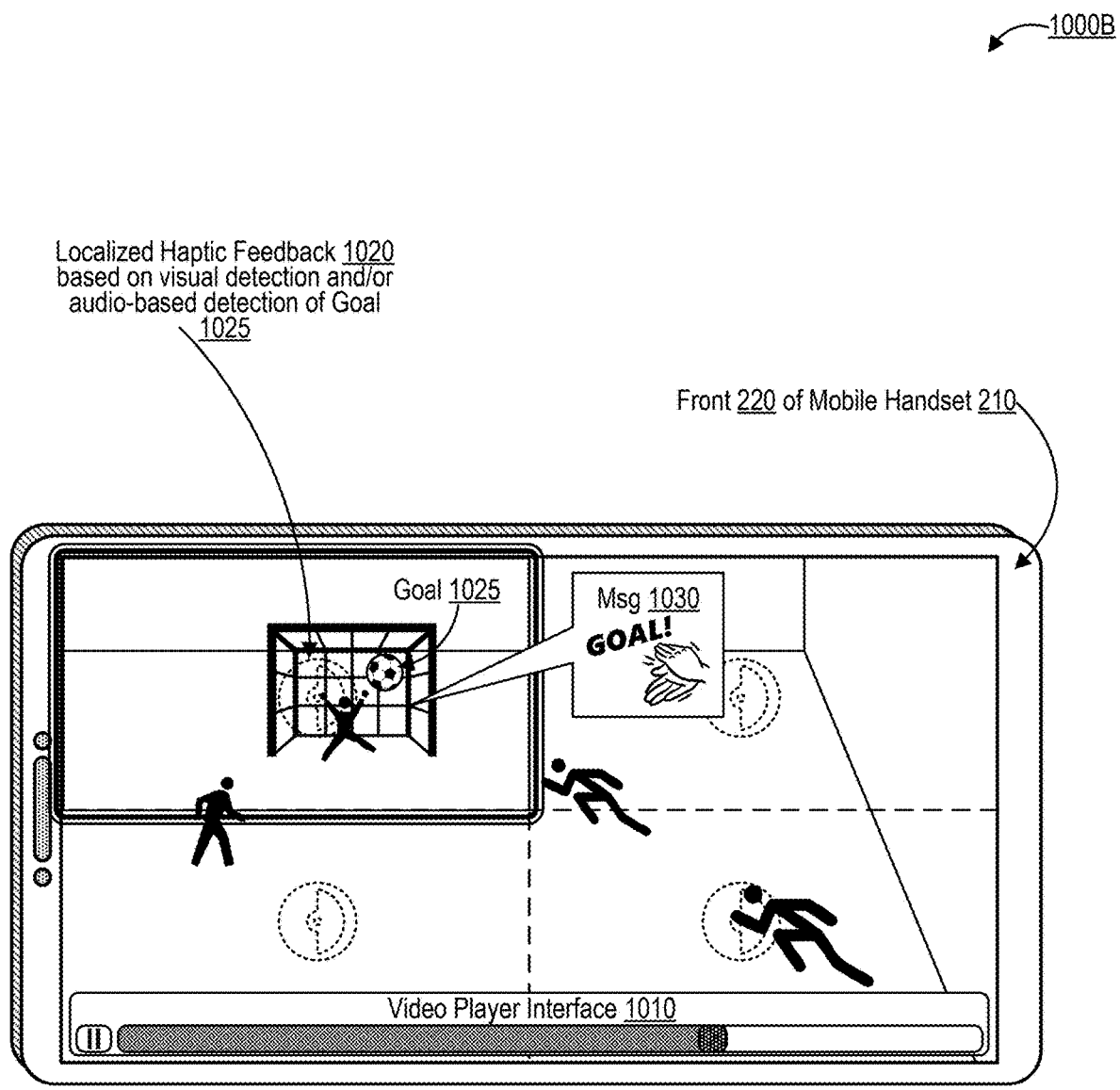
FIG. 10B is a perspective diagram illustrating the mobile handset that that is displaying media content associated with the media player application and that is providing localized haptic feedback based on detection of a soccer ball object in a region of visual content of the media content corresponding to a goal, and including a message integrated with the media content, in accordance with some examples.

FIG. 10B is a perspective diagram 1000B illustrating the mobile handset 210 that that is displaying media content associated with the media player application and that is providing localized haptic feedback 1020 based on detection of a soccer ball object in a region of visual content of the media content corresponding to a goal, and including a message 1030 integrated with the media content. The mobile handset 210 detects a position of the soccer ball relative to a position of the goal as displayed on the display 240, and/or detects the scoring of a goal 1025, for example using one or more trained ML models of the ML engine 150. In some examples, the mobile handset 210 detects the position of the soccer ball relative to the position of the goal, and/or detects the scoring of the goal 1025, using the trained ML model 1120 as illustrated in FIG. 11 and/or using the NN 1300 of FIG. 13. In some examples, the scoring of the goal 1025 is accompanied by a sound effect (e.g., of the soccer ball hitting the net of the goal). In some examples, the mobile handset 210 detects the scoring of the goal 1025 in the environment 1015 based on the sound effect, for instance by recognizing the sound effect within an audio track of the video using one or more trained ML models of the ML engine 150. In some examples, the mobile handset 210 detects the scoring of the goal 1025 using the trained ML model 1220 as illustrated in FIG. 12 and/or using the NN 1300 of FIG. 13, and/or based on audio channel(s) of the sound effect as in FIG. 7. In some examples, the mobile handset 210 detects the position of the soccer ball relative to the position of the goal, and/or detects the scoring of a goal 1025, by receiving an indication from the software application(s) 145 itself of the position of the soccer ball relative to the position of the goal, and/or indicative of the scoring of a goal 1025, for example from a closed captioning track of the video. The detection of the position of the soccer ball relative to the position of the goal, and/or detects the scoring of a goal 1025, is a condition detected by the mobile handset 210.

A message 1030 is also overlaid over the media content of FIG. 10B by the media content modification engine 160. The message 1030 may be received using a communication transceiver 190 from a second media system 195. The message 1030 may be generated by the mobile handset 210 based on the detection of the position of the soccer ball relative to the position of the goal, and/or of the scoring of the goal 1025. In some examples, the incorporation of the message 1030 into the media content of FIG. 10B can be included as at least part of the condition detected by the mobile handset 210. The message 1030 includes text reading "GOAL!" and a clapping hands icon.

The mobile handset 210 uses the haptic feedback pattern engine 155 to generate a haptic feedback pattern corresponding to the condition. The haptic feedback pattern indicates that one of the haptic feedback actuators 230 (the upper-left haptic feedback actuator as illustrated in FIG. 10B) is actuated by haptic feedback pattern engine 155 and/or the haptic feedback controller 135 of the mobile handset 210 because the position of the soccer ball and the goal as displayed on the display 240 fall within the upper-left region of the four regions of the mobile handset 210. This provides the localized haptic feedback 1020 of the upper-left region of the mobile handset 210 of FIG. 10B. The actuation (e.g., vibration) of the upper-left haptic feedback actuator is illustrated in FIG. 10B as a rounded rectangle with triple-black lines around the upper-left region that the upper-left haptic feedback actuator is located within. In some examples, according to the haptic feedback pattern, the mobile handset 210 actuates the upper-left haptic feedback actuator without actuating the other three haptic feedback actuators of the haptic feedback actuators 230. In some examples, according to the haptic feedback pattern, the mobile handset 210 actuates the upper-left haptic feedback actuator more strongly than at least one of the other three haptic feedback actuators of the haptic feedback actuators 230. The localized haptic feedback 1020 can alert the user to look in the upper-left region of the display 240 to look for the scoring of the goal 1025.

Figure 10C:
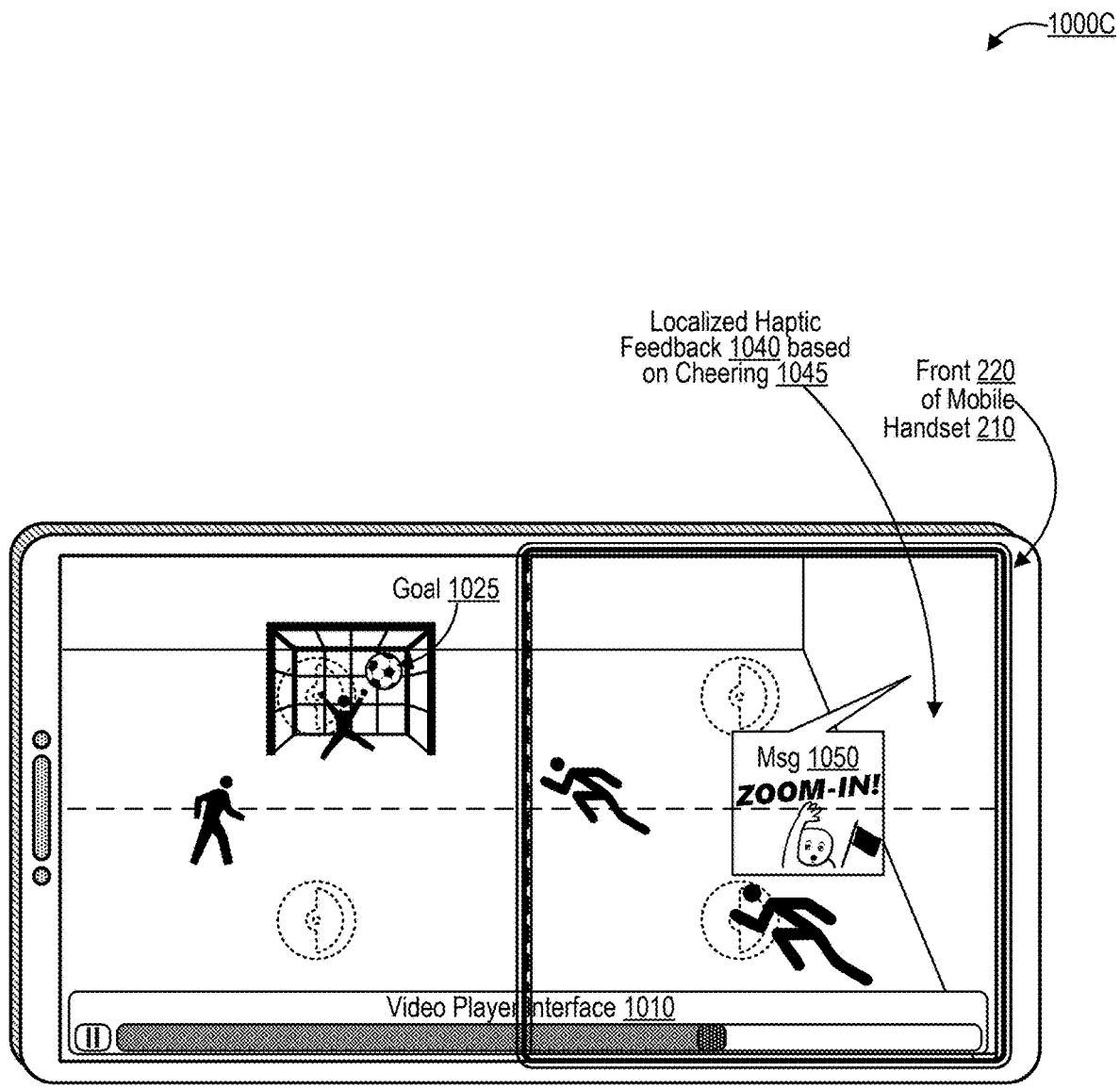
FIG. 10C is a perspective diagram illustrating the mobile handset that that is displaying media content associated with the media player application and that is providing localized haptic feedback based on detection of cheering in the media content, and including a message integrated with the media content, in accordance with some examples.

FIG. 10C is a perspective diagram 1000C illustrating the mobile handset 210 that that is displaying media content associated with the media player application and that is providing localized haptic feedback 1040 based on detection of cheering 1045 in the media content, and including a message 1050 integrated with the media content. The cheering 1045 may be performed by an audience in the stands of the soccer field. The mobile handset 210 detects the cheering 1045 as displayed on the display 240 for example using one or more trained ML models of the ML engine 150. In some examples, the mobile handset 210 detects the cheering 1045 using the trained ML model 1120 as illustrated in FIG. 11 and/or using the NN 1300 of FIG. 13. In some examples, the cheering 1045 is accompanied by a sound effect (e.g., audience cheering sounds, audience chanting sounds, audience applause sounds, or combinations thereof). In some examples, the mobile handset 210 detects the cheering 1045 in the environment 1015 based on the sound effect, for instance by recognizing the sound effect within an audio track of the video using one or more trained ML models of the ML engine 150. In some examples, the mobile handset 210 detects the cheering 1045 using the trained ML model 1220 as illustrated in FIG. 12 and/or using the NN 1300 of FIG. 13, and/or based on audio channel(s) of the sound effect as in FIG. 7. In some examples, the mobile handset 210 detects the cheering 1045 by receiving an indication from the software application(s) 145 itself of the cheering 1045, for example from a closed captioning track corresponding to the video. The detection of the cheering 1045 is a condition detected by the mobile handset 210.

A message 1050 is also overlaid over the media content of FIG. 10C by the media content modification engine 160. The message 1050 may be received using a communication transceiver 190 from a second media system 195. The message 1050 may be generated by the mobile handset 210 based on the detection of the cheering 1045. In some examples, the incorporation of the message 1050 into the media content of FIG. 10C can be included as at least part of the condition detected by the mobile handset 210. The message 1050 includes a zoomed-in image of the cheering 1045 by the audience, in particular showing an audience member throwing up an arm and waving a flag. The message 1050 includes text reading "ZOOM-IN!"

The mobile handset 210 uses the haptic feedback pattern engine 155 to generate a haptic feedback pattern corresponding to the condition. The haptic feedback pattern indicates that two of the haptic feedback actuators 230 on the right-hand half of the mobile handset 210 (the upper-right haptic feedback actuator and the bottom-right haptic feedback actuator as illustrated in FIG. 10C) are actuated by haptic feedback pattern engine 155 and/or the haptic feedback controller 135 of the mobile handset 210 because the position of the cheering 1045 as displayed on the display 240, and/or in the audio channels, fall within the right-hand side of the display 240 and/or in the right audio channels, of the mobile handset 210. This provides the localized haptic feedback 1040 of the right-hand half of the mobile handset 210 (the upper-right haptic feedback actuator and the bottom-right haptic feedback actuator) of FIG. 10C. The actuation (e.g., vibration) of the right-hand half of the mobile handset 210 (the upper-right haptic feedback actuator and the bottom-right haptic feedback actuator) is illustrated in FIG. 10C as a rounded rectangle with triple-black lines around the right-hand half of the mobile handset 210 that the upper-right haptic feedback actuator and the bottom-right haptic feedback actuator are located within. In some examples, according to the haptic feedback pattern, the mobile handset 210 actuates the upper-right haptic feedback actuator and the bottom-right haptic feedback actuator without actuating the other two haptic feedback actuators of the haptic feedback actuators 230. In some examples, according to the haptic feedback pattern, the mobile handset 210 actuates the upper-right haptic feedback actuator and the bottom-right haptic feedback actuator more strongly than at least one of the other two haptic feedback actuators of the haptic feedback actuators 230. The localized haptic feedback 1040 can alert the user that the audience is cheering 1045, which can in turn alert the user that an event has occurred that prompted the audience to cheer (e.g., a goal 1025 was scored as in FIG. 10B).

FIG. 11 is a block diagram 1100 illustrating determination of an identity 1135 of an object 1130 using a trained machine learning model 1120 based on input of one or more images 1105 of media content into the trained machine learning model 1120. The trained machine learning model 1120 may be trained by the ML engine 150 based on training data that includes images (e.g., images 1105) as well as objects (e.g., object 1130) detected within the images. Based on the training, the trained ML model 1120 can identify objects within images. The image(s) 1105 illustrated in FIG. 11 include a depiction of the environment 320 in the video game. The object 1130 detected by the trained ML model 1120 is a human being 1140, and more specifically is the enemy character 315. In some examples, the trained ML model 1120 may recognize the identity 1135 of object 1130 as a human being 1140. In some examples, the trained ML model 1120 may recognize the identity 1135 of the object 1130 as the enemy character 315.

FIG. 12 is a block diagram 1200 illustrating determination of an identity 1235 of a sound 1230 using a trained machine learning model 1220 based on input of one or more audio clips 1205 of media content into the trained machine learning model 1220. The trained machine learning model 1220 may be trained by the ML engine 150 based on training data that includes audio clips (e.g., audio clips 1205) as well as sounds (e.g., sound 1230) within the audio clips. Based on the training, the trained ML model 1220 can identify sounds 1230 within audio clips 1205. The audio clip(s) 1205 illustrated in FIG. 12 include a longer audio clip of audio from an environment 320 and/or environment 1015. The sound 1230 detected by the trained ML model 1220 is an explosion, and more specifically is the explosion 415 of FIG. 4. In some examples, the trained ML model 1220 may recognize the identity 1235 of the sound 1230 as an explosion generally. In some examples, the trained ML model 1220 may recognize the identity 1235 of the sound 1230 as the specific explosion 415 of FIG. 4.

The trained ML model 1120 and/or the trained ML model 1220 can perform, for example, a feature extraction algorithm, a feature detection algorithm, a feature recognition algorithm, an object detection algorithm, an object recognition algorithm, a facial detection algorithm, a facial recognition algorithm, a person detection algorithm, a person recognition algorithm, a sound extraction algorithm, a sound detection algorithm, a sound recognition algorithm, an optical character detection algorithm, an optical character recognition (OCR) algorithm, a classifier, an optical glyph detector, an optical glyph scanner, or a combination thereof. The trained ML model 1120 and/or the trained ML model 1220, can include, for example, one or more neural network (NNs) (e.g., neural network 1300), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

FIG. 13 is a block diagram illustrating an example of a neural network (NN) 1300 that can be used by the machine learning engine 150 to identify elements within media content to be output by a media device. For example, the NN 1300 can be used by the trained machine learning model 1120 that detects objects within images and/or by the trained machine learning model 1220 detects sounds within audio clips. The neural network 1300 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 1300 may be an example of the ML engine 150, the trained machine learning model 1120, the trained machine learning model 1220, or a combination thereof.

An input layer 1310 of the neural network 1300 includes input data. The input data of the input layer 1310 can include data representing the pixels of one or more input image frames. In an illustrative example, the input data of the input layer 1310 can include data representing the pixels of image data (e.g., of the image(s) 1105) and/or metadata corresponding to the image data. In one illustrative example, the input data of the input layer 1310 can include the image(s) 1105. The input data of the input layer 1310 can include data representing one or more audio clip(s) 1205 and/or associated metadata. In another illustrative example, the input data of the input layer 1310 can include the audio clip(s) 1205 and/or metadata.

The images can include image data from an image sensor including raw pixel data (including a single color per pixel based, for example, on a Bayer filter) or processed pixel values (e.g., RGB pixels of an RGB image). The neural network 1300 includes multiple hidden layers 1312A, 1312B, through 1312N. The hidden layers 1312A, 1312B, through 1312N include "N" number of hidden layers, where "N" is an integer greater than or equal to one. The number of hidden layers can be made to include as many layers as needed for the given application. The neural network 1300 further includes an output layer 1314 that provides an output resulting from the processing performed by the hidden layers 1312A, 1312B, through 1312N. In some examples, the output layer 1314 can provide an output image, such as an output image identifying the object 1130. In some examples, the output layer 1314 can provide an identity 1135 of the object 1130. In some examples, the output layer 1314 can provide an identity 1235 of the sound 1230.

The neural network 1300 is a multi-layer neural network of interconnected filters. Each filter can be trained to learn a feature representative of the input data. Information associated with the filters is shared among the different layers and each layer retains information as information is processed. In some cases, the neural network 1300 can include a feed-forward network, in which case there are no feedback connections where outputs of the network are fed back into itself. In some cases, the network 1300 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1310 can activate a set of nodes in the first hidden layer 1312A. For example, as shown, each of the input nodes of the input layer 1310 can be connected to each of the nodes of the first hidden layer 1312A. The nodes of a hidden layer can transform the information of each input node by applying activation functions (e.g., filters) to this information. The information derived from the transformation can then be passed to and can activate the nodes of the next hidden layer 1312B, which can perform their own designated functions. Example functions include convolutional functions, downscaling, upscaling, data transformation, and/or any other suitable functions. The output of the hidden layer 1312B can then activate nodes of the next hidden layer, and so on. The output of the last hidden layer 1312N can activate one or more nodes of the output layer 1314, which provides a processed output image. In some cases, while nodes (e.g., node 1316) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1310 using the different hidden layers 1312A, 1312B, through 1312N in order to provide the output through the output layer 1314.

Figure 14A:
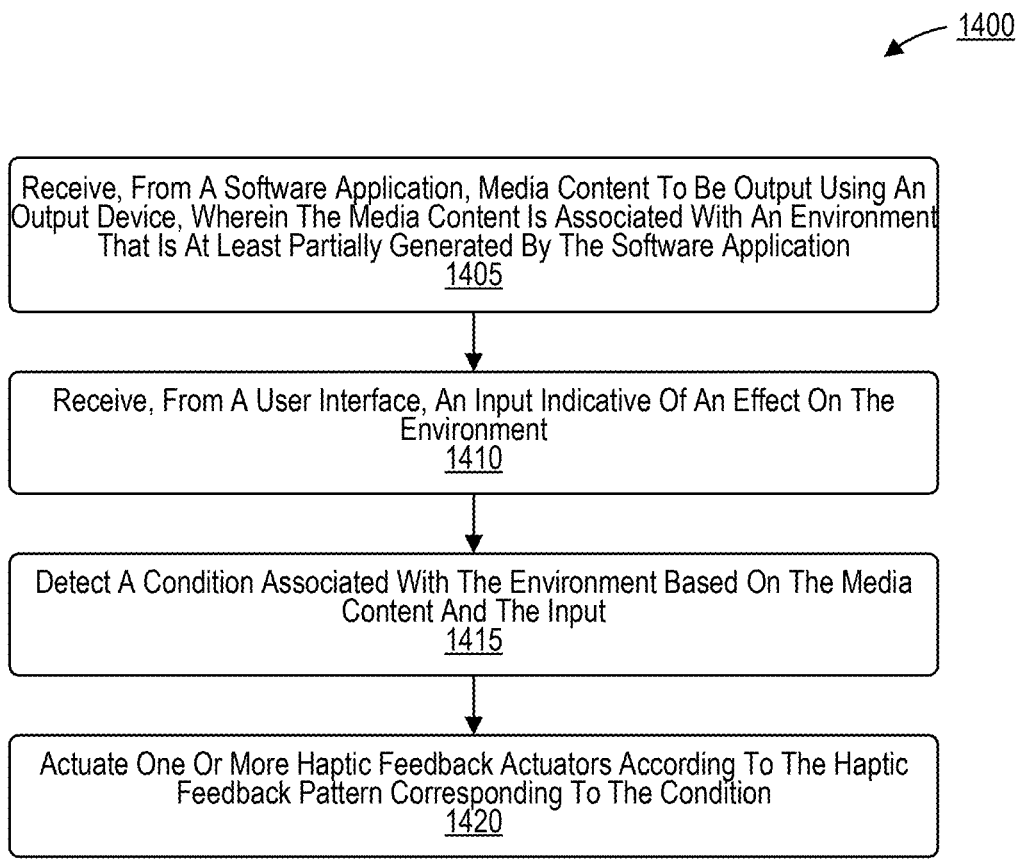
FIG. 14A is a flow diagram illustrating a process for processing media data, in accordance with some examples.

FIG. 14A is a flow diagram illustrating a process 1400 for processing media data. The process 1400 may be performed by a media system. In some examples, the media system can include, for example, the media system 100, the processor(s) 140, the haptic feedback controller(s) 135, the second media system 195, the mobile handset 210, the trained ML model 1120, the trained ML model 1220, the NN 1300, the media system that performs the process 1450, the computing system 1500, the processor 1510, or a combination thereof.

At operation 1405, the media system is configured to, and can, receive, from a software application, media content to be output using an output device. The media content is associated with an environment that is at least partially generated by the software application. Examples of the output device include the output device(s) 110, a visual media output device of the output device(s) 110, the display(s) 115, an audio media output device of the output device(s) 110, the speaker(s) 120, the headphone output(s)

Figure 14B:
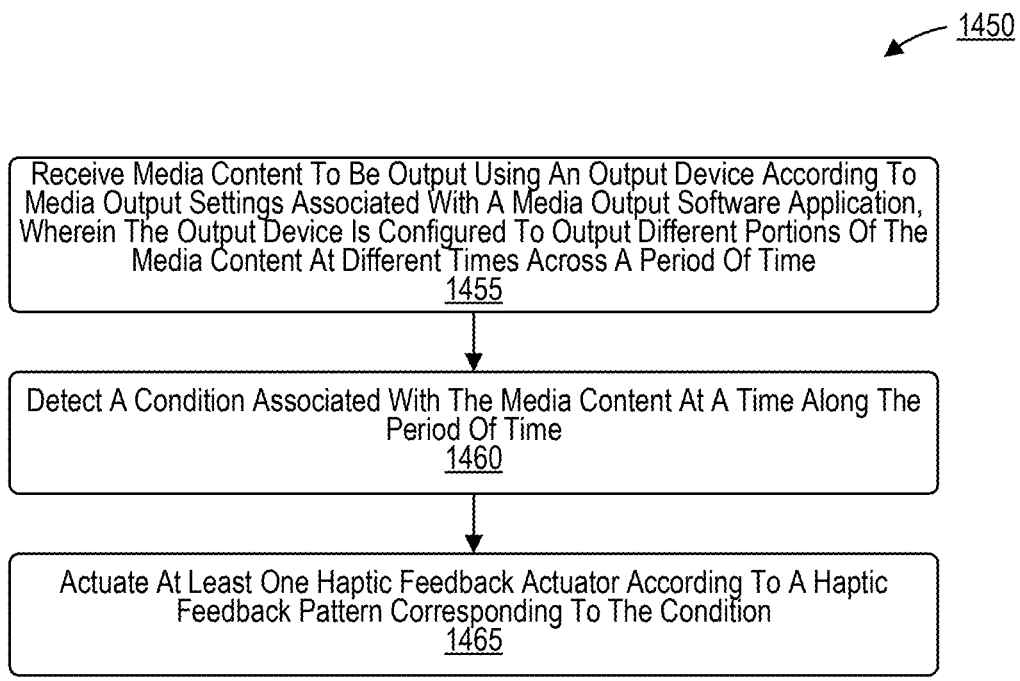
FIG. 14B is a flow diagram illustrating another process for processing media data, in accordance with some examples.

125, the display 240, the output device of the process 1450 of FIG. 14B, the output device 1535, or a combination thereof.

Examples of the software application include the software application(s) 145, the media content modification engine 160, the software application(s) that at least partially generate the media content displayed on the display 240 in FIGS. 3A-3H, the software application(s) that at least partially generate the sound effect 410 and/or the explosion 415, the software application(s) that at least partially generate media content with the player avatar 510 and/or the entity 515 and/or the environment 520, the software application(s) that at least partially generate the sound effect 710 and/or the audio channel pattern 705, the software application(s) corresponding to the player avatar and the corresponding actions (e.g., 810A-810K) of FIG. 8, the software application(s) that at least partially generate the media content displayed on the display 240 in FIG. 9, the software application(s) that at least partially generate the media content displayed on the display 240 in FIGS. 10A-10C, the software application(s) that at least partially generate the image(s) 1105 and/or the media content 1110, the software application(s) that at least partially generate the audio clip(s) 1205 and/or the media content 1210, the software application of operation 1455 of FIG. 14B, one or more software application(s) run using the processor 1510 and/or the computing system 1500, or a combination thereof.

Examples of the media content include media content at least partially generated by the software application(s) 145, media content at least partially captured using the sensor(s) 185, media content at least partially modified using the media content modification engine 160, media content stored in the media buffer(s) 165, media content to be output using the output device(s) 110, media content that is output using the output device(s) 110, the media content displayed on the display 240 in FIGS. 3A-3H, the sound effect 410, the explosion 415, the player avatar 510, the entity 515, the environment 520, the sound effect 710, the audio channel pattern 705, the player avatar of FIG. 8, the environment of FIG. 8, the actions (e.g., 810A-810K) of FIG. 8, the media content displayed on the display 240 in FIG. 9, the media content displayed on the display 240 in FIGS. 10A-10C, the image(s) 1105, the media content 1110, the audio clip(s) 1205, the media content 1210, the media content of operation 1455 of FIG. 14B, or a combination thereof.

Examples of the environment include an environment at least partially generated by the software application(s) 145, an environment at least partially captured using the sensor(s) 185, an environment at least partially modified using the media content modification engine 160, the environment 320 of FIGS. 3A-3H and/or FIG. 9, the environment that includes the explosion 415 and/or from which the sound effect 410 comes, the environment 520, the environment from which sound effect 710 comes according to the audio channel pattern 705, the environment of FIG. 8 that includes the player avatar of FIG. 8, the environment 1015, an environment depicted in the image(s) 1105, an environment represented in the media content 1110, an environment from which the audio clip(s) 1205 come, an environment represented in the media content 1210, an environment represented in the media content of operation 1455 of FIG. 14B, or a combination thereof.

In some examples, the media content includes visual content that depicts at least a portion of the environment. Examples of the visual content include the visual content depicting the environment 320 of FIGS. 3A-3H and/or FIG. 9, visual content depicting the explosion 415, visual content depicting the player avatar 510 and/or the entity 515 and/or the environment 520, visual content depicting the player avatar and/or actions (e.g., 810A-810K) and/or environment of FIG. 8, the visual content depicting the environment 1015 of FIGS. 10A-10C, the image(s) 1105 of the media content 1110, or a combination thereof. In some examples, the output device includes a display configured to display the visual content. In some examples, the media system includes a display. Examples of the display include the display(s) 115, the display 240, and/or the output device 1535.

In some examples, the media content includes audio content that includes one or more sounds associated with the environment. Examples of the audio content include the sound effect 410, the sound effect 710, the audio clip(s) 1205, and/or the sound 1230. The sounds associated with the environment can include sounds that come from the environment, such as sounds made by one or more entities in the environment (e.g., footsteps of a person in the environment, shots fired in the environment, explosions in the environment, music playing in the environment), sounds playing while the environment is displayed (e.g., background music), sounds associated with a user interface (e.g., corresponding to button presses), or combinations thereof. In some examples, the output device includes an audio output device configured to play the audio content. In some examples, the media system includes the audio output device. Examples of the audio output device include one or more speakers 120, one or more speaker connectors (e.g., audio jacks) to which one or more speakers 120 can be coupled, one or more headphone outputs 125 (e.g., one or more headphones, one or more headsets, and/or one or more headphone connectors (e.g., headphone jacks) to which headphones can be connected), or combinations thereof.

In some examples, to receive the media content to be output using the output device from the software application, the media system is configured to, and can, render the media content using the software application and receive the media content after the media content is rendered and before the media content is output using the output device.

In some examples, to receive the media content to be output using the output device from the software application, the media system is configured to, and can, store the media content in a media buffer and receive the media content from the media buffer after the media content is stored in the media buffer and before the media content is output using the output device. Examples of the media buffer include the media buffer(s) 165. In some examples, the media system is configured to, and can, generate at least a portion of the media content using the software application before storing the media content in the media buffer.

At operation 1410, the media system is configured to, and can, receive, from a user interface, an input indicative of an effect on the environment. Examples of the user interface include the input device(s) 170, the touch-sensitive layer 175, the button(s) 180, the sensor(s) 185, the communication transceiver(s) 190, a touch-sensitive layer of the display 240, button(s) of the mobile handset 210, camera(s) of the mobile handset 210, microphone(s) of the mobile handset 210, sensor(s) of the mobile handset 210, the virtual buttons 330L, the virtual buttons 330R, the virtual joystick 335, the touch-sensitive layer 610, the touchscreen 615, the video player interface 1010, the input device 1545, or a combination thereof. Examples of the sensor(s) 185 of the user interface include one or more cameras, image sensors, microphones, depth sensors, accelerometers, gyroscopes, positioning receivers (e.g., global navigation satellite system (GNSS) receivers), inertial measurement units (IMUs), or combinations thereof. Depth sensors can include, for example, light detection and ranging (LiDAR) sensors, radio detection and ranging (RADAR) sensors, sound detection and ranging (SODAR) sensors, sound navigation and ranging (SONAR) sensors, time of flight (ToF) sensors, structured light sensors, stereoscopic cameras, or combinations thereof.

Examples of the input include an input received using the input device(s) 170, an input received using the touch-sensitive layer 175, an input received using the button(s) 180, an input received using the sensor(s) 185, an input received using the communication transceiver(s) 190, an input received from the second media system 195, an input received at using the virtual buttons 330L, an input received at using the virtual buttons 330R, an input received at using the virtual joystick 335, an input received at using the hand 345 touching the display 240, an input to the touch-sensitive layer 610 of the touchscreen 615, an input having the pressure 605, an input for performing the actions (e.g., 810A-810K) of FIG. 8, an input to the video player interface 1010, an input received using the input device 1545, or a combination thereof. Examples of the input, in the context of the sensor(s) 185, include one or more images, videos, audio clips, depth information (e.g., point clouds), motion information, acceleration information (e.g., from an accelerometer), orientation information (e.g., from a gyroscope), or combinations thereof.

Examples of the effect on the environment include one or more movements of the player avatar 305 within the environment 320, one or more changes in pose of the player avatar 305 within the environment 320 and/or the environment 1015, one or more actions undertaken by the player avatar 305 within the environment 320 and/or the environment 1015, one or more changes in the field of view of the environment 320 and/or the environment 1015, one or more changes to another entity in the environment 320 and/or the environment 1015, one or more changes to the environment 320 itself, one or more actions undertaken by another entity in the environment 320 and/or the environment 1015, one or more actions undertaken by the environment 320 and/or the environment 1015 itself, one or more actions undertaken to the environment 320 and/or the environment 1015, one or more changes to the minimap 325 view of the environment 320 and/or the environment 1015, one or more additions of one or more elements to the environment 320 and/or the environment 1015 (e.g., one or more bullets from the weapon as in FIG. 3D, one or more the message 355, one or more the treasure chest item 360 of FIG. 3F, one or more the explosion 365 of FIG. 3G, one or more the blood effect 370 of FIG. 3H, one or more the message 905, one or more the message 910), one or more changes to one or more elements of the environment 320 and/or the environment 1015 (e.g., one or more the change to the ammo counter 312 of FIG. 3D, one or more the change to the health meter 310 of FIG. 3H), one or more removals to one or more elements from the environment 320 and/or the environment 1015, one or more of the actions (e.g., one or more 810A-810K) of FIG. 8, the flight 810A, the skydiving 810B, the parachuting 810C, the landing 810D, the collecting of the item 810E, the firing of the weapon 810F, the enemy encounter 810G, the sneaking 810H, the driving of the vehicle 810J, the victory 810K, playing of a sound in the environment (e.g., one or more the sound effect 410, one or more the sound effect 710, one or more the audio clip 1205, one or more the sound 1230), or a combination thereof. In an illustrative example, the effect on the environment includes one of the actions (e.g., one or more 810A-810K) of FIG. 8.

In some examples, the user interface includes a touch-sensitive layer of a touchscreen display. The input includes a touch input received at a touch position along the touch-sensitive layer. Examples of the touch-sensitive layer include the touch-sensitive layer 175 and/or the touch-sensitive layer 610. Examples of the touchscreen display include the display(s) 115, the display 240, and/or the touchscreen 615.

In some examples, the user interface includes a button, such as one of the buttons 180. The input includes a button press of the button. The button may be a physical button, as in a keyboard, a keypad, a video game controller, a mouse, or a combination thereof. The button may be a virtual button, such as one of the virtual buttons 330L and/or one of the virtual buttons 330R.

In some examples, the user interface includes a sensor, such as one of the sensors 185. The input includes detection a motion based on sensor data captured by the sensor. Examples of the sensor(s) 185 of the user interface include one or more cameras, image sensors, microphones, depth sensors, accelerometers, gyroscopes, positioning receivers (e.g., global navigation satellite system (GNSS) receivers), inertial measurement units (IMUs), or combinations thereof. Depth sensors can include, for example, light detection and ranging (LiDAR) sensors, radio detection and ranging (RADAR) sensors, sound detection and ranging (SODAR) sensors, sound navigation and ranging (SONAR) sensors, time of flight (ToF) sensors, structured light sensors, stereoscopic cameras, or combinations thereof.

At operation 1415, the media system is configured to, and can, detect a condition associated with the environment based on the media content and the input. In some examples, the detecting of the condition associated with the environment based on the media content and the input is performed using the machine learning (ML) engine 150, one or more trained ML models of the ML engine 150, the trained ML model 1120, the trained ML model 1220, the neural network (NN) 1300, or a combination thereof. In some examples, detection of the condition associated with the environment includes detection of an object in visual media data depicting the environment, as in the determination of the identity 1135 of the object 1130 in the image(s) 1105 by the trained ML model 1120. In some examples, detection of the condition associated with the environment includes detection of a sound effect in audio media data from the environment, as in the determination of the identity 1235 of the sound 1230 in the audio clip(s) 1205 by the trained ML model 1220.

In some examples, the condition associated with the environment can include the effect on the environment. In some examples, the condition associated with the environment can be a result of the effect on the environment. In some examples, detection of the condition associated with the environment includes detection of the effect on the environment. In some examples, detection of the condition associated with the environment includes detection of one or more movements of the player avatar 305 within the environment 320, one or more changes in pose of the player avatar 305 within the environment 320 and/or the environment 1015, one or more actions undertaken by the player avatar 305 within the environment 320 and/or the environment 1015, one or more changes in the field of view of the environment 320 and/or the environment 1015, one or more changes to another entity in the environment 320 and/or the environment 1015, one or more changes to the environment 320 itself, one or more actions undertaken by another entity in the environment 320 and/or the environment 1015, one or more actions undertaken by the environment 320 and/or the environment 1015 itself, one or more actions undertaken to the environment 320 and/or the environment 1015, one or more changes to the minimap 325 view of the environment 320 and/or the environment 1015, one or more additions of one or more elements to the environment 320 and/or the environment 1015 (e.g., one or more bullets from the weapon as in FIG. 3D, one or more the message 355, one or more the treasure chest item 360 of FIG. 3F, one or more the explosion 365 of FIG. 3G, one or more the blood effect 370 of FIG. 3H, one or more the message 905, one or more the message 910), one or more changes to one or more elements of the environment 320 and/or the environment 1015 (e.g., one or more the change to the ammo counter 312 of FIG. 3D, one or more the change to the health meter 310 of FIG. 3H), one or more removals to one or more elements from the environment 320 and/or the environment 1015, one or more of the actions (e.g., one or more 810A-810K) of FIG. 8, the flight 810A, the skydiving 810B, the parachuting 810C, the landing 810D, the collecting of the item 810E, the firing of the weapon 810F, the enemy encounter 810G, the sneaking 810H, the driving of the vehicle 810J, the victory 810K, playing of a sound in the environment (e.g., one or more the sound effect 410, one or more the sound effect 710, one or more the audio clip 1205, one or more the sound 1230), or a combination thereof.

In some examples, the software application is a video game. Examples of the video game are illustrated at least at FIGS. 3A-3H, 8, 9, and 11. In some examples, the effect on the environment includes performance of an action by a player avatar in the environment. Examples of the player avatar include the player avatar 305 of FIGS. 3A-3H and/or FIG. 9 and/or FIG. 11, the enemy character 315 of FIGS. 3A-3H and/or FIG. 9 and/or FIG. 11, and the player avatar of FIG. 8. Examples of the action by the player avatar include the firing of the weapon in FIG. 3D, the actions (e.g., 810A-810K) of FIG. 8, or combinations thereof. In some examples, to detect the condition associated with the environment, the media system is configured to, and can, identify the performance of the action by the player avatar. In some examples, to detect the condition associated with the environment, the media system is configured to, and can, detect an interaction between the player avatar and a second portion of the environment. Examples of the second portion of the environment can include another player (e.g., the enemy character 315, enemy encounter 810G), a portion of land, a structure, a plant (e.g., the trees of the environment 320), an item (e.g., the treasure chest item 360, collecting item 810E), an explosion (e.g., explosion 365, explosion 415), a vehicle (e.g., flight 810A in airplane, driving vehicle 810J in car), or a combination thereof.

In some examples, to detect the condition associated with the environment, the media system is configured to, and can, detect that an object is depicted within visual content of the media content. For example, the media system can detect an identity 1135 of an object 1130 identified within image(s) 1105 using a trained ML model 1120. In some examples, to detect the condition associated with the environment, the media system is configured to, and can, detect that a sound is present within audio content of the media content. For example, the media system can detect an identity 1235 of sound 1230 identified within audio clip(s) 1205 using a trained ML model 1220.

In some examples, to detect the condition associated with the environment, the media system is configured to, and can, identify that the input matches a predetermined input category. In some examples, the predetermined input category can include determination that the input was received from a specific one of the input device(s) 170, such as the touch-sensitive layer 175, the button(s) 180, and/or a specific type of the sensor(s) 185. In some examples, the predetermined input category can include pressing of a specific one of the button(s) 180, touching a specific portion of a touch-sensitive layer 175, detection of specific content in sensor data captured by the sensor(s) 185, or a combination thereof. In some examples, the predetermined input category can include receipt of a touch input at a specific one of the virtual buttons 330L, receipt of a touch input at a specific one of the virtual buttons 330R, receipt of a touch input at the virtual joystick 335, or a combination thereof.

In some examples, the media content includes an aspect indicative of the condition associated with the environment. To detect the condition associated with the environment, the media system is configured to, and can, detect the aspect of the media content that is indicative of the condition associated with the environment. In some examples, the aspect can include depiction of the object 1130 in visual content (e.g., image(s) 1105) of the media content 1110, to be detected using the trained ML model 1120. In some examples, the aspect can include inclusion of the sound 1230 in audio content (e.g., audio clip(s) 1205) of the media content 1210, to be detected using the trained ML model 1220. In some examples, the media content includes an aspect indicative of the effect on the environment. For example, the aspect can include the media content depicting an action performed by the player avatar (e.g., the player avatar 305, the player avatar 510, and/or the player avatar of FIG. 8) in the environment (e.g., the environment 320, the environment 520, the environment of FIG. 8, the environment 1015).

At operation 1420, the media system is configured to, and can, actuate one or more haptic feedback actuators according to a haptic feedback pattern corresponding to the condition. Examples of the one or more haptic feedback actuators include the haptic feedback actuator(s) 130 and/or the haptic feedback actuators 230. In some examples, the media system actuates the one or more haptic feedback actuators according to the haptic feedback pattern using the haptic feedback pattern engine 155 and/or the haptic feedback controller 135.

In some examples, the media system generates the haptic feedback pattern corresponding to the condition before actuating the one or more haptic feedback actuators according to a haptic feedback pattern. In some examples, the media system uses the haptic feedback pattern engine 155 to generate the haptic feedback pattern corresponding to the condition. Examples of the haptic feedback pattern include the localized haptic feedback 340C, the localized haptic feedback 340D, the localized haptic feedback 340E, the localized haptic feedback 340F, the localized haptic feedback 340G, the localized haptic feedback 340H, the haptic waveform 430, the haptic feedback pattern 435, the haptic waveform 530, the haptic feedback pattern 535, the haptic waveform 630, the haptic feedback pattern 635, the localized haptic feedback 725, the haptic feedback pattern 730, the haptic feedback pattern 805A, the haptic feedback pattern 805B, the haptic feedback pattern 805C, the haptic feedback pattern 805D, the haptic feedback pattern 805E, the haptic feedback pattern 805F, the haptic feedback pattern 805G, the haptic feedback pattern 805H, the haptic feedback pattern 805J, the haptic feedback pattern 805K, the localized haptic feedback 1020, the localized haptic feedback 1040, the haptic feedback pattern of operation 1465 of FIG. 14B, or a combination thereof.

Examples of the generating the haptic feedback pattern (or an aspect of the haptic feedback pattern) corresponding to the condition are illustrated in FIG. 1, FIGS. 3C-3H, FIG. 4, FIG. 5, FIG. 6, FIG. 7, FIG. 8, FIGS. 10B-10C, FIG. 13, FIG. 14B, or a combination thereof.

In some examples, the haptic feedback pattern indicates that the one or more haptic feedback actuators are to be actuated to provide a localized haptic feedback effect. Examples of the localized haptic feedback effect include the localized haptic feedback 340C-340H, the localized haptic feedback 725, the localized haptic feedback 1020, the localized haptic feedback 1040, or a combination thereof.

In some examples, the haptic feedback pattern indicates that a first haptic feedback actuator of the one or more haptic feedback actuators is to be actuated without actuating a second haptic feedback actuator. In some examples, to actuate the one or more haptic feedback actuators according to the haptic feedback pattern, the media system is configured to actuate the first haptic feedback actuator without actuating the second haptic feedback actuator. For example, for the localized haptic feedback illustrated in FIGS. 3C-3H, FIG. 7, and FIGS. 10B-10C, the first haptic feedback actuator can be one of the haptic feedback actuators in the region highlighted by the triple black line rounded rectangle, while the second haptic feedback actuator can be one of the haptic feedback actuators outside of the region highlighted by the triple black line rounded rectangle. In some examples, the output device includes a display that displays first visual content of the media content and second visual content of the media content. In some examples, the first haptic feedback actuator is adjacent to a first region of the display that displays the first visual content, and the second haptic feedback actuator is adjacent to a second region of the display that displays the second visual content. This is illustrated at least in FIGS. 3C-3H and FIGS. 10B-10C. In some examples, the condition is associated with an entity in the environment that is closer to a first portion of the environment depicted in the first visual content than to a second portion of the environment depicted in the second visual content. For instance, the entity in the environment can be in the first portion of the environment, and can be missing from the second portion of the environment. Examples of the entity include the enemy character 315 of FIG. 3C, the fire button of the virtual buttons 330R in FIG. 3D, the message 355 in FIG. 3E, the treasure chest item 360 in FIG. 3F, the explosion 365 in FIG. 3G, the blood effect 370 of FIG. 3H, the goal 1025 of FIG. 10B, the cheering 1045 and/or the audience and/or the message 1050 of FIG. 10C, or a combination thereof.

In some examples, the haptic feedback pattern indicates a haptic feedback intensity of haptic feedback by the one or more haptic feedback actuators. Haptic feedback intensity can be referred to as amplitude. Haptic feedback intensity can be expressed as the amplitude of a haptic waveform. Examples of the haptic feedback intensity include the value along the vertical amplitude axis 445 of the haptic waveform 430, the value along the vertical amplitude axis 545 of the haptic waveform 530, and/or the value along the vertical amplitude axis 645 of the haptic waveform 630.

In some examples, the haptic feedback intensity of the haptic feedback pattern corresponds to a proximity of an entity in the environment to a position of a player avatar in the environment. The proximity can be expressed as a distance, with lower distance corresponding to higher proximity, and higher distance corresponding to lower proximity. For example, the proximity can be expressed as the distance 505 of FIG. 5. An example of a haptic feedback intensity that corresponds to proximity is illustrated in FIG. 5. In some examples, the haptic feedback intensity of the haptic feedback pattern corresponds to an intensity of the condition associated with the environment. For example, the haptic feedback intensity of the haptic feedback pattern can correspond to an intensity of any of the actions (e.g., actions 810A-810K) of FIG. 8, of the firing of FIG. 3D, of the explosion 365, of the injury corresponding to the blood effect 370, of the sound effect 410, of the explosion 415, or a combination thereof. In some examples, the haptic feedback intensity of the haptic feedback pattern corresponds to a volume of a sound, where the media content includes the sound. An example of haptic feedback intensity that corresponds to a volume of a sound is illustrated in FIG. 4. The volume of the sound can be referred to as an amplitude of a sound effect, such as the value along the vertical amplitude axis 425 of the audio waveform 405.

In some examples, the haptic feedback pattern indicates a haptic feedback waveform of the haptic feedback pattern by the one or more haptic feedback actuators. Examples of the haptic feedback waveform include the haptic feedback waveform 430, the haptic feedback waveform 530, and/or the haptic feedback waveform 630. In some examples, the haptic feedback pattern indicates a frequency of the haptic feedback waveform. In some examples, the haptic feedback pattern indicates an amplitude of the haptic feedback waveform. The amplitude of the haptic feedback waveform can be referred to as the haptic feedback intensity. The amplitude of the haptic feedback waveform can refer to the value of a haptic feedback waveform along an amplitude axis, such as the value of the haptic feedback waveform 430 along the vertical amplitude axis 445, the value of the haptic feedback waveform 530 along the vertical amplitude axis 545, and/or the value of the haptic feedback waveform 630 along the vertical amplitude axis 645. In some examples, the media system is configured to, and can, generate the haptic feedback waveform of haptic feedback pattern based on an audio waveform of a sound, where the media content includes the sound. An example of generation of the haptic feedback waveform based on the audio waveform is illustrated with respect to generation of the haptic feedback waveform 430 based on the audio waveform 405 in FIG. 4.

In some examples, the media system is configured to, and can, output the media content using the output device. In some examples, the media system is configured to, and can, modify the media content before the media content is configured to be output using the output device. Modification of the media content can be performed using the media content modification engine 160 of the media system. In some examples, the media system is configured to, and can, receive a message over a network from a second device. For example, the media system can receive the message via the communication transceiver(s) 190 over the network from the second media system 195. To modify the media content, the media system is configured to, and can, incorporate the message into the media content. The media system can overlay the message over a portion of the visual content of the media content, as in the message 355, the message 905, the message 910, the message 1030, and/or the message 1050. The media system can incorporate an audio representation of the message, and/or an audio portion of the message, by playing the audio over a portion of the audio content of the media content. In some examples, the message includes one or more alphanumeric characters (e.g., the message 355, the message 905, the message 1030, the message 1050). In some examples, the message includes one or more images (e.g., the message 905, the message 910, the message 1030, the message 1050). In some examples, the message includes one or more sounds.

In some examples, the condition is associated with the message. In some examples, the haptic feedback pattern is associated with the message. Examples are illustrated with respect to the localized haptic feedback 340E corresponding to the position of the message 355 and the localized haptic feedback 1040 corresponding to the position of the message 1050.

In some aspects, the media system can include: means for receiving, from a software application, media content to be output using an output device, wherein the media content is associated with an environment that is at least partially generated by the software application; means for receiving, from a user interface, an input indicative of an effect on the environment; means for detecting a condition associated with the environment based on the media content and the input; and means for actuating one or more haptic feedback actuators according to a haptic feedback pattern corresponding to the condition.

In some examples, the means for receiving the media content includes the software application(s) 145, the sensor(s) 185, the communication transceiver(s) 190, the media content modification engine(s) 160, the media buffer(s) 165, the processor(s) 140, or a combination thereof. In some examples, the means for receiving the input includes the input device(s) 170, the touch-sensitive layer(s) 175, the button(s) 180, the sensor(s) 185, the communication transceiver(s) 190, or a combination thereof. In some examples, the means for detecting the condition includes the ML engine 150, one or more trained ML models of the ML engine 150, the trained ML model 1120, the trained ML model 1220, the neural network (NN) 1300, the processor(s) 140, or a combination thereof. In some examples, the means for actuating the one or more haptic feedback actuators includes the haptic feedback pattern engine 155, the processor(s) 140, the haptic feedback controller(s) 135, the haptic feedback actuator(s) 130, the haptic feedback actuators 230, or a combination thereof.

FIG. 14B is a flow diagram illustrating a process 1450 for processing media data. The process 1400 may be performed by a media system. In some examples, the media system can include, for example, the media system 100, the processor(s) 140, the haptic feedback controller(s) 135, the second media system 195, the mobile handset 210, the trained ML model 1120, the trained ML model 1220, the NN 1300, the media system that performs the process 1400, the computing system 1500, the processor 1510, or a combination thereof.

At operation 1455, the media system is configured to, and can, receive media content to be output using an output device according to media output settings associated with a media output software application. The output device is configured to output different portions of the media content at different times across a period of time. For instance, the media content can be configured to change across the period of time. Examples of the output device include the output device(s) 110, a visual media output device of the output device(s) 110, the display(s) 115, an audio media output device of the output device(s) 110, the speaker(s) 120, the headphone output(s) 125, the display 240, the output device of the process 1400 of FIG. 14A, the output device 1535, or a combination thereof.

Examples of the software application include the software application(s) 145, the media content modification engine 160, the software application(s) that at least partially generate the media content displayed on the display 240 in FIGS. 3A-3H, the software application(s) that at least partially generate the sound effect 410 and/or the explosion 415, the software application(s) that at least partially generate media content with the player avatar 510 and/or the entity 515 and/or the environment 520, the software application(s) that at least partially generate the sound effect 710 and/or the audio channel pattern 705, the software application(s) corresponding to the player avatar and the corresponding actions (e.g., 810A-810K) of FIG. 8, the software application(s) that at least partially generate the media content displayed on the display 240 in FIG. 9, the software application(s) that at least partially generate the media content displayed on the display 240 in FIGS. 10A-10C, the software application(s) that at least partially generate the image(s) 1105 and/or the media content 1110, the software application(s) that at least partially generate the audio clip(s) 1205 and/or the media content 1210, the software application of operation 1495 of FIG. 14A, one or more software application(s) run using the processor 1510 and/or the computing system 1500, or a combination thereof.

The media content can include a video (e.g., outputting different frames of the video at different times across the period of time), an audio clip (e.g., outputting different portions of the audio clip at different times across the period of time), a slide show or slide deck (e.g., outputting different slides of the slide show or slide deck at different times across the period of time), a video game (e.g., outputting different moments of gameplay at different times across the period of time), any other type of media described herein, or a combination thereof. Examples of the media content include media content at least partially generated by the software application(s) 145, media content at least partially captured using the sensor(s) 185, media content at least partially modified using the media content modification engine 160, media content stored in the media buffer(s) 165, media content to be output using the output device(s) 110, media content that is output using the output device(s) 110, the media content displayed on the display 240 in FIGS. 3A-3H, the sound effect 410, the explosion 415, the player avatar 510, the entity 515, the environment 520, the sound effect 710, the audio channel pattern 705, the player avatar of FIG. 8, the environment of FIG. 8, the actions (e.g., 810A-810K) of FIG. 8, the media content displayed on the display 240 in FIG. 9, the media content displayed on the display 240 in FIGS. 10A-10C, the image(s) 1105, the media content 1110, the audio clip(s) 1205, the media content 1210, the media content of operation 1405 of FIG. 14A, or a combination thereof.

Examples of the media output settings can include settings and/or controls for pausing, playing, stopping, rewinding, fast-forwarding, slow-motion playback, skipping, increasing volume, decreasing volume, or combinations thereof. The media output settings can be associated with a software application that outputs the media content according to the media output settings, such as a media player, video player, audio player, image viewer, presentation presenter, or a combination thereof. In some examples, the media output settings can be controlled using a media player interface, such as the video player interface 1010 of FIGS. 10A-10C.

In some examples, the media content includes visual content that is configured to change across the period of time. Examples of the visual content include the visual content depicting the environment 320 of FIGS. 3A-3H and/or FIG. 9, visual content depicting the explosion 415, visual content depicting the player avatar 510 and/or the entity 515 and/or the environment 520, visual content depicting the player avatar and/or actions (e.g., 810A-810K) and/or environment of FIG. 8, the visual content depicting the environment 1015 of FIGS. 10A-10C, the image(s) 1105 of the media content 1110, or a combination thereof. In some examples, the output device includes a display configured to display the visual content. In some examples, the media system includes a display. Examples of the display include the display(s) 115, the display 240, and/or the output device 1535.

In some examples, the visual content includes a video that is configured to change across the period of time. In some examples, the media output software application includes a video player. In some examples, the media output settings include video settings associated with the video player, and the video player plays the video according to the video settings. Examples of a video player are illustrated in FIGS. 10A-10C. The video player of FIGS. 10A-10C plays a video of the environment 1015, and includes a video player interface 1010 for controlling the video settings.

In some examples, the visual content includes a presentation that is configured to change across the period of time. For examples, the presentation can include a slide show, a slide deck, a set of images, and/or a set of files. In some examples, the media output software application includes a presentation presenter. In some examples, the media output settings include presentation settings associated with the presentation presenter, and the presentation presenter presents the presentation according to the presentation settings.

In some examples, the media content includes audio content that is configured to change across the period of time. Examples of the audio content include the sound effect 410, the sound effect 710, the audio clip(s) 1205, and/or the sound 1230. In some examples, the output device includes an audio output device configured to play the audio content. In some examples, the media system includes the audio output device. Examples of the audio output device include one or more speakers 120, one or more speaker connectors (e.g., audio jacks) to which one or more speakers 120 can be coupled, one or more headphone outputs 125 (e.g., one or more headphones, one or more headsets, and/or one or more headphone connectors (e.g., headphone jacks) to which headphones can be connected), or combinations thereof. In some examples, the audio content includes an audio track of a video, and the audio track is configured to change across the period of time. In some examples, the audio content can include sounds that come from an environment, such as sounds made by one or more entities in the environment (e.g., footsteps of a person in the environment, shots fired in the environment, explosions in the environment, music playing in the environment), sounds playing while the environment is displayed (e.g., background music), sounds associated with a user interface (e.g., corresponding to button presses), or combinations thereof.

In some examples, the media content depicts or otherwise includes a representation of an environment. Examples of the environment include an environment at least partially generated by the software application(s) 145, an environment at least partially captured using the sensor(s) 185, an environment at least partially modified using the media content modification engine 160, the environment 320 of FIGS. 3A-3H and/or FIG. 9, the environment that includes the explosion 415 and/or from which the sound effect 410 comes, the environment 520, the environment from which sound effect 710 comes according to the audio channel pattern 705, the environment of FIG. 8 that includes the player avatar of FIG. 8, the environment 1015, an environment depicted in the image(s) 1105, an environment represented in the media content 1110, an environment from which the audio clip(s) 1205 come, an environment represented in the media content 1210, an environment represented in the media content of operation 1405 of FIG. 14A, or a combination thereof.

At operation 1460, the media system is configured to, and can, detect a condition associated with the media content at a time along the period of time. Examples of the time include the respective moments in time illustrated in the media content of any of FIGS. 3A-3H, FIG. 9, and/or FIGS. 10A-10C. An illustrative example of the first time is represented by the position of the scrubber of the video player interface 1010 in FIGS. 10A-10C, where the entire width of the scrubber of the video player interface 1010 represents the period of time.

In some examples, the media system detecting a scene condition represented within visual content of the media content at least at the first time to detect the condition in operation 1460. In some examples, the scene condition includes a region of interest (RoI) in the media content (e.g., a region of an image and/or of an object or element depicted in the image). In some examples, the scene condition and/or RoI includes an object (or at least a portion thereof). In some examples, the scene condition includes a change in an image property, such as luminosity, saturation, brightness, contrast, perspective, field of view, color balance, or a combination thereof.

In some examples, the detecting of the condition associated with the media content at the first time is performed using the machine learning (ML) engine 150, one or more trained ML models of the ML engine 150, the trained ML model 1120, the trained ML model 1220, the neural network (NN) 1300, or a combination thereof. In some examples, detection of the condition associated with the media content at the first time includes detection of an object in visual media content of the media content at least at the first time within the visual media content, as in the determination of the identity 1135 of the object 1130 in the image(s) 1105 by the trained ML model 1120. In some examples, detection of the condition associated with the media content at the first time includes detection of a sound effect in audio media data from the environment at least at the first time within the audio media data, as in the determination of the identity 1235 of the sound 1230 in the audio clip(s) 1205 by the trained ML model 1220.

In an illustrative example, detection of the condition associated with the media content at the first time includes detection of the goal 1025 at a timestamp in the video of FIG. 10B, the timestamp representing the first time. In another illustrative example, detection of the condition associated with the media content at the first time includes detection of the cheering 1045 at a timestamp in the video of FIG. 10B, the timestamp representing the first time.

In some examples, detection of the condition associated with the media content at the first time includes detection of one or more movements of the player avatar 305 within the environment 320, one or more changes in pose of the player avatar 305 within the environment 320 and/or the environment 1015, one or more actions undertaken by the player avatar 305 within the environment 320 and/or the environment 1015, one or more changes in the field of view of the environment 320 and/or the environment 1015, one or more changes to another entity in the environment 320 and/or the environment 1015, one or more changes to the environment 320 itself, one or more actions undertaken by another entity in the environment 320 and/or the environment 1015, one or more actions undertaken by the environment 320 and/or the environment 1015 itself, one or more actions undertaken to the environment 320 and/or the environment 1015, one or more changes to the minimap 325 view of the environment 320 and/or the environment 1015, one or more additions of one or more elements to the environment 320 and/or the environment 1015 (e.g., one or more bullets from the weapon as in FIG. 3D, one or more the message 355, one or more the treasure chest item 360 of FIG. 3F, one or more the explosion 365 of FIG. 3G, one or more the blood effect 370 of FIG. 3H, one or more the message 905, one or more the message 910), one or more changes to one or more elements of the environment 320 and/or the environment 1015 (e.g., one or more the change to the ammo counter 312 of FIG. 3D, one or more the change to the health meter 310 of FIG. 3H), one or more removals to one or more elements from the environment 320 and/or the environment 1015, one or more of the actions (e.g., one or more 810A-810K) of FIG. 8, the flight 810A, the skydiving 810B, the parachuting 810C, the landing 810D, the collecting of the item 810E, the firing of the weapon 810F, the enemy encounter 810G, the sneaking 810H, the driving of the vehicle 810J, the victory 810K, playing of a sound in the environment (e.g., one or more the sound effect 410, one or more the sound effect 710, one or more the audio clip 1205, one or more the sound 1230), or a combination thereof.

In some examples, to detect the condition associated with the environment, the media system is configured to, and can, detect that an object is depicted within visual content of the media content at least at the first time. For example, the media system can detect an identity 1135 of an object 1130 identified within image(s) 1105 using a trained ML model 1120. In some examples, to detect the condition associated with the environment, the media system is configured to, and can, detect that a sound is present within audio content of the media content at least at the first time. For example, the media system can detect an identity 1235 of sound 1230 identified within audio clip(s) 1205 using a trained ML model 1220.

In some examples, the media content includes an aspect indicative of the condition associated with the environment. To detect the condition associated with the environment, the media system is configured to, and can, detect the aspect of the media content that is indicative of the condition associated with the environment. In some examples, the aspect can include depiction of the object 1130 in visual content (e.g., image(s) 1105) of the media content 1110 (e.g., at least at the first time), to be detected using the trained ML model 1120. In some examples, the aspect can include inclusion of the sound 1230 in audio content (e.g., audio clip(s) 1205) of the media content 1210 (e.g., at least at the first time), to be detected using the trained ML model 1220.

In some examples, the media system is configured to, and can, receive, from a user interface, an input. Examples of the user interface include the input device(s) 170, the touch-sensitive layer 175, the button(s) 180, the sensor(s) 185, the communication transceiver(s) 190, a touch-sensitive layer of the display 240, button(s) of the mobile handset 210, camera (s) of the mobile handset 210, microphone(s) of the mobile handset 210, sensor(s) of the mobile handset 210, the virtual buttons 330L, the virtual buttons 330R, the virtual joystick 335, the touch-sensitive layer 610, the touchscreen 615, the video player interface 1010, the input device 1545, or a combination thereof. Examples of the sensor(s) 185 of the user interface include one or more cameras, image sensors, microphones, depth sensors, accelerometers, gyroscopes, positioning receivers (e.g., global navigation satellite system (GNSS) receivers), inertial measurement units (IMUs), or combinations thereof. Depth sensors can include, for example, light detection and ranging (LiDAR) sensors, radio detection and ranging (RADAR) sensors, sound detection and ranging (SODAR) sensors, sound navigation and ranging (SONAR) sensors, time of flight (ToF) sensors, structured light sensors, stereoscopic cameras, or combinations thereof.

Examples of the input include an input received using the input device(s) 170, an input received using the touch-sensitive layer 175, an input received using the button(s) 180, an input received using the sensor(s) 185, an input received using the communication transceiver(s) 190, an input received from the second media system 195, an input received at using the virtual buttons 330L, an input received at using the virtual buttons 330R, an input received at using the virtual joystick 335, an input received at using the hand 345 touching the display 240, an input to the touch-sensitive layer 610 of the touchscreen 615, an input having the pressure 605, an input for performing the actions (e.g., 810A-810K) of FIG. 8, an input to the video player interface 1010, an input received using the input device 1545, or a combination thereof. Examples of the input, in the context of the sensor(s) 185, include one or more images, videos, audio clips, depth information (e.g., point clouds), motion information, acceleration information (e.g., from an accelerometer), orientation information (e.g., from a gyroscope), or combinations thereof.

In some examples, to detect the condition associated with the media content, the media system is configured to, and can, identify the input. For example, to detect the condition associated with the media content at the first time, the media system can detect that the input interact with the video player interface 1010, for example to change the media output settings. In some examples, the input is indicative of an effect on the media output settings. In some examples, to detect the condition associated with the media content, the media system is configured to, and can, identify the effect on the media output settings. For example, the effect on the media output settings can include pausing, playing, stopping, rewinding, fast-forwarding, slow-motion playback, skipping, increasing volume, decreasing volume, or combinations thereof. In some examples, the input is indicative of an effect on the media output settings, and the media content includes an aspect indicative of the effect on the media output settings. For example, if the effect is a fast-forward effect, the aspect can include fast-forward playback of the media content. If the effect is a rewind effect, the aspect can include reversed or rewound playback of the media content. If the effect is a slow-motion effect, the aspect can include slow-motion playback of the media content. If the effect is a pause or stop effect, the aspect can include paused or stopped playback of the media content.

In some examples, the input is indicative of the first time. For instance, the input can include an input indicating a skip function or an input to a scrubber interface (e.g., the scrubber of the video player interface 1010) that moves the playback of the media content to the first time. In some examples, the input can be received at the first time, and can cause the condition to occur and/or to be detected. In some examples, the input is indicative of the condition. In some examples, the input is indicative of the haptic feedback pattern. For example, the input to the fire button of the virtual buttons 330R using the hand 345 can occur at a first time, thus be indicative of the first time, can cause the condition (e.g., firing of the weapon and/or the fire button being pressed), and/or can be indicative of the haptic feedback pattern (e.g., the location of the input can correspond to the localized haptic feedback 340D).

In some examples, the media content includes visual content that is configured to vary across the period of time (e.g., a video, a slide show, a slide deck, a video game, or another form of visual content discussed herein). The output device can include a display configured to display the visual content. In some examples, the visual content includes a video that is configured to change across the period of time, the media output software application includes a video player, the media output settings include video settings associated with the video player, and the video player plays the video according to the video settings. In some examples, the visual content includes a representation of an environment that is at least partially generated by the media output software application. In some examples, the media output software application is a video game, and the condition is associated with gameplay of the video game. For instance, the environment can be part of an environment generated for the video game, for an XR application, for a metaverse application, for an interactive application, or a combination thereof.

In some examples, the media content includes audio content that is configured to vary across the period of time. The output device can include an audio output device (e.g., speaker(s), headphone(s), headset(s), and/or connectors for connecting any of these) configured to play the audio content. In some examples, the audio content includes an audio track of a video, and the audio track is configured to vary across the period of time. In some examples, the audio content that includes at least one sound associated with an environment that is at least partially generated by the media output software application (e.g., a video game, an XR application, a metaverse application, an interactive application, or a combination thereof).

In some examples, the media system is configured to, and can, detecting that a sound is included within audio content of the media content at least at the first time to detect the condition. In some examples, the media system is configured to, and can, detecting receipt of an input from a user interface at the first time to detect the condition. In some examples, the media system is configured to, and can, detecting a motion using a motion sensor at the first time to detect the condition. In some examples, the media system is configured to, and can, detecting a change in the media output settings to detect the condition. In some examples, the media system is configured to, and can, detecting an aspect of the media content that is indicative of the condition associated with the media content to detect the condition associated with the media content.

At operation 1465, the media system is configured to, and can, actuate at least one haptic feedback actuator according to a haptic feedback pattern corresponding to the condition. Examples of the at least one haptic feedback actuator include the haptic feedback actuator(s) 130 and/or the haptic feedback actuators 230. In some examples, the media system actuates the at least one haptic feedback actuator according to the haptic feedback pattern using the haptic feedback pattern engine 155 and/or the haptic feedback controller 135.

In some examples, the media system generates the haptic feedback pattern corresponding to the condition before actuating the at least one haptic feedback actuator according to a haptic feedback pattern. In some examples, the media system uses the haptic feedback pattern engine 155 to generate the haptic feedback pattern corresponding to the condition. Examples of the haptic feedback pattern include the localized haptic feedback 340C, the localized haptic feedback 340D, the localized haptic feedback 340E, the localized haptic feedback 340F, the localized haptic feedback 340G, the localized haptic feedback 340H, the haptic waveform 430, the haptic feedback pattern 435, the haptic waveform 530, the haptic feedback pattern 535, the haptic waveform 630, the haptic feedback pattern 635, the localized haptic feedback 725, the haptic feedback pattern 730, the haptic feedback pattern 805A, the haptic feedback pattern 805B, the haptic feedback pattern 805C, the haptic feedback pattern 805D, the haptic feedback pattern 805E, the haptic feedback pattern 805F, the haptic feedback pattern 805G, the haptic feedback pattern 805H, the haptic feedback pattern 805J, the haptic feedback pattern 805K, the localized haptic feedback 1020, the localized haptic feedback 1040, the haptic feedback pattern of operation 1415 of FIG. 14A, or a combination thereof.

Examples of the generating the haptic feedback pattern (or an aspect of the haptic feedback pattern) corresponding to the condition are illustrated in FIG. 1, FIGS. 3C-3H, FIG. 4, FIG. 5, FIG. 6, FIG. 7, FIG. 8, FIGS. 10B-10C, FIG. 13, FIG. 14A, or a combination thereof.

In some examples, the haptic feedback pattern indicates that the at least one haptic feedback actuator is to be actuated to provide a localized haptic feedback effect. Examples of the localized haptic feedback effect include the localized haptic feedback 340C-340H, the localized haptic feedback 725, the localized haptic feedback 1020, the localized haptic feedback 1040, or a combination thereof.

In some examples, the haptic feedback pattern indicates that the at least one haptic feedback actuator is to be actuated without actuating a second haptic feedback actuator of the method. For instance, in some examples, the haptic feedback pattern indicates that a first haptic feedback actuator of the one or more haptic feedback actuators is to be actuated without actuating a second haptic feedback actuator. In some examples, to actuate the one or more haptic feedback actuators according to the haptic feedback pattern, the media system is configured to actuate the first haptic feedback actuator without actuating the second haptic feedback actuator. In some examples, the haptic feedback pattern indicates that the at least one haptic feedback actuator is to be actuated to provide a localized haptic feedback effect at a first region of the method without providing a corresponding feedback effect at a second region of the method. For example, for the localized haptic feedback illustrated in FIGS. 3C-3H, FIG. 7, and FIGS. 10B-10C, the first haptic feedback actuator can be one of the haptic feedback actuators in the region highlighted by the triple black line rounded rectangle, while the second haptic feedback actuator can be one of the haptic feedback actuators outside of the region highlighted by the triple black line rounded rectangle. In some examples, the output device includes a display that displays first visual content of the media content and second visual content of the media content. In some examples, the first haptic feedback actuator is adjacent to a first region of the display that displays the first visual content, and the second haptic feedback actuator is adjacent to a second region of the display that displays the second visual content. This is illustrated at least in FIGS. 3C-3H and FIGS. 10B-10C. In some examples, the condition is associated with an entity in the environment that is closer to a first portion of the environment depicted in the first visual content than to a second portion of the environment depicted in the second visual content. For instance, the entity in the environment can be in the first portion of the environment, and can be missing from the second portion of the environment. For instance, in some examples, the media system is configured to, and can, detect that an object is represented within visual content of the media content at least at the first region, with the localized haptic feedback effect at the first region being based on the object (and/or the detection thereof). Examples of the entity include the enemy character 315 of FIG. 3C, the fire button of the virtual buttons 330R in FIG. 3D, the message 355 in FIG. 3E, the treasure chest item 360 in FIG. 3F, the explosion 365 in FIG. 3G, the blood effect 370 of FIG. 3H, the goal 1025 of FIG. 10B, the cheering 1045 and/or the audience and/or the message 1050 of FIG. 10C, or a combination thereof.

In some examples, the haptic feedback pattern indicates a haptic feedback intensity of haptic feedback by the at least one haptic feedback actuator. Haptic feedback intensity can be referred to as amplitude. Haptic feedback intensity can be expressed as the amplitude of a haptic waveform. Examples of the haptic feedback intensity include the value along the vertical amplitude axis 445 of the haptic waveform 430, the value along the vertical amplitude axis 545 of the haptic waveform 530, and/or the value along the vertical amplitude axis 645 of the haptic waveform 630.

In some examples, the haptic feedback intensity of the haptic feedback pattern corresponds to a proximity of a first entity depicted in the media content to a second entity depicted in the media content. The proximity can be expressed as a distance, with lower distance corresponding to higher proximity, and higher distance corresponding to lower proximity. For example, the proximity can be expressed as the distance 505 of FIG. 5. An example of a haptic feedback intensity that corresponds to proximity is illustrated in FIG. 5. In some examples, the localized haptic feedback 1020 of FIG. 10B can correspond to the proximity of the soccer ball (e.g., the first entity) to the goal (e.g., the second entity), increasing until the soccer ball enters the goal to score a goal 1025. In some examples, the haptic feedback intensity of the haptic feedback pattern corresponds to an intensity of the condition associated with the media content. For example, the haptic feedback intensity of the haptic feedback pattern can correspond to an intensity of the goal 1025, of the cheering 1045, of any of the actions (e.g., actions 810A-810K) of FIG. 8, of the firing of FIG. 3D, of the explosion 365, of the injury corresponding to the blood effect 370, of the sound effect 410, of the explosion 415, or a combination thereof. In some examples, the haptic feedback intensity of the haptic feedback pattern corresponds to a volume of a sound, where the media content includes the sound. An example of haptic feedback intensity that corresponds to a volume of a sound is illustrated in FIG. 4. The volume of the sound can be referred to as an amplitude of a sound effect, such as the value along the vertical amplitude axis 425 of the audio waveform 405. For instance, in some examples, a louder sound can correspond to a higher haptic feedback intensity, while a quieter sound can correspond to a lower haptic feedback intensity, or vice versa.

In some examples, the haptic feedback pattern indicates a haptic feedback waveform of the haptic feedback pattern by the one or more haptic feedback actuators. Examples of the haptic feedback waveform include the haptic feedback waveform 430, the haptic feedback waveform 530, and/or the haptic feedback waveform 630. In some examples, the haptic feedback pattern indicates a frequency of the haptic feedback waveform. In some examples, the haptic feedback pattern indicates a wavelength of the haptic feedback waveform. In some examples, the haptic feedback pattern indicates an amplitude of the haptic feedback waveform. The amplitude of the haptic feedback waveform can be referred to as the haptic feedback intensity. In some examples, the haptic feedback pattern indicates a waveform, a frequency, a wavelength, an amplitude, or a combination thereof. The amplitude of the haptic feedback waveform can refer to the value of a haptic feedback waveform along an amplitude axis, such as the value of the haptic feedback waveform 430 along the vertical amplitude axis 445, the value of the haptic feedback waveform 530 along the vertical amplitude axis 545, and/or the value of the haptic feedback waveform 630 along the vertical amplitude axis 645. In some examples, the media system is configured to, and can, generate the haptic feedback waveform of haptic feedback pattern based on an audio waveform of a sound, where the media content includes the sound. An example of generation of the haptic feedback waveform based on the audio waveform is illustrated with respect to generation of the haptic feedback waveform 430 based on the audio waveform 405 in FIG. 4. For instance, a frequency, a wavelength, and/or an amplitude of at least a portion of the haptic feedback waveform can be based on, a frequency, a wavelength, and/or an amplitude of at least a portion of the audio waveform.

In some examples, the media system is configured to, and can, output the media content using the output device. In some examples, the media system is configured to, and can, modify the media content before the media content is configured to be output using the output device. Modification of the media content can be performed using the media content modification engine 160 of the media system. In some examples, the media system is configured to, and can, receive a message (e.g., over a network from a second device). For example, the media system can receive the message via the communication transceiver(s) 190 over the network from the second media system 195. To modify the media content, the media system is configured to, and can, incorporate the message into the media content before the media content is configured to be output using the output device. The media system can overlay the message over a portion of the visual content of the media content, as in the message 355, the message 905, the message 910, the message 1030, and/or the message 1050. The media system can incorporate an audio representation of the message, and/or an audio portion of the message, by playing the audio over a portion of the audio content of the media content. In some examples, the message includes one or more alphanumeric characters (e.g., the message 355, the message 905, the message 1030, the message 1050). In some examples, the message includes one or more images (e.g., the message 905, the message 910, the message 1030, the message 1050). In some examples, the message includes one or more sounds.

In some examples, the condition is associated with the message. In some examples, the haptic feedback pattern is associated with the message. Examples are illustrated with respect to the localized haptic feedback 340E corresponding to the position of the message 355 and the localized haptic feedback 1040 corresponding to the position of the message 1050.

In some examples, the haptic feedback pattern can be based on one or more inputs from the media system and/or one or more other devices. For example, the one or more inputs can include interactions on a social media post that includes the media content, such as user "liking" or sharing the social media post. The haptic feedback pattern can include haptic feedback timed to moments during playback of the media content (e.g., the first time) during which such inputs (e.g. likes, shares) were received during previous playbacks of the media content, with an intensity of the haptic feedback corresponding to the quantity of such inputs at those times. The haptic feedback pattern can include haptic feedback timed to moments when such inputs (e.g. likes, shares) are received, in real-time or with a delay.

In some examples, the haptic feedback pattern can be set and/or edited using an application programming interface (API) and/or software development kit (SDK).

In some aspects, the media system can include: means for receiving media content to be output using an output device according to media output settings associated with a media output software application, wherein the output device is configured to output different portions of the media content at different times across a period of time; means for detecting a condition associated with the media content at a first time along the period of time; and means for actuating at least one haptic feedback actuator according to a haptic feedback pattern corresponding to the condition.

In some examples, the means for receiving the media content includes the software application(s) 145, the sensor(s) 185, the communication transceiver(s) 190, the media content modification engine(s) 160, the media buffer(s) 165, the processor(s) 140, or a combination thereof. In some examples, the means for detecting the condition includes the ML engine 150, one or more trained ML models of the ML engine 150, the trained ML model 1120, the trained ML model 1220, the neural network (NN) 1300, the processor(s) 140, or a combination thereof. In some examples, the means for actuating the one or more haptic feedback actuators includes one or more haptic feedback actuators includes the haptic feedback pattern engine 155, the processor(s) 140, the haptic feedback controller(s) 135, the haptic feedback actuator(s) 130, the haptic feedback actuators 230, or a combination thereof.

In some examples, the processes described herein (e.g., the process of FIG. 1, the processes of FIGS. 3C-3H, the process of FIG. 4, the process of FIG. 5, the process of FIG. 6, the process of FIG. 7, the process of FIG. 8, the process of FIG. 9, the processes of FIGS. 10B-10C, the process of FIG. 11, the process of FIG. 12, the process of FIG. 13, the process 1400 of FIG. 14A, the process 1450 of FIG. 14B, and/or other process described herein) may be performed by a computing device or apparatus. In some examples, the processes described herein and listed above herein can be performed by the media system 100, one of the mobile handsets 210, or a combination thereof. In another example, the processes described herein can be performed by a computing device with the computing system 1500 shown in FIG. 15.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes described herein and listed above. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein and listed above are illustrated as logical flow diagrams, block diagrams, and/or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process described herein and listed above may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
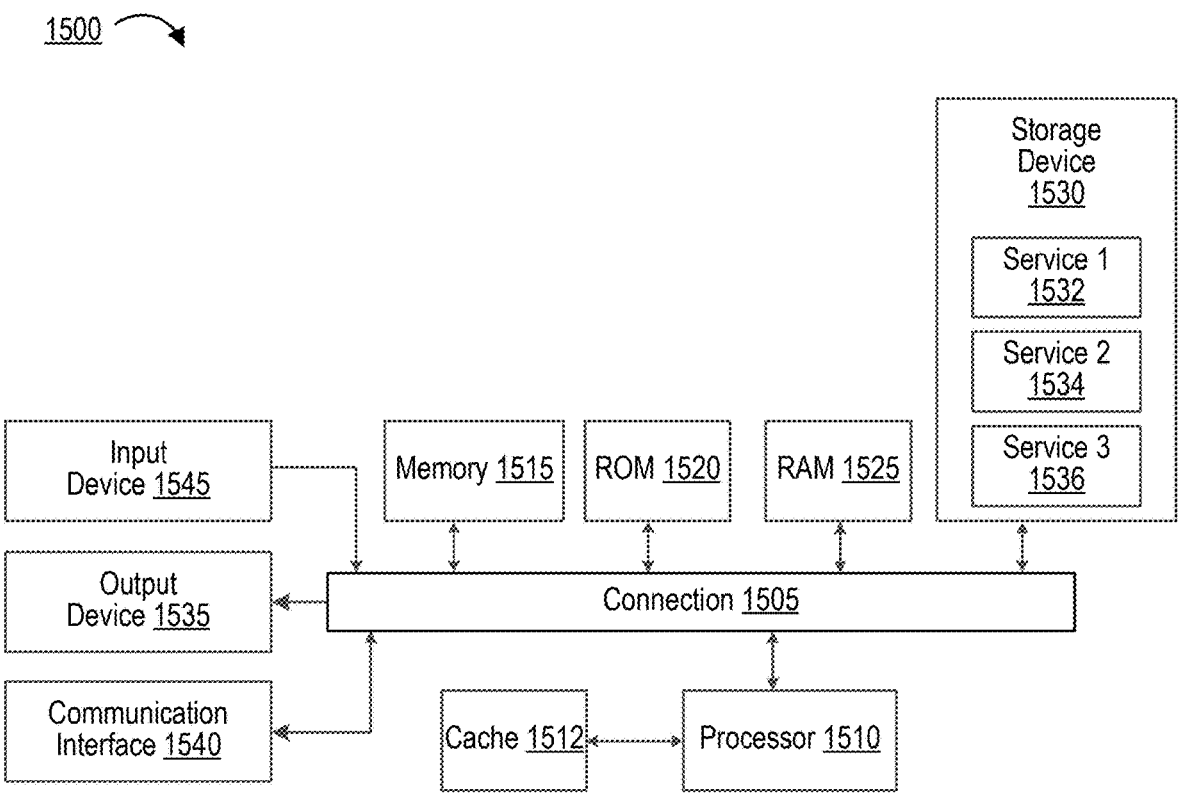
FIG. 15 is a diagram illustrating an example of a computing system for implementing certain aspects described herein.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communication interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1A. An apparatus for processing media data, the apparatus comprising: at least one memory; and at least one processor coupled to the at least one memory, the at least one processor configured to: receive media content to be output using an output device according to media output settings associated with a media output software application, wherein the output device is configured to output different portions of the media content at different times across a period of time; detect a condition associated with the media content at a first time along the period of time; and actuate at least one haptic feedback actuator according to a haptic feedback pattern corresponding to the condition.

Aspect 2A. The apparatus of Aspect 1A, wherein the at least one processor is configured to: detect a scene condition represented within visual content of the media content at least at the first time to detect the condition.

Aspect 3A. The apparatus of any of Aspects 1A to 2A, wherein the scene condition includes a region of interest.

Aspect 4A. The apparatus of any of Aspects 1A to 3A, wherein the scene condition includes an object.

Aspect 5A. The apparatus of any of Aspects 1A to 4A, wherein the media output software application is a video game, and wherein the condition is associated with gameplay of the video game.

Aspect 6A. The apparatus of any of Aspects 1A to 5A, wherein the scene condition includes a change in an image property, wherein the image property includes at least one of luminosity, saturation, brightness, contrast, perspective, field of view, or color balance.

Aspect 7A. The apparatus of any of Aspects 1A to 6A, wherein the visual content includes a representation of an environment that is at least partially generated by the media output software application.

Aspect 8A. The apparatus of any of Aspects 1A to 7A, wherein the media content includes visual content that is configured to vary across the period of time, wherein the output device includes a display configured to display the visual content.

Aspect 9A. The apparatus of any of Aspects 1A to 8A, wherein the visual content includes a video that is configured to change across the period of time, wherein the media output software application includes a video player, wherein the media output settings include video settings associated with the video player, and wherein the video player plays the video according to the video settings.

Aspect 10A. The apparatus of any of Aspects 1A to 9A, wherein the media content includes audio content that is configured to vary across the period of time, wherein the output device includes an audio output device configured to play the audio content.

Aspect 11A. The apparatus of any of Aspects 1A to 10A, wherein the audio content includes an audio track of a video, wherein the audio track is configured to vary across the period of time.

Aspect 12A. The apparatus of any of Aspects 1A to 11A, wherein the audio content that includes at least one sound associated with an environment that is at least partially generated by the media output software application.

Aspect 13A. The apparatus of any of Aspects 1A to 12A, wherein the at least one processor is configured to: detect that a sound is included within audio content of the media content at least at the first time to detect the condition.

Aspect 14A. The apparatus of any of Aspects 1A to 13A, wherein the at least one processor is configured to: detect receipt of an input from a user interface at the first time to detect the condition.

Aspect 15A. The apparatus of any of Aspects 1A to 14A, wherein the at least one processor is configured to: detect a motion using a motion sensor at the first time to detect the condition.

Aspect 16A. The apparatus of any of Aspects 1A to 15A, wherein the at least one processor is configured to: detect a change in the media output settings to detect the condition.

Aspect 17A. The apparatus of any of Aspects 1A to 16A, wherein the at least one processor is configured to: detect an aspect of the media content that is indicative of the condition associated with the media content to detect the condition associated with the media content.

Aspect 18A. The apparatus of any of Aspects 1A to 17A, wherein the haptic feedback pattern indicates that the at least one haptic feedback actuator is to be actuated without actuating a second haptic feedback actuator of the apparatus.

Aspect 19A. The apparatus of any of Aspects 1A to 18A, wherein the haptic feedback pattern indicates that the at least one haptic feedback actuator is to be actuated to provide a localized haptic feedback effect at a first region of the apparatus without providing a corresponding feedback effect at a second region of the apparatus.

Aspect 20A. The apparatus of any of Aspects 1A to 19A, wherein the at least one processor is configured to: detect that an object is represented within visual content of the media content at least at the first region, wherein the localized haptic feedback effect at the first region is based on the object.

Aspect 21A. The apparatus of any of Aspects 1A to 20A, wherein the haptic feedback pattern indicates a haptic feedback intensity of haptic feedback by the at least one haptic feedback actuator.

Aspect 22A. The apparatus of any of Aspects 1A to 21A, wherein the haptic feedback intensity of the haptic feedback pattern corresponds to a proximity of a first entity represented in the media content to a second entity represented in the media content.

Aspect 23A. The apparatus of any of Aspects 1A to 22A, wherein the haptic feedback intensity of the haptic feedback pattern corresponds to an intensity of the condition associated with the media content.

Aspect 24A. The apparatus of any of Aspects 1A to 23A, wherein the haptic feedback intensity of the haptic feedback pattern corresponds to a volume of a sound, wherein the media content includes the sound.

Aspect 25A. The apparatus of any of Aspects 1A to 24A, wherein the haptic feedback pattern indicates at least one of a waveform, a frequency, or an amplitude of the haptic feedback pattern by the at least one haptic feedback actuator.

Aspect 26A. The apparatus of any of Aspects 1A to 25A, wherein the at least one processor is configured to: generate a haptic feedback waveform of the haptic feedback pattern based on an audio waveform of a sound, wherein the media content includes the sound.

Aspect 27A. The apparatus of any of Aspects 1A to 26A, wherein the at least one processor is configured to: output the media content using the output device.

Aspect 28A. The apparatus of any of Aspects 1A to 27A, wherein the at least one processor is configured to: receive a message; and modify the media content to incorporate the message into the media content before the media content is configured to be output using the output device.

Aspect 29A. The apparatus of any of Aspects 1A to 28A, wherein the apparatus includes at least one of a mobile handset, a wireless communication device, and a head-mounted display.

Aspect 30A. A method for processing media data, the method comprising: receiving media content to be output using an output device according to media output settings associated with a media output software application, wherein the output device is configured to output different portions of the media content at different times across a period of time; detecting a condition associated with the media content at a first time along the period of time; and actuating at least one haptic feedback actuator according to a haptic feedback pattern corresponding to the condition.

Aspect 31A. The method of Aspect 30A, further comprising: detecting a scene condition represented within visual content of the media content at least at the first time to detect the condition.

Aspect 32A. The method of any of Aspects 30A to 31A, wherein the scene condition includes a region of interest.

Aspect 33A. The method of any of Aspects 30A to 32A, wherein the scene condition includes an object.

Aspect 34A. The method of any of Aspects 30A to 33A, wherein the media output software application is a video game, and wherein the condition is associated with gameplay of the video game.

Aspect 35A. The method of any of Aspects 30A to 34A, wherein the scene condition includes a change in an image property, wherein the image property includes at least one of luminosity, saturation, brightness, contrast, perspective, field of view, or color balance.

Aspect 36A. The method of any of Aspects 30A to 35A, wherein the visual content includes a representation of an environment that is at least partially generated by the media output software application.

Aspect 37A. The method of any of Aspects 30A to 36A, wherein the media content includes visual content that is configured to vary across the period of time, wherein the output device includes a display configured to display the visual content.

Aspect 38A. The method of any of Aspects 30A to 37A, wherein the visual content includes a video that is configured to change across the period of time, wherein the media output software application includes a video player, wherein the media output settings include video settings associated with the video player, and wherein the video player plays the video according to the video settings.

Aspect 39A. The method of any of Aspects 30A to 38A, wherein the media content includes audio content that is configured to vary across the period of time, wherein the output device includes an audio output device configured to play the audio content.

Aspect 40A. The method of any of Aspects 30A to 39A, wherein the audio content includes an audio track of a video, wherein the audio track is configured to vary across the period of time.

Aspect 41A. The method of any of Aspects 30A to 40A, wherein the audio content that includes at least one sound associated with an environment that is at least partially generated by the media output software application.

Aspect 42A. The method of any of Aspects 30A to 41A, wherein the at least one processor is configured to: detect that a sound is included within audio content of the media content at least at the first time to detect the condition.

Aspect 43A. The method of any of Aspects 30A to 42A, further comprising: detecting receipt of an input from a user interface at the first time to detect the condition.

Aspect 44A. The method of any of Aspects 30A to 43A, further comprising: detecting a motion using a motion sensor at the first time to detect the condition.

Aspect 45A. The method of any of Aspects 30A to 44A, further comprising: detecting a change in the media output settings to detect the condition.

Aspect 46A. The method of any of Aspects 30A to 45A, further comprising: detecting an aspect of the media content that is indicative of the condition associated with the media content to detect the condition associated with the media content.

Aspect 47A. The method of any of Aspects 30A to 46A, wherein the haptic feedback pattern indicates that the at least one haptic feedback actuator is to be actuated without actuating a second haptic feedback actuator of the method.

Aspect 48A. The method of any of Aspects 30A to 47A, wherein the haptic feedback pattern indicates that the at least one haptic feedback actuator is to be actuated to provide a localized haptic feedback effect at a first region of the method without providing a corresponding feedback effect at a second region of the method.

Aspect 49A. The method of any of Aspects 30A to 48A, further comprising: detecting that an object is represented within visual content of the media content at least at the first region, wherein the localized haptic feedback effect at the first region is based on the object.

Aspect 50A. The method of any of Aspects 30A to 49A, wherein the haptic feedback pattern indicates a haptic feedback intensity of haptic feedback by the at least one haptic feedback actuator.

Aspect 51A. The method of any of Aspects 30A to 50A, wherein the haptic feedback intensity of the haptic feedback pattern corresponds to a proximity of a first entity represented in the media content to a second entity represented in the media content.

Aspect 52A. The method of any of Aspects 30A to 51A, wherein the haptic feedback intensity of the haptic feedback pattern corresponds to an intensity of the condition associated with the media content.

Aspect 53A. The method of any of Aspects 30A to 52A, wherein the haptic feedback intensity of the haptic feedback pattern corresponds to a volume of a sound, wherein the media content includes the sound.

Aspect 54A. The method of any of Aspects 30A to 53A, wherein the haptic feedback pattern indicates at least one of a waveform, a frequency, or an amplitude of the haptic feedback pattern by the at least one haptic feedback actuator.

Aspect 55A. The method of any of Aspects 30A to 54A, further comprising: generating a haptic feedback waveform of the haptic feedback pattern based on an audio waveform of a sound, wherein the media content includes the sound.

Aspect 56A. The method of any of Aspects 30A to 55A, further comprising: outputting the media content using the output device.

Aspect 57A. The method of any of Aspects 30A to 56A, further comprising: receiving a message; and modifying the media content to incorporate the message into the media content before the media content is configured to be output using the output device.

Aspect 58A. The method of any of Aspects 30A to 57A, wherein the method is performed using an apparatus that includes at least one of a mobile handset, a wireless communication device, and a head-mounted display.

Aspect 59A. A non-transitory computer-readable medium having stored thereon instructions that, when executed by one or more processors, cause the one or more processors to: receive media content to be output using an output device according to media output settings associated with a media output software application, wherein the output device is configured to output different portions of the media content at different times across a period of time; detect a condition associated with the media content at a first time along the period of time; and actuate at least one haptic feedback actuator according to a haptic feedback pattern corresponding to the condition.

Aspect 60A. The non-transitory computer-readable medium of Aspect 59A, wherein execution of the instructions by the one or more processors cause the one or more processors to perform one or more operations according to at least one of any of Aspects 2A to 29A and/or Aspects 31A to 58A.

Aspect 61A. An apparatus for processing media data, the apparatus comprising: means for receiving media content to be output using an output device according to media output settings associated with a media output software application, wherein the output device is configured to output different portions of the media content at different times across a period of time; means for detecting a condition associated with the media content at a first time along the period of time; and means for actuating at least one haptic feedback actuator according to a haptic feedback pattern corresponding to the condition.

Aspect 62A. The apparatus of Aspect 61A, further comprising: means for performing one or more operations according to at least one of any of Aspects 2A to 29A and/or Aspects 31A to 58A.

Aspect 1B. An apparatus for processing media data, the apparatus comprising: a memory; and one or more processors coupled to the memory, the one or more processors configured to:
receive media content to be output using an output device according to media output settings associated with a media output software application, wherein the media content is configured to change across a period of time; detect a condition associated with the media content at a first time along the period of time; and actuate one or more haptic feedback actuators according to a haptic feedback pattern corresponding to the condition.

Aspect 2B. The apparatus of Aspect 1B, wherein the media content includes visual content that is configured to change across the period of time, wherein the output device includes a display configured to display the visual content.

Aspect 3B. The apparatus of Aspect 2B, further comprising: the display.

Aspect 4B. The apparatus of any of Aspects 2B or 3B, wherein the visual content includes a video that is configured to change across the period of time.

Aspect 5B. The apparatus of Aspect 4B, wherein the media output software application includes a video player, and wherein the media output settings include video settings associated with the video player, wherein the video player plays the video according to the video settings.

Aspect 6B. The apparatus of any of Aspects 2B to 5B, wherein the visual content includes a presentation that is configured to change across the period of time.

Aspect 7B. The apparatus of Aspect 6B, wherein the media output software application includes a presentation presenter, and wherein the media output settings include presentation settings associated with the presentation presenter, wherein the presentation presenter presents the presentation according to the presentation settings.

Aspect 8B. The apparatus of any of Aspects 1B to 7B, wherein the media content includes audio content that is configured to change across the period of time, wherein the output device includes an audio output device configured to play the audio content.

Aspect 9B. The apparatus of Aspect 8B, further comprising: the audio output device.

Aspect 10B. The apparatus of any of Aspects 8B or 9B, wherein the audio content includes an audio track of a video, wherein the audio track is configured to change across the period of time.

Aspect 11B. The apparatus of any of Aspects 1B to 10B, wherein, to detect the condition associated with the media content, the one or more processors are configured to detect that an object is depicted within visual content of the media content at least at the first time.

Aspect 12B. The apparatus of any of Aspects 1B to 11B, wherein, to detect the condition associated with the media content, the one or more processors are configured to detect that a sound is present within audio content of the media content at least at the first time.

Aspect 13B. The apparatus of any of Aspects 1B to 12B, wherein the media content includes an aspect indicative of the condition associated with the media content, wherein to detect the condition associated with the media content, the one or more processors are configured to detect the aspect of the media content that is indicative of the condition associated with the media content.

Aspect 14B. The apparatus of any of Aspects 1B to 13B, the one or more processors configured to: receive, from a user interface, an input.

Aspect 15B. The apparatus of Aspect 14B, wherein, to detect the condition associated with the media content, the one or more processors are configured to identify the input.

Aspect 16B. The apparatus of any of Aspects 14B or 15B, wherein the input is indicative of an effect on the media output settings, and wherein, to detect the condition associated with the media content, the one or more processors are configured to identify the effect on the media output settings.

Aspect 17B. The apparatus of any of Aspects 14B to 16B, wherein the input is indicative of an effect on the media output settings, and wherein the media content includes an aspect indicative of the effect on the media output settings.

Aspect 18B. The apparatus of any of Aspects 14B to 17B, wherein the input is indicative of the first time.

Aspect 19B. The apparatus of any of Aspects 14B to 18B, wherein the input is indicative of the condition.

Aspect 20B. The apparatus of any of Aspects 14B to 19B, wherein the input is indicative of the haptic feedback pattern.

Aspect 21B. The apparatus of any of Aspects 1B to 20B, wherein the haptic feedback pattern indicates that a first haptic feedback actuator of the one or more haptic feedback actuators is to be actuated without actuating a second haptic feedback actuator.

Aspect 22B. The apparatus of Aspect 21B, wherein, to actuate the one or more haptic feedback actuators according to the haptic feedback pattern, the one or more processors are configured to actuate the first haptic feedback actuator without actuating the second haptic feedback actuator.

Aspect 23B. The apparatus of any of Aspects 21B or 22B, wherein the output device includes a display that displays first visual content of the media content and second visual content of the media content, wherein the first haptic feedback actuator is adjacent to a first region of the display that displays the first visual content, wherein the second haptic feedback actuator is adjacent to a second region of the display that displays the second visual content.

Aspect 24B. The apparatus of Aspect 23B, wherein the condition is associated with an entity that is depicted in the first visual content.

Aspect 25B. The apparatus of any of Aspects 1B to 24B, wherein the haptic feedback pattern indicates a haptic feedback intensity of haptic feedback by the one or more haptic feedback actuators.

Aspect 26B. The apparatus of Aspect 25B, wherein the haptic feedback intensity of the haptic feedback pattern corresponds to a proximity of a first entity depicted in the media content to a second entity depicted in the media content.

Aspect 27B. The apparatus of any of Aspects 25B or 26B, wherein the haptic feedback intensity of the haptic feedback pattern corresponds to an intensity of the condition associated with the media content.

Aspect 28B. The apparatus of any of Aspects 25B to 27B, wherein the haptic feedback intensity of the haptic feedback pattern corresponds to a volume of a sound, wherein the media content includes the sound.

Aspect 29B. The apparatus of any of Aspects 1B to 28B, wherein the haptic feedback pattern indicates a haptic feedback waveform of the haptic feedback pattern by the one or more haptic feedback actuators.

Aspect 30B. The apparatus of Aspect 29B, wherein the haptic feedback pattern indicates a frequency of the haptic feedback waveform.

Aspect 31B. The apparatus of any of Aspects 29B or 30B, wherein the haptic feedback pattern indicates an amplitude of the haptic feedback waveform.

Aspect 32B. The apparatus of any of Aspects 29B to 31B, wherein the one or more processors are configured to generate the haptic feedback waveform of the haptic feedback pattern based on an audio waveform of a sound, wherein the media content includes the sound.

Aspect 33B. The apparatus of any of Aspects 1B to 32B, wherein the one or more processors are configured to: output the media content using the output device.

Aspect 34B. The apparatus of any of Aspects 1B to 33B, wherein the one or more processors are configured to modify the media content before the media content is configured to be output using the output device.

Aspect 35B. The apparatus of Aspect 34B, wherein the one or more processors are configured to: receive a message over a network from a second device, wherein, to modify the media content, the one or more processors are configured to incorporate the message into the media content.

Aspect 36B. The apparatus of Aspect 35B, wherein the message includes one or more alphanumeric characters.

Aspect 37B. The apparatus of any of Aspects 35B or 36B, wherein the message includes one or more images.

Aspect 38B. The apparatus of any of Aspects 35B to 37B, wherein the message includes one or more sounds.

Aspect 39B. The apparatus of any of Aspects 35B to 38B, wherein the condition is associated with the message, and wherein the haptic feedback pattern is associated with the message.

Aspect 40B. The apparatus of any of Aspects 1B to 39B, wherein the apparatus includes at least one of a mobile handset, a wireless communication device, and a head-mounted display.

Aspect 41B. A method for processing media data, the method comprising: receiving media content to be output using an output device according to media output settings associated with a media output software application, wherein the media content is configured to change across a period of time; detecting a condition associated with the media content at a first time along the period of time; and actuating one or more haptic feedback actuators according to a haptic feedback pattern corresponding to the condition.

Aspect 42B. The method of Aspect 41B, wherein the media content includes visual content that is configured to change across the period of time, wherein the output device includes a display configured to display the visual content.

Aspect 43B. The method of Aspect 42B, wherein the method is performed by an apparatus that includes the display.

Aspect 44B. The method of any of Aspects 42B or 43B, wherein the visual content includes a video that is configured to change across the period of time.

Aspect 45B. The method of Aspect 44B, wherein the media output software application includes a video player, and wherein the media output settings include video settings associated with the video player, wherein the video player plays the video according to the video settings.

Aspect 46B. The method of any of Aspects 42B to 45B, wherein the visual content includes a presentation that is configured to change across the period of time.

Aspect 47B. The method of Aspect 46B, wherein the media output software application includes a presentation presenter, and wherein the media output settings include presentation settings associated with the presentation presenter, wherein the presentation presenter presents the presentation according to the presentation settings.

Aspect 48B. The method of any of Aspects 41B to 47B, wherein the media content includes audio content that is configured to change across the period of time, wherein the output device includes an audio output device configured to play the audio content.

Aspect 49B. The method of Aspect 48B, wherein the method is performed by an apparatus that includes the audio output device.

Aspect 50B. The method of any of Aspects 48B or 49B, wherein the audio content includes an audio track of a video, wherein the audio track is configured to change across the period of time.

Aspect 51B. The method of any of Aspects 41B to 50B, wherein detecting the condition associated with the media content includes detecting that an object is depicted within visual content of the media content at least at the first time.

Aspect 52B. The method of any of Aspects 41B to 51B, wherein detecting the condition associated with the media content includes detecting a sound within audio content of the media content at least at the first time.

Aspect 53B. The method of any of Aspects 41B to 52B, wherein the media content includes an aspect indicative of the condition associated with the media content, wherein detecting the condition associated with the media content includes detecting the aspect of the media content that is indicative of the condition associated with the media content.

Aspect 54B. The method of any of Aspects 41B to 53B, further comprising: receiving, from a user interface, an input.

Aspect 55B. The method of Aspect 54B, wherein detecting the condition associated with the media content includes identifying the input.

Aspect 56B. The method of any of Aspects 54B or 55B, wherein the input is indicative of an effect on the media output settings, and wherein detecting the condition associated with the media content includes identifying the effect on the media output settings.

Aspect 57B. The method of any of Aspects 54B to 56B, wherein the input is indicative of an effect on the media output settings, and wherein the media content includes an aspect indicative of the effect on the media output settings.

Aspect 58B. The method of any of Aspects 54B to 57B, wherein the input is indicative of the first time.

Aspect 59B. The method of any of Aspects 54B to 58B, wherein the input is indicative of the condition.

Aspect 60B. The method of any of Aspects 54B to 59B, wherein the input is indicative of the haptic feedback pattern.

Aspect 61B. The method of any of Aspects 41B to 60B, wherein the haptic feedback pattern indicates that a first haptic feedback actuator of the one or more haptic feedback actuators is to be actuated without actuating a second haptic feedback actuator.

Aspect 62B. The method of Aspect 61B, wherein actuating the one or more haptic feedback actuators according to the haptic feedback pattern includes actuating the first haptic feedback actuator without actuating the second haptic feedback actuator.

Aspect 63B. The method of any of Aspects 61B or 62B, wherein the output device includes a display that displays first visual content of the media content and second visual content of the media content, wherein the first haptic feedback actuator is adjacent to a first region of the display that displays the first visual content, wherein the second haptic feedback actuator is adjacent to a second region of the display that displays the second visual content.

Aspect 64B. The method of Aspect 63B, wherein the condition is associated with an entity that is depicted in the first visual content.

Aspect 65B. The method of any of Aspects 41B to 64B, wherein the haptic feedback pattern indicates a haptic feedback intensity of haptic feedback by the one or more haptic feedback actuators.

Aspect 66B. The method of Aspect 65B, wherein the haptic feedback intensity of the haptic feedback pattern corresponds to a proximity of a first entity depicted in the media content to a second entity depicted in the media content.

Aspect 67B. The method of any of Aspects 65B or 66B, wherein the haptic feedback intensity of the haptic feedback pattern corresponds to an intensity of the condition associated with the media content.

Aspect 68B. The method of any of Aspects 41B to 67B, wherein the haptic feedback intensity of the haptic feedback pattern corresponds to a volume of a sound, wherein the media content includes the sound.

Aspect 69B. The method of any of Aspects 41B to 68B, wherein the haptic feedback pattern indicates a haptic feedback waveform of the haptic feedback pattern by the one or more haptic feedback actuators.

Aspect 70B. The method of Aspect 69B, wherein the haptic feedback pattern indicates a frequency of the haptic feedback waveform.

Aspect 71B. The method of any of Aspects 69B or 70B, wherein the haptic feedback pattern indicates an amplitude of the haptic feedback waveform.

Aspect 72B. The method of any of Aspects 69B to 71B, further comprising: generating the haptic feedback waveform of the haptic feedback pattern based on an audio waveform of a sound, wherein the media content includes the sound.

Aspect 73B. The method of any of Aspects 41B to 72B, further comprising: outputting the media content using the output device.

Aspect 74B. The method of any of Aspects 41B to 73B, further comprising: modifying the media content before the media content is configured to be output using the output device.

Aspect 75B. The method of Aspect 74B, further comprising: receiving a message over a network from a second device, wherein modifying the media content includes incorporating the message into the media content.

Aspect 76B. The method of Aspect 75B, wherein the message includes one or more alphanumeric characters.

Aspect 77B. The method of any of Aspects 75B or 76B, wherein the message includes one or more images.

Aspect 78B. The method of any of Aspects 75B to 77B, wherein the message includes one or more sounds.

Aspect 79B. The method of any of Aspects 75B to 78B, wherein the condition is associated with the message, and wherein the haptic feedback pattern is associated with the message.

Aspect 80B. The method of any of Aspects 41B to 79B, wherein the method is performed using apparatus that includes at least one of a mobile handset, a wireless communication device, and a head-mounted display.

Aspect 81B. A non-transitory computer-readable medium having stored thereon instructions that, when executed by one or more processors, cause the one or more processors to: receive media content to be output using an output device according to media output settings associated with a media output software application, wherein the media content is configured to change across a period of time; detect a condition associated with the media content at a first time along the period of time; and actuate one or more haptic feedback actuators according to a haptic feedback pattern corresponding to the condition.

Aspect 82B. The non-transitory computer-readable medium of Aspect 81, wherein execution of the instructions by the one or more processors cause the one or more processors to perform one or more operations according to at least one of Aspects 2B to 40B and/or Aspects 42B to 80B.

Aspect 83B. An apparatus for processing media data, the apparatus comprising: means for receiving media content to be output using an output device according to media output settings associated with a media output software application, wherein the media content is configured to change across a period of time; means for receiving media content to be output using an output device according to media output settings associated with a media output software application, wherein the media content is configured to change across a period of time; means for detecting a condition associated with the media content at a first time along the period of time; and means for actuating one or more haptic feedback actuators according to a haptic feedback pattern corresponding to the condition.

Aspect 84B. The apparatus of Aspect 83B, further comprising: means for performing one or more operations according to at least one of any of Aspects 2B to 40B and/or Aspects 42B to 80B.

What is claimed is:

1. An apparatus for processing media data, the apparatus comprising:
at least one memory; and
at least one processor coupled to the at least one memory, the at least one processor configured to:
receive media content to be output using an output device according to media output settings associated with a media output software application, wherein the output device is configured to output different portions of the media content at different times across a period of time;
detect a condition associated with the media content at a first time along the period of time; and
actuate, according to a haptic feedback vibration pattern corresponding to the condition, a first haptic feedback vibration actuator without actuating a second haptic feedback vibration actuator, wherein the output device is coupled to both the first haptic feedback vibration actuator and the second haptic feedback vibration actuator.

2. The apparatus of claim 1, wherein the at least one processor is configured to:
detect a scene condition represented within visual content of the media content at least at the first time to detect the condition.

3. The apparatus of claim 2, wherein the scene condition includes a region of interest.

4. The apparatus of claim 2, wherein the scene condition includes an object.

5. The apparatus of claim 2, wherein the scene condition includes a change in an image property, wherein the image property includes at least one of luminosity, saturation, brightness, contrast, perspective, field of view, or color balance.

6. The apparatus of claim 1, wherein the media content includes visual content that is configured to vary across the period of time, wherein the output device includes a display configured to display the visual content.

7. The apparatus of claim 6, wherein the visual content includes a video that is configured to change across the period of time, wherein the media output software application includes a video player, wherein the media output settings include video settings associated with the video player, and wherein the video player plays the video according to the video settings.

8. The apparatus of claim 6, wherein the visual content includes a representation of an environment that is at least partially generated by the media output software application.

9. The apparatus of claim 8, wherein the media output software application is a video game, and wherein the condition is associated with gameplay of the video game.

10. The apparatus of claim 1, wherein the media content includes audio content that is configured to vary across the period of time, wherein the output device includes an audio output device configured to play the audio content.

11. The apparatus of claim 10, wherein the audio content includes an audio track of a video, wherein the audio track is configured to vary across the period of time.

12. The apparatus of claim 10, wherein the audio content that includes at least one sound associated with an environment that is at least partially generated by the media output software application.

13. The apparatus of claim 1, wherein the at least one processor is configured to:
detect that a sound is included within audio content of the media content at least at the first time to detect the condition.

14. The apparatus of claim 1, wherein the at least one processor is configured to:
detect receipt of an input from a user interface at the first time to detect the condition.

15. The apparatus of claim 1, wherein the at least one processor is configured to:
detect a motion using a motion sensor at the first time to detect the condition.

16. The apparatus of claim 1, wherein the at least one processor is configured to:
detect a change in the media output settings to detect the condition.

17. The apparatus of claim 1, wherein the at least one processor is configured to:
detect an aspect of the media content that is indicative of the condition associated with the media content to detect the condition associated with the media content.

18. The apparatus of claim 1, wherein the haptic feedback vibration pattern indicates a haptic feedback vibration intensity of haptic feedback vibration by the first haptic feedback vibration actuator.

19. The apparatus of claim 18, wherein the haptic feedback vibration intensity of the haptic feedback vibration pattern corresponds to a proximity of a first entity represented in the media content to a second entity represented in the media content.

20. The apparatus of claim 18, wherein the haptic feedback vibration intensity of the haptic feedback vibration pattern corresponds to an intensity of the condition associated with the media content.

21. The apparatus of claim 18, wherein the haptic feedback vibration intensity of the haptic feedback vibration pattern corresponds to a volume of a sound, wherein the media content includes the sound.

22. The apparatus of claim 1, wherein the haptic feedback vibration pattern indicates at least one characteristic associated with actuation of the first haptic feedback vibration actuator, wherein the at least one characteristic includes at least one of a waveform, a frequency, or an amplitude.

23. The apparatus of claim 1, wherein the at least one processor is configured to:
generate a haptic feedback vibration waveform of the haptic feedback vibration pattern based on an audio waveform of a sound, wherein the media content includes the sound.

24. The apparatus of claim 1, wherein the at least one processor is configured to:
output the media content using the output device.

25. The apparatus of claim 1, wherein the at least one processor is configured to:
receive a message; and
modify the media content to incorporate the message into the media content before the media content is configured to be output using the output device.

26. The apparatus of claim 1, further comprising:
the first haptic feedback vibration actuator; and
the second haptic feedback vibration actuator.

27. The apparatus of claim 1, wherein the first haptic feedback vibration actuator is associated with a first region of the apparatus, wherein the second haptic feedback vibration actuator is associated with a second region of the apparatus, and wherein actuation of the first haptic feedback vibration actuator without actuation of the second haptic feedback vibration actuator is configured to provide a localized haptic feedback effect that is stronger at the first region of the apparatus than at the second region of the apparatus.

28. The apparatus of claim 1, wherein the at least one processor is configured to:
detect that an object is represented within visual content of the media content at least at a first region of output device, wherein actuation of the first haptic feedback vibration actuator without actuation of the second haptic feedback vibration actuator is based on the first region being closer to the first haptic feedback vibration actuator than to the second haptic feedback vibration actuator.

29. The apparatus of claim 1, wherein a housing includes the first haptic feedback vibration actuator and the second haptic feedback vibration actuator, and wherein the housing includes at least a portion of the output device.

30. A method for processing media data, the method comprising:
receiving media content to be output using an output device according to media output settings associated with a media output software application, wherein the output device is configured to output different portions of the media content at different times across a period of time;
detecting a condition associated with the media content at a first time along the period of time; and
actuating, according to a haptic feedback vibration pattern corresponding to the condition, a first haptic feedback vibration actuator without actuating a second haptic feedback vibration actuator, wherein the output device is coupled to both the first haptic feedback vibration actuator and the second haptic feedback vibration actuator.

* * * * *